US012699765B2

(12) United States Patent
Mondello et al.

(10) Patent No.: US 12,699,765 B2
(45) Date of Patent: Aug. 4, 2026

(54) USER INTERFACES FOR MANAGING PASSWORDS

(71) Applicant: Apple Inc., Cupertino, CA (US)

(72) Inventors: Richard J. Mondello, Wingdale, NY (US); Elaine Y. Knight, San Francisco, CA (US); Peter W. Roman, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 18/957,408

(22) Filed: Nov. 22, 2024

(65) Prior Publication Data

US 2025/0086266 A1      Mar. 13, 2025

Related U.S. Application Data

(63) Continuation of application No. 17/752,778, filed on May 24, 2022, now Pat. No. 12,189,756.

(60) Provisional application No. 63/197,448, filed on Jun. 6, 2021.

(51) Int. Cl.
  *G06F 21/00*        (2013.01)
  *G06F 21/45*        (2013.01)
(52) U.S. Cl.
  CPC .................................. *G06F 21/45* (2013.01)
(58) Field of Classification Search
  CPC .......... G06F 21/31; G06F 21/36; G06F 21/32;
        G06F 21/80; G06F 21/34; G06F 21/46;
        G06F 2211/007; G06F 21/41; H04L
        9/3228; H04L 63/083; H04L 63/0838;

H04L 9/3226; H04L 63/0815; H04L 63/08; H04L 63/0853; G16H 10/60; G11B 20/00086; G07F 7/1008; G06Q 20/341; G06Q 20/35765; H04W 12/06
See application file for complete search history.

(56) References Cited

U.S. PATENT DOCUMENTS

| | | | |
|---|---|---|---|
| RE42,574 E | 7/2011 | Cockayne | |
| 8,195,576 B1 | 6/2012 | Grigg et al. | |
| 8,401,904 B1 | 3/2013 | Simakov et al. | |
| 8,459,545 B1 | 6/2013 | Hammer et al. | |
| 8,473,748 B2 | 6/2013 | Sampas | |
| 8,571,937 B2 | 10/2013 | Rose et al. | |
| 8,880,055 B1 | 11/2014 | Clement et al. | |
| 8,942,420 B2 | 1/2015 | Kim et al. | |
| 9,208,492 B2 | 12/2015 | Hoyos | |
| 9,275,219 B2 | 3/2016 | Cross et al. | |

(Continued)

FOREIGN PATENT DOCUMENTS

| | | |
|---|---|---|
| AU | 2015100708 A4 | 7/2015 |
| AU | 2015100709 A4 | 7/2015 |

(Continued)

OTHER PUBLICATIONS

Examiner's Answer to Appeal Brief received for U.S. Appl. No. 17/222,141, mailed on Dec. 12, 2024, 19 pages.

(Continued)

*Primary Examiner* — William A Corum, Jr.
(74) *Attorney, Agent, or Firm* — YHE Law LLP

(57)          ABSTRACT
The present disclosure generally relates to managing passwords. A computer system enters, saves, and submits a new username and a new password created via a password manager to a remotely-authenticated service.

45 Claims, 29 Drawing Sheets

(56) References Cited

U.S. PATENT DOCUMENTS

| | | | |
|---|---|---|---|
| 9,323,912 B2 | 4/2016 | Schultz et al. | |
| 9,355,393 B2 | 5/2016 | Purves et al. | |
| 9,383,989 B1 | 7/2016 | Qi et al. | |
| 9,384,342 B2 | 7/2016 | Kominar et al. | |
| 9,396,323 B2 | 7/2016 | Cross et al. | |
| 9,606,873 B2 | 3/2017 | Brettell et al. | |
| 9,635,032 B2 | 4/2017 | Cross et al. | |
| 9,825,934 B1 | 11/2017 | Alexander | |
| 9,847,999 B2 | 12/2017 | Van Os et al. | |
| 9,898,642 B2 | 2/2018 | Han et al. | |
| 9,924,301 B2 | 3/2018 | Oh | |
| 9,942,234 B2 | 4/2018 | Deluca et al. | |
| 10,079,815 B2 | 9/2018 | Berlin et al. | |
| 10,182,048 B1 | 1/2019 | Sabanayagam | |
| 10,397,207 B1* | 8/2019 | Huynh | H04L 9/0863 |
| 11,216,799 B1 | 1/2022 | Ji et al. | |
| 2003/0061172 A1 | 3/2003 | Robinson | |
| 2003/0142227 A1 | 7/2003 | van Zee | |
| 2003/0181201 A1 | 9/2003 | Bomze et al. | |
| 2004/0169722 A1 | 9/2004 | Pena | |
| 2004/0234117 A1 | 11/2004 | Tibor | |
| 2005/0077349 A1 | 4/2005 | Bonalle et al. | |
| 2005/0253814 A1 | 11/2005 | Ghassabian | |
| 2006/0021003 A1 | 1/2006 | Fisher et al. | |
| 2006/0064313 A1 | 3/2006 | Steinbarth et al. | |
| 2006/0165060 A1 | 7/2006 | Dua et al. | |
| 2006/0179404 A1 | 8/2006 | Yolleck et al. | |
| 2006/0293892 A1 | 12/2006 | Pathuel | |
| 2007/0131759 A1 | 6/2007 | Cox et al. | |
| 2007/0220597 A1 | 9/2007 | Ishida | |
| 2007/0260558 A1 | 11/2007 | Look | |
| 2008/0028447 A1 | 1/2008 | Omalley et al. | |
| 2008/0052181 A1 | 2/2008 | Devitt-Carolan et al. | |
| 2008/0120707 A1 | 5/2008 | Ramia et al. | |
| 2008/0244440 A1 | 10/2008 | Bailey et al. | |
| 2009/0066478 A1 | 3/2009 | Colella | |
| 2009/0083850 A1 | 3/2009 | Fadell et al. | |
| 2009/0124376 A1 | 5/2009 | Kelly et al. | |
| 2009/0132813 A1 | 5/2009 | Schibuk | |
| 2009/0173784 A1 | 7/2009 | Yang et al. | |
| 2009/0307139 A1 | 12/2009 | Mardikar et al. | |
| 2010/0008535 A1 | 1/2010 | Abulafia et al. | |
| 2010/0023449 A1 | 1/2010 | Skowronek et al. | |
| 2010/0026453 A1 | 2/2010 | Yamamoto et al. | |
| 2010/0078471 A1 | 4/2010 | Lin et al. | |
| 2010/0078472 A1 | 4/2010 | Lin et al. | |
| 2010/0082481 A1 | 4/2010 | Lin et al. | |
| 2010/0082485 A1 | 4/2010 | Lin et al. | |
| 2010/0122327 A1 | 5/2010 | Linecker et al. | |
| 2010/0164864 A1 | 7/2010 | Chou et al. | |
| 2010/0174620 A1 | 7/2010 | Stringfellow et al. | |
| 2010/0262472 A1 | 10/2010 | Gautam et al. | |
| 2010/0267362 A1 | 10/2010 | Smith et al. | |
| 2010/0275259 A1 | 10/2010 | Adams et al. | |
| 2010/0306107 A1 | 12/2010 | Nahari et al. | |
| 2011/0179271 A1 | 7/2011 | Orsini et al. | |
| 2011/0199183 A1 | 8/2011 | Marsden | |
| 2011/0221568 A1 | 9/2011 | Giobbi | |
| 2011/0225057 A1 | 9/2011 | Webb et al. | |
| 2011/0270757 A1 | 11/2011 | Hammad | |
| 2012/0028609 A1 | 2/2012 | Hruska et al. | |
| 2012/0150742 A1 | 6/2012 | Poon et al. | |
| 2012/0185397 A1 | 7/2012 | Levovitz | |
| 2012/0197740 A1 | 8/2012 | Grigg et al. | |
| 2012/0238363 A1 | 9/2012 | Watanabe et al. | |
| 2012/0284185 A1 | 11/2012 | Mettler et al. | |
| 2012/0290376 A1 | 11/2012 | Dryer et al. | |
| 2013/0024366 A1 | 1/2013 | Mukherjee et al. | |
| 2013/0041824 A1 | 2/2013 | Gupta | |
| 2013/0085931 A1 | 4/2013 | Runyan | |
| 2013/0124855 A1 | 5/2013 | Varadarajan et al. | |
| 2013/0189953 A1 | 7/2013 | Mathews | |
| 2013/0198112 A1 | 8/2013 | Bhat et al. | |
| 2013/0212655 A1 | 8/2013 | Hoyos et al. | |
| 2013/0232073 A1 | 9/2013 | Sheets et al. | |
| 2013/0254858 A1 | 9/2013 | Giardina et al. | |
| 2013/0262857 A1 | 10/2013 | Neuman et al. | |
| 2013/0272586 A1 | 10/2013 | Russo | |
| 2013/0297414 A1 | 11/2013 | Goldfarb et al. | |
| 2013/0326563 A1 | 12/2013 | Mulcahy et al. | |
| 2013/0332358 A1 | 12/2013 | Zhao | |
| 2014/0025520 A1 | 1/2014 | Mardikar et al. | |
| 2014/0036099 A1 | 2/2014 | Balassanian | |
| 2014/0052553 A1 | 2/2014 | Uzo | |
| 2014/0058935 A1 | 2/2014 | Mijares | |
| 2014/0058941 A1 | 2/2014 | Moon et al. | |
| 2014/0081793 A1 | 3/2014 | Hoffberg | |
| 2014/0099886 A1 | 4/2014 | Monroe et al. | |
| 2014/0114856 A1 | 4/2014 | Jung et al. | |
| 2014/0122331 A1 | 5/2014 | Vaish et al. | |
| 2014/0140587 A1 | 5/2014 | Ballard et al. | |
| 2014/0143145 A1 | 5/2014 | Kortina et al. | |
| 2014/0156531 A1 | 6/2014 | Poon et al. | |
| 2014/0157390 A1 | 6/2014 | Lurey et al. | |
| 2014/0187856 A1 | 7/2014 | Holoien et al. | |
| 2014/0189829 A1 | 7/2014 | McLachlan et al. | |
| 2014/0197234 A1 | 7/2014 | Hammad | |
| 2014/0199995 A1 | 7/2014 | Singh et al. | |
| 2014/0229623 A1 | 8/2014 | Khasnabish | |
| 2014/0244514 A1 | 8/2014 | Rodriguez et al. | |
| 2014/0246917 A1 | 9/2014 | Proud et al. | |
| 2014/0254355 A1 | 9/2014 | Soliman et al. | |
| 2014/0282987 A1 | 9/2014 | Narendra et al. | |
| 2014/0292396 A1 | 10/2014 | Bruwer et al. | |
| 2014/0298478 A1 | 10/2014 | Kim et al. | |
| 2014/0304416 A1 | 10/2014 | Khasnabish | |
| 2014/0316984 A1 | 10/2014 | Schwartz | |
| 2014/0335906 A1 | 11/2014 | Kim et al. | |
| 2014/0337175 A1 | 11/2014 | Katzin et al. | |
| 2014/0337634 A1 | 11/2014 | Johnson et al. | |
| 2014/0344082 A1 | 11/2014 | Soundararajan | |
| 2014/0344922 A1* | 11/2014 | Lam | H04W 12/08 726/19 |
| 2015/0004984 A1 | 1/2015 | Kim et al. | |
| 2015/0012417 A1 | 1/2015 | Joao et al. | |
| 2015/0014141 A1 | 1/2015 | Myers et al. | |
| 2015/0028996 A1 | 1/2015 | Agrafioti et al. | |
| 2015/0056957 A1 | 2/2015 | Mardikar et al. | |
| 2015/0056986 A1 | 2/2015 | Kim et al. | |
| 2015/0077362 A1 | 3/2015 | Seo | |
| 2015/0095174 A1 | 4/2015 | Dua | |
| 2015/0117332 A1 | 4/2015 | Li et al. | |
| 2015/0163617 A1 | 6/2015 | Hall et al. | |
| 2015/0181441 A1 | 6/2015 | Bindrim et al. | |
| 2015/0206045 A1 | 7/2015 | Gazdzinski | |
| 2015/0213452 A1 | 7/2015 | Wong | |
| 2015/0227937 A1 | 8/2015 | Giles | |
| 2015/0347738 A1 | 12/2015 | Ulrich et al. | |
| 2015/0350200 A1 | 12/2015 | Li et al. | |
| 2016/0012465 A1 | 1/2016 | Sharp | |
| 2016/0029190 A1 | 1/2016 | Rattner | |
| 2016/0086188 A1 | 3/2016 | Candelore et al. | |
| 2016/0087952 A1 | 3/2016 | Tartz et al. | |
| 2016/0125412 A1 | 5/2016 | Cannon | |
| 2016/0180305 A1 | 6/2016 | Dresser et al. | |
| 2016/0191506 A1 | 6/2016 | Wang | |
| 2016/0191522 A1 | 6/2016 | Liang | |
| 2016/0224966 A1 | 8/2016 | Van Os et al. | |
| 2016/0224973 A1 | 8/2016 | Van Os et al. | |
| 2016/0261581 A1 | 9/2016 | Wang et al. | |
| 2016/0330199 A1 | 11/2016 | Weiner et al. | |
| 2016/0359831 A1 | 12/2016 | Berlin et al. | |
| 2017/0039567 A1 | 2/2017 | Stern et al. | |
| 2017/0093749 A1 | 3/2017 | Hoffmann | |
| 2017/0161750 A1 | 6/2017 | Yao et al. | |
| 2017/0264608 A1 | 9/2017 | Moore et al. | |
| 2017/0308695 A1* | 10/2017 | Adams | H04L 63/06 |
| 2017/0357627 A1 | 12/2017 | Peterson et al. | |
| 2018/0131721 A1 | 5/2018 | Jones et al. | |
| 2018/0260086 A1 | 9/2018 | Leme et al. | |
| 2018/0367523 A1 | 12/2018 | Berlin et al. | |
| 2019/0080189 A1 | 3/2019 | Van Os et al. | |
| 2019/0228140 A1 | 7/2019 | Arroyo et al. | |
| 2019/0372989 A1 | 12/2019 | Shultz et al. | |

(56) References Cited

U.S. PATENT DOCUMENTS

| | | | |
|---|---|---|---|
| 2020/0162445 A1 | 5/2020 | Berlin et al. |
| 2021/0204115 A1 | 7/2021 | Gorsica et al. |
| 2021/0224785 A1 | 7/2021 | Van Os et al. |
| 2021/0342525 A1 | 11/2021 | Leme |
| 2022/0109671 A1 | 4/2022 | Zaman et al. |
| 2022/0141206 A1 | 5/2022 | Berlin et al. |
| 2022/0269333 A1 | 8/2022 | Dedonato et al. |
| 2022/0277063 A1 | 9/2022 | Arroyo et al. |
| 2023/0084751 A1 | 3/2023 | Mondello et al. |
| 2023/0259598 A1 | 8/2023 | Arroyo et al. |
| 2023/0412579 A1 | 12/2023 | Berlin et al. |
| 2024/0323340 A1 | 9/2024 | Cohen et al. |
| 2024/0329827 A1 | 10/2024 | Agrawal et al. |
| 2024/0353922 A1 | 10/2024 | Dedonato et al. |
| 2024/0370542 A1 | 11/2024 | Dedonato et al. |
| 2025/0141858 A1 | 5/2025 | Berlin et al. |

FOREIGN PATENT DOCUMENTS

| | | |
|---|---|---|
| CN | 101454794 A | 6/2009 |
| CN | 101796764 A | 8/2010 |
| CN | 101809581 A | 8/2010 |
| CN | 102282578 A | 12/2011 |
| CN | 102349082 A | 2/2012 |
| CN | 102663303 A | 9/2012 |
| CN | 102737312 A | 10/2012 |
| CN | 102792325 A | 11/2012 |
| CN | 103299328 A | 9/2013 |
| CN | 103443813 A | 12/2013 |
| CN | 103635920 A | 3/2014 |
| CN | 103718202 A | 4/2014 |
| CN | 103761647 A | 4/2014 |
| CN | 103763327 A | 4/2014 |
| CN | 103765861 A | 4/2014 |
| CN | 103778533 A | 5/2014 |
| CN | 103843021 A | 6/2014 |
| CN | 104038256 A | 9/2014 |
| CN | 104077534 A | 10/2014 |
| CN | 105100123 A | 11/2015 |
| CN | 105703909 A | 6/2016 |
| CN | 105827624 A | 8/2016 |
| CN | 105844462 A | 8/2016 |
| CN | 106487754 A | 3/2017 |
| CN | 106961415 A | 7/2017 |
| EP | 2654275 A1 | 10/2013 |
| EP | 2701107 A1 | 2/2014 |
| EP | 2725537 A1 | 4/2014 |
| EP | 2801924 A1 | 11/2014 |
| JP | 2004-287592 A | 10/2004 |
| JP | 2006-163960 A | 6/2006 |
| JP | 2012-504273 A | 2/2012 |
| JP | 2013-222410 A | 10/2013 |
| JP | 2014-191653 A | 10/2014 |
| KR | 10-0403196 B1 | 10/2003 |
| KR | 10-2011-0056561 A | 5/2011 |
| KR | 10-2013-0138659 A | 12/2013 |
| KR | 10-2014-0121764 A | 10/2014 |
| WO | 2009/042392 A2 | 4/2009 |
| WO | 2010/039337 A2 | 4/2010 |
| WO | 2013/003372 A1 | 1/2013 |
| WO | 2013/023224 A2 | 2/2013 |
| WO | 2013/103912 A1 | 7/2013 |
| WO | 2014/081453 A1 | 5/2014 |
| WO | 2015/057320 A1 | 4/2015 |
| WO | 2016/029853 A1 | 3/2016 |
| WO | 2016/123309 A1 | 8/2016 |
| WO | 2022/178132 A1 | 8/2022 |

OTHER PUBLICATIONS

Final Office Action received for U.S. Appl. No. 18/137,985, mailed on Dec. 4, 2024, 14 pages.

International Search Report and Written Opinion received for PCT Patent Application No. PCT/US2024/025803, mailed on Aug. 20, 2024, 11 pages.

Office Action received for Chinese Patent Application No. 201911076555.3, mailed on Sep. 20, 2024, 21 pages (10 pages of English Translation and 11 pages of Official Copy).

Office Action received for Chinese Patent Application No. 201980009669.8, mailed on Oct. 14, 2024, 18 pages (10 pages of English Translation and 8 pages of Official Copy).

Office Action received for European Patent Application No. 21150992.2, mailed on Dec. 16, 2024, 13 pages.

Banerjee et al., "Taking Mobile Payments From Coffee Shops to Retail Stores", Retrieved from the Internet: URL:https://dupress.deloitte.com/content/dam/dup-us-en/articles/mpayments-mobile-pos-system-in-retail/DUP-922_mPayments_FINAL.pdf, Jan. 1, 2015, 28 pages.

Extended European Search Report received for European Patent Application No. 25164254.2, mailed on Apr. 3, 2025, 13 pages.

Notice of Allowance received for Chinese Patent Application No. 201911076555.3, mailed on Apr. 1, 2025, 2 pages (1 page of English Translation and 1 page of Official Copy).

Notice of Allowance received for U.S. Appl. No. 17/222,141, mailed on Dec. 15, 2025, 12 pages.

Office Action received for Chinese Patent Application No. 201911076555.3, mailed on Nov. 29, 2024, 25 pages (11 pages of English Translation and 14 pages of Official copy).

Record of Oral Hearing received for U.S. Appl. No. 17/222,141, mailed on Sep. 17, 2025, 13 pages.

Decision on Appeal received for U.S. Appl. No. 17/222,141. mailed on Aug. 29, 2025, 10 pages.

Notice of Allowance received for U.S. Appl. No. 18/590,896, mailed on Aug. 19, 2025, 9 pages.

Office Action received for Chinese Patent Application No. 201980009669.8, mailed on Jan. 9, 2025, 24 pages (1 page of English Translation and 23 pages of Official Copy).

Office Action received for European Patent Application No. 23199594.5, mailed on Oct. 28, 2025, 8 pages.

International Preliminary Report on Patentability received for PCT Patent Application No. PCT/US2024/025803, mailed on Nov. 20, 2025, 8 pages.

Alexandridis et al., "Forthroid on Android: A QR-code based Information Access System for Smart Phones", 18th IEEE Workshop on Local & Metropolitan Area Networks (LANMAN), 2011, 6 pages.

Applicant-Initiated Interview Summary received for U.S. Appl. No. 17/222,141, mailed on Nov. 24, 2023, 6 pages.

Applicant-Initiated Interview Summary received for U.S. Appl. No. 17/752,778, mailed on Jul. 30, 2024, 2 pages.

Brief Communication Regarding Oral Proceedings received for European Patent Application No. 19171661.2, mailed on May 28, 2020, 2 pages.

Brief Communication Regarding Oral Proceedings received for European Patent Application No. 19171661.2, mailed on Sep. 3, 2020, 2 pages.

Communication for Board of Appeal received for European Patent Application No. 16703893.4, mailed on Apr. 9, 2024, 5 pages.

Communication for Board of Appeal received for European Patent Application No. 16703893.4, mailed on Mar. 9, 2023, 7 pages.

Corrected Notice of Allowance received for U.S. Appl. No. 16/241,199, mailed on Sep. 13, 2021, 5 pages.

Corrected Notice of Allowance received for U.S. Appl. No. 16/773,584, mailed on Oct. 27, 2021, 4 pages.

Corrected Notice of Allowance received for U.S. Appl. No. 17/498,557, mailed on Feb. 15, 2023, 4 pages.

Corrected Notice of Allowance received for U.S. Appl. No. 17/498,557, mailed on Jan. 11, 2023, 2 pages.

Corrected Notice of Allowance received for U.S. Appl. No. 17/498,557, mailed on Mar. 15, 2023, 2 pages.

Corrected Notice of Allowance received for U.S. Appl. No. 17/752,778, mailed on Sep. 6, 2024, 3 pages.

Decision on Appeal received for Korean Patent Application No. 10-2018-7019643, mailed on Jun. 9, 2020, 27 pages.

Decision on Appeal Appeal received for U.S. Appl. No. 14/869,831, mailed on Nov. 2, 2020, 8 pages.

(56) References Cited

OTHER PUBLICATIONS

Decision on Request for Rehearing received for U.S. Appl. No. 14/869,831, mailed on Mar. 8, 2021, 9 pages.

Decision to Grant received for Danish Patent Application No. PA201670042, mailed on Mar. 19, 2018, 2 pages.

Decision to Grant received for European Patent Application No. 19716254.8, mailed on Oct. 6, 2023, 2 pages.

Decision to Refuse received for European Patent Application No. 16703893.4, mailed on Jul. 24, 2019, 22 pages.

Decision to Refuse received for European Patent Application No. 19171661.2, mailed on Oct. 22, 2020, 7 pages.

"Does Apple Pay change payment?", Mac Fan, Japan, Mynavi Publishing Corporation, vol. 22, No. 11 common No. 381, Nov. 1, 2014, 11 pages.

European Search Report received for European Patent Application No. 19171661.2, mailed on Jul. 17, 2019, 6 pages.

European Search Report received for European Patent Application No. 21150992.2, mailed on Jun. 23, 2021, 6 pages.

Ex-Parte Quayle Action received for U.S. Appl. No. 14/869,831, mailed on May 28, 2021, 16 pages.

Examiner's Answer to Appeal Brief received for U.S. Appl. No. 14/869,831, mailed on Aug. 12, 2019, 16 pages.

Extended European Search Report received for European Patent Application No. 23199594.5, mailed on Nov. 28, 2023, 11 pages.

Final Office Action received for U.S. Appl. No. 14/869,831, mailed on Aug. 2, 2016, 14 pages.

Final Office Action received for U.S. Appl. No. 14/869,831, mailed on Jul. 30, 2018, 31 pages.

Final Office Action received for U.S. Appl. No. 14/869,831, mailed on May 19, 2017, 20 pages.

Final Office Action received for U.S. Appl. No. 16/111,042, mailed on Aug. 22, 2019, 7 pages.

Final Office Action received for U.S. Appl. No. 17/222,141, mailed on Mar. 12, 2024, 54 pages.

Final Office Action received for U.S. Appl. No. 14/870,694, mailed on Apr. 7, 2017, 16 pages.

"Giving Apple Pay a Try", The Consumer Credit Monthly, Kinzai Institute for Financial Affairs, Inc, vol. 33, No. 1, ISSN: 0288-8122, 2015, 7 pages.

Intention to Grant received for Danish patent Application No. PA201670042, mailed on Jan. 29, 2018, 2 pages.

Intention to Grant received for European Patent Application No. 19716254.8, mailed on May 16, 2023, 9 pages.

International Preliminary Report on Patentability received for PCT Patent Application No. PCT/US2016/015316, mailed on Aug. 10, 2017, 10 pages.

International Preliminary Report on Patentability received for PCT Patent Application No. PCT/US2016/017032, mailed on Dec. 21, 2017, 8 pages.

International Preliminary Report on Patentability received for PCT Patent Application No. PCT/US2019/012571, mailed on Aug. 6, 2020, 10 pages.

International Preliminary Report on Patentability received for PCT Patent Application No. PCT/US2022/030945, mailed on Dec. 21, 2023, 11 pages.

International Search Report and Written Opinion received for PCT Patent Application No. PCT/US2016/017032, mailed on May 4, 2016, 11 pages.

International Search Report and Written Opinion received for PCT Patent Application No. PCT/US2019/012571, mailed on May 6, 2019, 15 pages.

International Search Report and Written Opinion received for PCT Patent Application No. PCT/US2022/030945, mailed on Nov. 28, 2022, 19 pages.

International Search Report and Written Opinion received for PCT Patent Application No. PCT/US2016/015316, mailed on Mar. 8, 2016, 13 pages.

Invitation to Pay Additional Fees received for PCT Patent Application No. PCT/US2022/030945, mailed on Oct. 6, 2022, 9 pages.

Jeffries, Adrianne, "Apple Pay allows you to pay at the counter with your iPhone 6", The Verge, Available Online at: https://www.theverge.com/2014/9/9/6084211/apple-pay-iphone-6-nfc-mobile-payment, Sep. 9, 2014, 6 pages.

Minutes of Oral Proceedings received for European Patent Application No. 16703893.4, mailed on Jul. 22, 2019, 9 pages.

Minutes of Oral Proceedings received for European Patent Application No. 16703893.4, mailed on May 28, 2024, 4 pages.

Minutes of the Oral Proceedings received for European Patent Application No. 19171661.2, mailed on Oct. 15, 2020, 5 pages.

Non-Final Office Action received for U.S. Appl. No. 14/869,831, mailed on Jan. 29, 2016, 18 pages.

Non-Final Office Action received for U.S. Appl. No. 14/869,831, mailed on Nov. 22, 2017, 17 pages.

Non-Final Office Action received for U.S. Appl. No. 14/869,974, mailed on Jul. 28, 2017, 17 pages.

Non-Final Office Action received for U.S. Appl. No. 16/111,042, mailed on Mar. 6, 2019, 10 pages.

Non-Final Office Action received for U.S. Appl. No. 16/241,199, mailed on Aug. 20, 2020, 11 pages.

Non-Final Office Action received for U.S. Appl. No. 16/773,584, mailed on Aug. 11, 2021, 10 pages.

Non-Final Office Action received for U.S. Appl. No. 17/222,141, mailed on Sep. 27, 2023, 41 pages.

Non-Final Office Action received for U.S. Appl. No. 17/578,202, mailed on Mar. 2, 2023, 8 pages.

Non-Final Office Action received for U.S. Appl. No. 17/752,778, mailed on Jul. 5, 2024, 14 pages.

Non-Final Office Action received for U.S. Appl. No. 18/137,985, mailed on Dec. 21, 2023, 8 pages.

Non-Final Office Action received for U.S. Appl. No. 18/137,985, mailed on Jun. 5, 2024, 9 pages.

Non-Final Office Action received for U.S. Appl. No. 18/239,642, mailed on Apr. 25, 2024, 8 pages.

Non-Final Office Action received for U.S. Appl. No. 14/870,694, mailed on Sep. 23, 2016, 13 pages.

Notice of Acceptance received for Australian Patent Application No. 2018200628, mailed on Jun. 13, 2019, 3 pages.

Notice of Acceptance received for Australian Patent Application No. 2016211504, mailed on Oct. 17, 2017, 3 pages.

Notice of Allowance received for Chinese Patent Application No. 201610069731.0, mailed on Sep. 6, 2019, 2 pages.

Notice of Allowance received for Chinese Patent Application No. 201910354714.5, mailed on Oct. 14, 2020, 2 pages.

Notice of Allowance received for Japanese Patent Application No. 2017-540616, mailed on Apr. 23, 2019, 4 pages.

Notice of Allowance received for Japanese Patent Application No. 2019-096220, mailed on Nov. 25, 2019, 4 pages.

Notice of Allowance received for Korean Patent Application No. 10-2017-7024513, mailed on Apr. 20, 2018, 5 pages.

Notice of Allowance received for Korean Patent Application No. 10-2021-7030343, mailed on Dec. 9, 2021, 6 pages.

Notice of Allowance received for Korean Patent Application No. 10-2022-7004804, mailed on Mar. 8, 2022, 8 pages.

Notice of Allowance received for U.S. Appl. No. 16/111,042, mailed on Oct. 24, 2019, 9 pages.

Notice of Allowance received for U.S. Appl. No. 14/869,831, mailed on Jul. 2, 2021, 9 pages.

Notice of Allowance received for U.S. Appl. No. 14/869,974, mailed on Apr. 25, 2018, 11 pages.

Notice of Allowance received for U.S. Appl. No. 14/870,694, mailed on Dec. 11, 2018, 6 pages.

Notice of Allowance received for U.S. Appl. No. 14/870,694, mailed on Jul. 31, 2018, 7 pages.

Notice of Allowance received for U.S. Appl. No. 16/241,199, mailed on May 13, 2021, 9 pages.

Notice of Allowance received for U.S. Appl. No. 16/773,584, mailed on Sep. 17, 2021, 9 pages.

Notice of Allowance received for U.S. Appl. No. 17/498,557, mailed on Dec. 2, 2022, 9 pages.

Notice of Allowance received for U.S. Appl. No. 17/578,202, mailed on May 24, 2023, 6 pages.

(56)　　　　References Cited

OTHER PUBLICATIONS

Notice of Allowance received for U.S. Appl. No. 17/752,778, mailed on Sep. 3, 2024, 29 pages.

Notice of Allowance received for U.S. Appl. No. 18/239,642, mailed on Jul. 15, 2024, 6 pages.

Office Action received for Australian Patent Application No. 2016100090, mailed on Apr. 13, 2016, 7 pages.

Office Action received for Australian Patent Application No. 2016100090, mailed on Oct. 7, 2016, 3 pages.

Office Action received for Australian Patent Application No. 2016102031, mailed on Feb. 28, 2017, 4 pages.

Office Action received for Australian Patent Application No. 2018200628, mailed on Jan. 24, 2019, 3 pages.

Office Action received for Chinese Patent Application No. 201610069731.0, mailed on Mar. 5, 2019, 10 pages Office Action received for Chinese Patent Application No. 201620101636.X, mailed on May 25, 2016, 3 pages.

Office Action received for Chinese Patent Application No. 201620101636.X, mailed on Oct. 13, 2016, 3 pages.

Office Action received for Chinese Patent Application No. 201910354714.5, mailed on Feb. 3, 2020, 12 pages.

Office Action received for Chinese Patent Application No. 201911076555.3, mailed on Jan. 20, 2024, 24 pages.

Office Action received for Chinese Patent Application No. 201980009669.8, mailed on Aug. 3, 2022, 19 pages.

Office Action received for Chinese Patent Application No. 201980009669.8, mailed on Dec. 3, 2021, 26 pages.

Office Action received for Chinese Patent Application No. 201980009669.8, mailed on Mar. 1, 2023, 19 pages.

Office Action received for Chinese Patent Application No. 201980009669.8, mailed on Nov. 22, 2022, 16 pages.

Office Action received for Danish Patent Application No. PA201670042, mailed on Feb. 15, 2017, 3 pages.

Office Action received for Danish Patent Application No. PA201670042, mailed on Jun. 23, 2016, 5 pages.

Office Action received for Danish Patent Application No. PA201670042, mailed on Mar. 31, 2016, 10 pages.

Office Action received for Danish Patent Application No. PA201670042, mailed on Sep. 25, 2017, 2 pages.

Office Action received for Danish Patent Application No. PA201770292, mailed on Apr. 24, 2018, 3 pages.

Office Action received for Danish Patent Application No. PA201770292, mailed on Jun. 6, 2017, 7 pages.

Office Action received for Danish Patent Application No. PA201770292, mailed on Nov. 9, 2018, 3 pages.

Office Action received for Danish Patent Application No. PA201770292, mailed on Sep. 6, 2017, 4 pages.

Office Action received for European Patent Application No. 16703893. 4, mailed on Sep. 17, 2018, 7 pages.

Office Action received for European Patent Application No. 19171661. 2, mailed on Aug. 7, 2019, 7 pages.

Office Action received for European Patent Application No. 19716254. 8, mailed on Aug. 9, 2021, 8 pages.

Office Action received for European Patent Application No. 21150992. 2, mailed on Jul. 6, 2021, 6 pages.

Office Action received for European Patent Application No. 21150992. 2, mailed on May 4, 2023, 12 pages.

Office Action received for Japanese Patent Application No. 2017-540616, mailed on Jan. 12, 2018, 24 pages.

Office Action received for Japanese Patent Application No. 2017-540616, mailed on Jul. 27, 2018, 20 pages.

Office Action received for Japanese Patent Application No. 2019-096220, mailed on Sep. 9, 2019, 8 pages.

Office Action received for Korean Patent Application No. 10-2018-7019643, mailed on Jan. 6, 2020, 7 pages.

Office Action received for Korean Patent Application No. 10-2018-7019643, mailed on Jul. 2, 2019, 12 pages.

Office Action received for Korean Patent Application No. 10-2020-7010007, mailed on Aug. 26, 2020, 12 pages.

Office Action received for Korean Patent Application No. 10-2020-7010007, mailed on Jun. 21, 2021, 7 pages.

Office Action received for Korean Patent Application No. 10-2020-7010007, mailed on Mar. 15, 2021, 7 pages.

Ohbuchi et al., "Barcode Readers using the Camera Device in Mobile Phones", International Conference on Cyberworlds IEEE, 2004, 6 pages.

PPCharlier, "Feature for auto-concatenating fields (e.g. for OTP based logins)?", Available online at: https://1password.community/discussion/comment/379288/#Comment_379288, Jul. 2017, 5 pages.

Pre-Brief Appeal Conference decision received for U.S. Appl. No. 14/869,831, mailed on Jan. 18, 2019., 3 pages.

Reardon et al., "Apple takes NFC mainstream on iPhone 6; Apple Watch with Apple Pay", CNET, Available Online at: https://www.cnet.com/tech/mobile/apple-adds-nfc-to-iphone-6-with-apple-pay/, Sep. 9, 2014, 14 pages.

Record of Oral Hearing received for U.S. Appl. No. 14/869,831, mailed on Oct. 6, 2020, 12 pages.

Result of Consultation received for European Patent Application No. 16703893.4, mailed on Jun. 7, 2019, 3 pages.

Summons to Attend Oral Proceedings received for European Patent Application No. 16703893.4, mailed on Mar. 26, 2019, 14 pages.

Summons to Attend Oral Proceedings received for European Patent Application No. 19171661.2, mailed on Apr. 16, 2020, 12 pages.

Summons to Attend Oral Proceedings received for European Patent Application No. 19171661.2, mailed on Jun. 2, 2020, 13 pages.

Summons to Oral Proceedings received for European Patent Application No. 16703893.4, mailed on Mar. 14, 2024, 8 pages.

Supplemental Notice of Allowance received for U.S. Appl. No. 14/869,831, mailed on Aug. 20, 2021, 2 pages.

Supplemental Notice of Allowance received for U.S. Appl. No. 14/870,694, mailed on Jan. 17, 2019, 3 pages.

* cited by examiner

Portable Multifunction Device 100

210

212

208

206

Speaker 111

Optical Sensor 164

Proximity Sensor 166

200

210 is SIM card slot
212 is headphone jack

208

202

Touch Screen 112

Contact Intensity Sensor(s) 165

Tactile Output Generator(s) 167

203

Microphone 113

Home 204

Accelerometer(s) 168

External Port 124

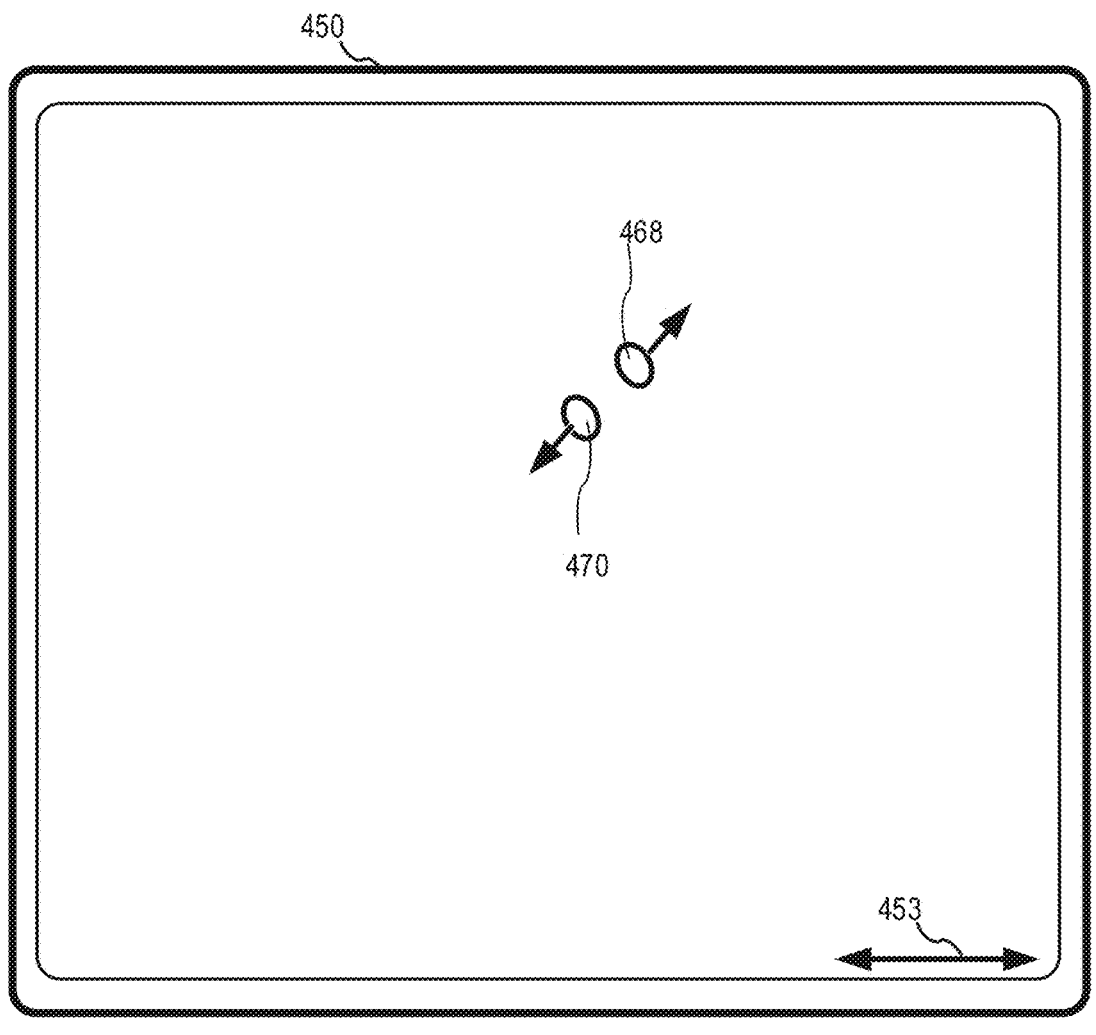
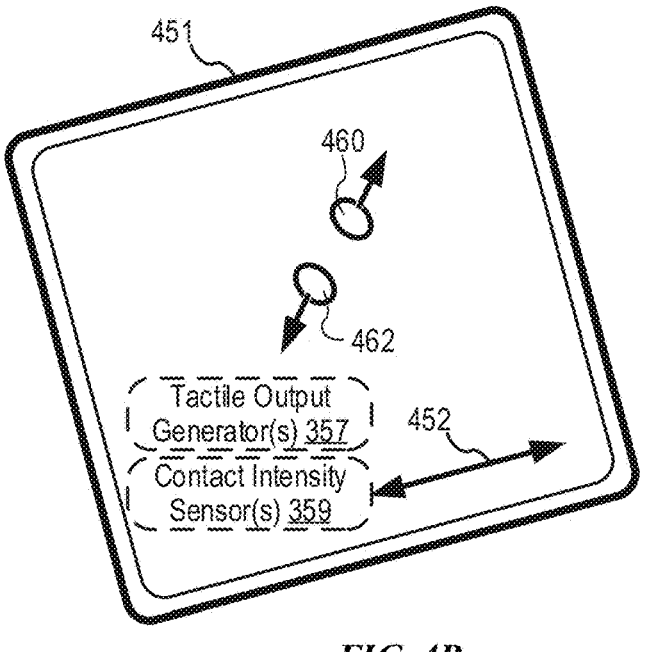
*FIG. 4B*

Figure 7:
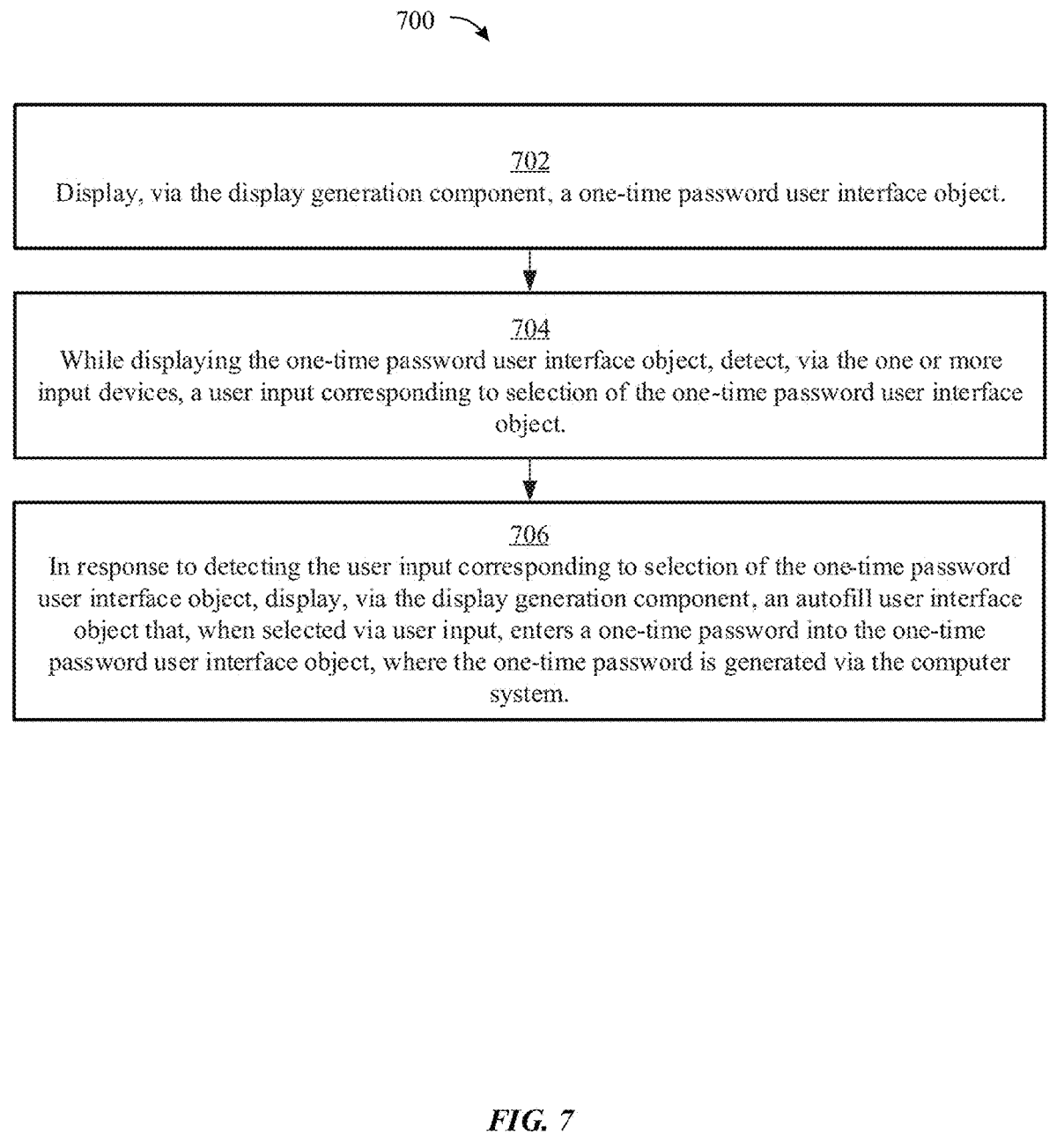

700

702
Display, via the display generation component, a one-time password user interface object.

704
While displaying the one-time password user interface object, detect, via the one or more input devices, a user input corresponding to selection of the one-time password user interface object.

706
In response to detecting the user input corresponding to selection of the one-time password user interface object, display, via the display generation component, an autofill user interface object that, when selected via user input, enters a one-time password into the one-time password user interface object, where the one-time password is generated via the computer system.

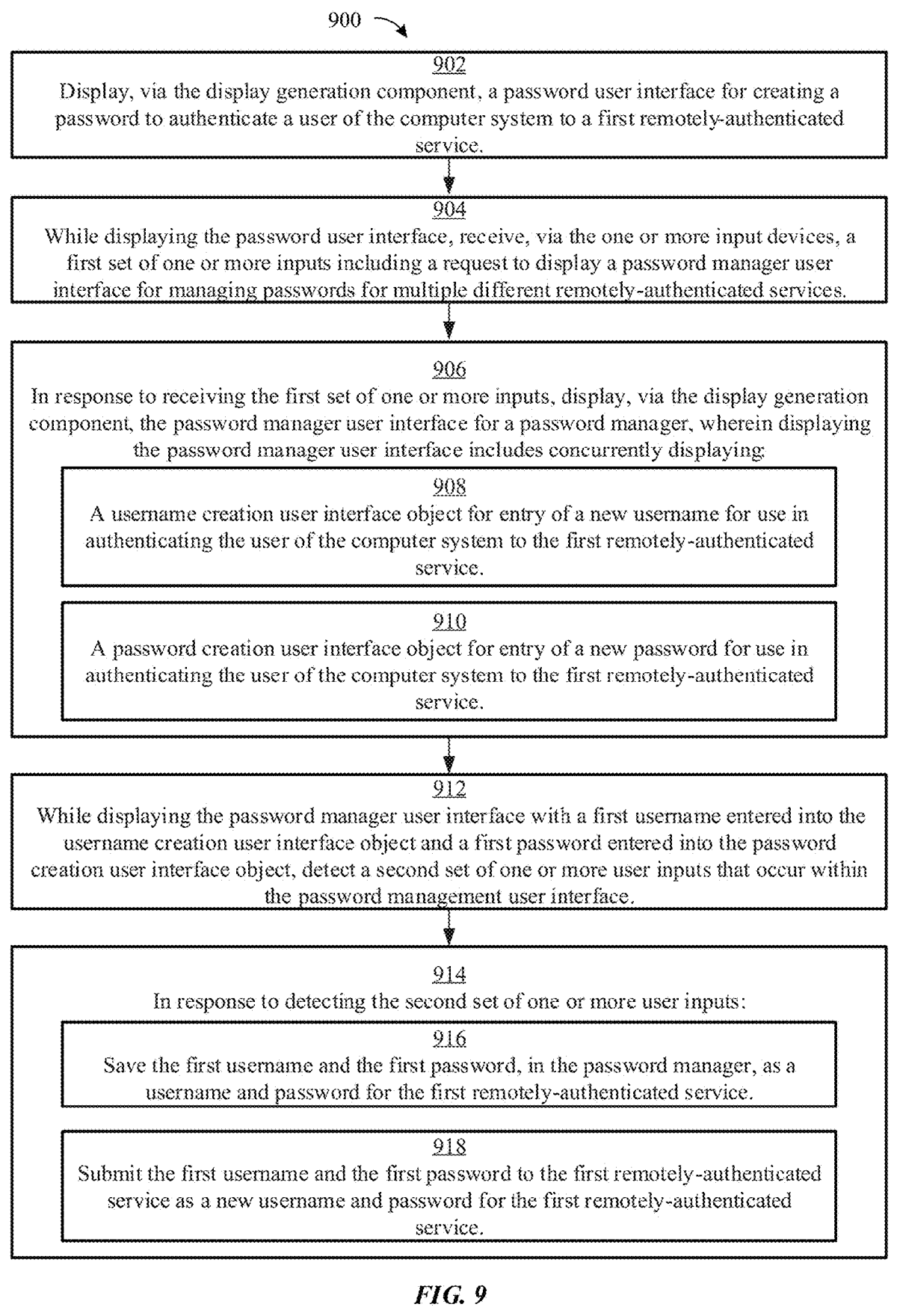

902
Display, via the display generation component, a password user interface for creating a password to authenticate a user of the computer system to a first remotely-authenticated service.

904
While displaying the password user interface, receive, via the one or more input devices, a first set of one or more inputs including a request to display a password manager user interface for managing passwords for multiple different remotely-authenticated services.

906
In response to receiving the first set of one or more inputs, display, via the display generation component, the password manager user interface for a password manager, wherein displaying the password manager user interface includes concurrently displaying:

> 908
> A username creation user interface object for entry of a new username for use in authenticating the user of the computer system to the first remotely-authenticated service.

> 910
> A password creation user interface object for entry of a new password for use in authenticating the user of the computer system to the first remotely-authenticated service.

912
While displaying the password manager user interface with a first username entered into the username creation user interface object and a first password entered into the password creation user interface object, detect a second set of one or more user inputs that occur within the password management user interface.

914
In response to detecting the second set of one or more user inputs:

> 916
> Save the first username and the first password, in the password manager, as a username and password for the first remotely-authenticated service.

> 918
> Submit the first username and the first password to the first remotely-authenticated service as a new username and password for the first remotely-authenticated service.

*FIG. 9*

USER INTERFACES FOR MANAGING PASSWORDS

CROSS-REFERENCE TO RELATED APPLICATIONS

This application is a continuation of U.S. patent application Ser. No. 17/752,778, entitled "USER INTERFACES FOR MANAGING PASSWORDS," filed May 24, 2022, which claims the benefit of U.S. Provisional Patent Application No. 63/197,448, entitled "USER INTERFACES FOR MANAGING PASSWORDS," filed Jun. 6, 2021, the entire contents of each of which are hereby incorporated by reference.

FIELD

The present disclosure relates generally to computer user interfaces, and more specifically to techniques for managing passwords.

BACKGROUND

Electronic devices can include password manager software and/or applications that store usernames and/or passwords corresponding to respective accounts of a user. The electronic devices can be used to enter a respective username and password to authenticate the user with a remotely-authenticated service associated with the respective account.

BRIEF SUMMARY

Some techniques for managing passwords using electronic devices, however, are generally cumbersome and inefficient. For example, configuring a one-time password generator on an electronic device typically requires a user to download and/or utilize an application distinct from a password manager of the electronic device. As another example, electronic devices typically require a user to provide multiple inputs into fields of a password manager user interface as well as fields of an account creation user interface to create an account with a remotely-authenticated service. Further, for example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing passwords. Such methods and interfaces optionally complement or replace other methods for managing passwords. Such methods and interfaces further reduce an amount of user inputs required for configuring a one-time password generator, entering a one-time password, and/or creating an account credentials for use in authenticating a user with a remotely-authenticated service. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and one or more input devices. The method comprises: displaying, via the display generation component, a onetime password user interface object; while displaying the one-time password user interface object, detecting, via the one or more input devices, a user input corresponding to selection of the one-time password user interface object; and in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a one-time password user interface object; while displaying the one-time password user interface object, detecting, via the one or more input devices, a user input corresponding to selection of the one-time password user interface object; and in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a one-time password user interface object; while displaying the one-time password user interface object, detecting, via the one or more input devices, a user input corresponding to selection of the one-time password user interface object; and in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: displaying, via the display generation component, a one-time password user interface object; while displaying the one-time password user interface object, detecting, via the one or more input devices, a user input corresponding to selection of the one-time password user interface object; and in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a computer system is described. The computer system is configured to communicate with a display generation component and one or more input devices. The computer system comprises: means for displaying, via the display generation component, a one-time password user interface object; means for, while displaying the one-time password user interface object, detecting, via the one or more input devices, a user input corresponding to selection of the one-time password user interface object; and means for, in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a one-time password user interface object; while displaying the one-time password user interface object, detecting, via the one or more input devices, a user input corresponding to selection of the one-time password user interface object; and in response to detecting the user input corresponding to selection of the one-time password user interface object, displaying, via the display generation component, an autofill user interface object that, when selected via user input, enters a one-time password into the one-time password user interface object, wherein the one-time password is generated via the computer system.

In accordance with some embodiments, a method is described. The method is performed at a computer system that is in communication with a display generation component and one or more input devices. The method comprises: displaying, via the display generation component, a password user interface for creating a password to authenticate a user of the computer system to a first remotely-authenticated service; while displaying the password user interface, receiving, via the one or more input devices, a first set of one or more inputs including a request to display a password manager user interface for managing passwords for multiple different remotely-authenticated services; in response to receiving the first set of one or more inputs, displaying, via the display generation component, the password manager user interface for a password manager, wherein displaying the password manager user interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; while displaying the password manager user interface with a first username entered into the username user interface object and a first password entered into the password user interface object, detecting a second set of one or more user inputs that occur within the password management user interface; and in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a password user interface for creating a password to authenticate a user of the computer system to a first remotely-authenticated service; while displaying the password user interface, receiving, via the one or more input devices, a first set of one or more inputs including a request to display a password manager user interface for managing passwords for multiple different remotely-authenticated services; in response to receiving the first set of one or more inputs, displaying, via the display generation component, the password manager user interface for a password manager, wherein displaying the password manager user interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; while displaying the password manager user interface with a first username entered into the username user interface object and a first password entered into the password user interface object, detecting a second set of one or more user inputs that occur within the password management user interface; and in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a password user interface for creating a password to authenticate a user of the computer system to a first remotely-authenticated service; while displaying the password user interface, receiving, via the one or more input devices, a first set of one or more inputs including a request to display a password manager user interface for managing passwords for multiple different remotely-authenticated services; in response to receiving the first set of one or more inputs, displaying, via the display generation component, the password manager user interface for a password manager, wherein displaying the password manager user interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; while displaying the password manager user interface with a first username entered into the username user interface object and a first password entered into the password user interface object, detecting a second set of one or more user inputs that occur within the password management user interface; and in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: displaying, via the display generation component, a password user interface for creating a password to authenticate a user of the computer system to a first remotely-authenticated service; while displaying the password user interface, receiving, via the one or more input devices, a first set of one or more inputs including a request to display a password manager user interface for managing passwords for multiple different remotely-authenticated services; in response to receiving the first set of one or more inputs, displaying, via the display generation component, the password manager user interface for a password manager, wherein displaying the password manager user interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; while displaying the password manager user interface with a first username entered into the username user interface object and a first password entered into the password user interface object, detecting a second set of one or more user inputs that occur within the password management user interface; and in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

In accordance with some embodiments, a computer system is described. The computer system is configured to communicate with a display generation component and one or more input devices. The computer system comprises: means for displaying, via the display generation component, a password user interface for creating a password to authenticate a user of the computer system to a first remotely-authenticated service; means for, while displaying the password user interface, receiving, via the one or more input devices, a first set of one or more inputs including a request to display a password manager user interface for managing passwords for multiple different remotely-authenticated services; means for, in response to receiving the first set of one or more inputs, displaying, via the display generation component, the password manager user interface for a password manager, wherein displaying the password manager user interface interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; means for, while displaying the password manager user interface with a first username entered into the username user interface object and a first password entered into the password user interface object, detecting a second set of one or more user inputs that occur within the password management user interface; and means for, in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a password user interface for creating a password to authenticate a user of the computer system to a first remotely-authenticated service; while displaying the password user interface, receiving, via the one or more input devices, a first set of one or more inputs including a request to display a password manager user interface for managing passwords for multiple different remotely-authenticated services; in response to receiving the first set of one or more inputs, displaying, via the display generation component, the password manager user interface for a password manager, wherein displaying the password manager user interface includes concurrently displaying: a username creation user interface object for entry of a new username for use in authenticating the user of the computer system to the first remotely-authenticated service; and a password creation user interface object for entry of a new password for use in authenticating the user of the computer system to the first remotely-authenticated service; while displaying the password manager user interface with a first username entered into the username user interface object and a first password entered into the password user interface object, detecting a second set of one or more user inputs that occur within the password management user interface; and in response to detecting the second set of one or more user inputs: saving the first username and the first password, in the password manager, as a username and password for the first remotely-authenticated service; and submitting the first username and the first password to the first remotely-authenticated service as a new username and password for the first remotely-authenticated service.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing passwords, thereby increasing the effectiveness, efficiency, and user satisfaction with such devices. Such methods and interfaces may complement or replace other methods for managing passwords.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for entering a one-time password, in accordance with some embodiments.

FIG. 9 is a flow diagram illustrating a method for creating and submitting account credentials for use in authenticating a user to a remotely-authenticated service, in accordance with some embodiments.

DESCRIPTION OF EMBODIMENTS

Figure 1A:
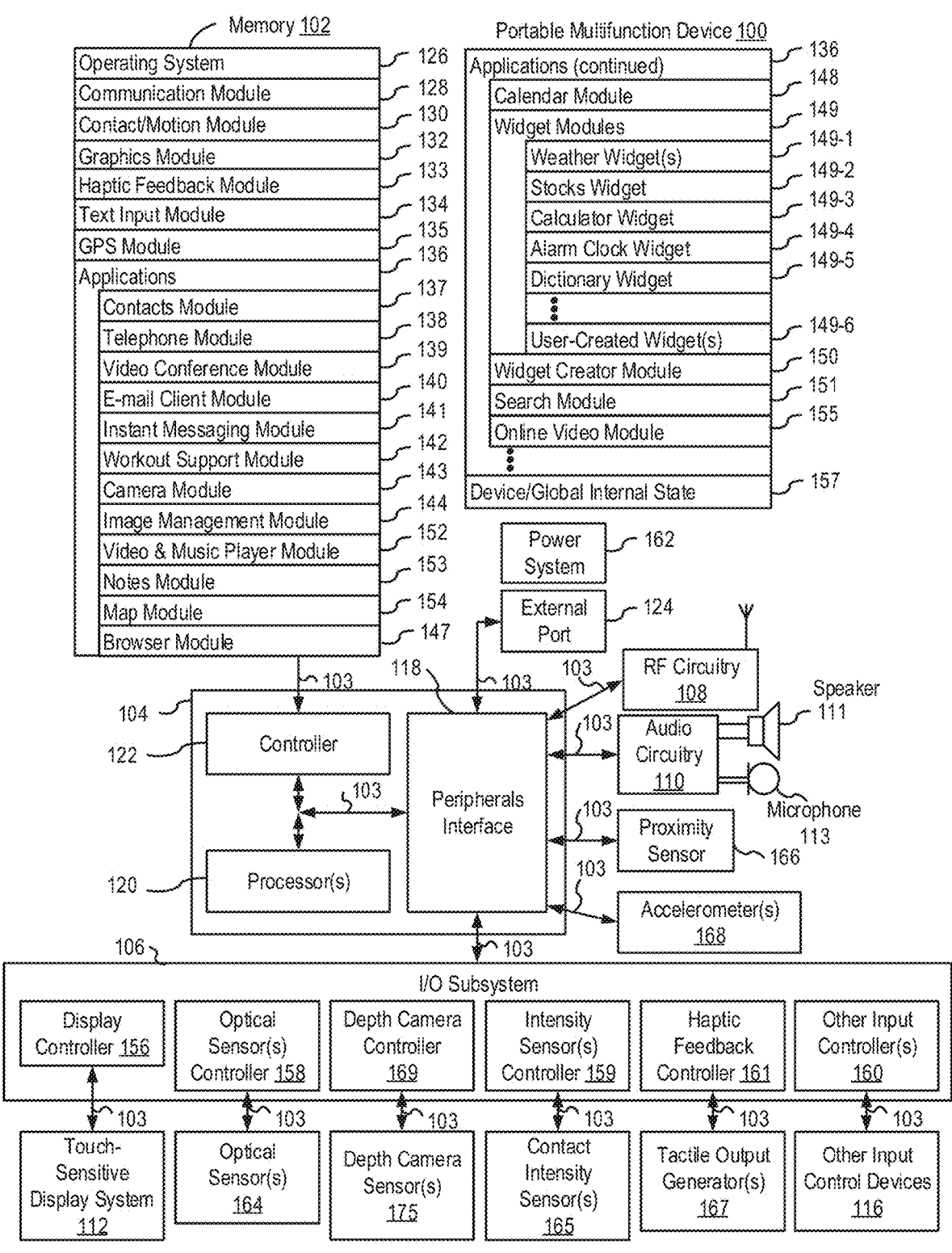
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing passwords. For example, there is a need for electronic devices that can be used to quickly and efficiently configure a one-time password generator and/or electronic devices that can quickly and efficiently enter a one-time password for use in authenticating a user to a remotely-authenticated service. As another example, there is a need for electronic devices that can quickly and efficiently enable a user to create and submit account credentials for use in authenticating the user to a remotely-authenticated service. Such techniques can reduce the cognitive burden on a user who accesses and/or utilizes passwords, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing passwords. FIGS. 6A-6M illustrate exemplary user interfaces for configuring and/or entering a one-time password. FIG. 7 is a flow diagram illustrating methods of configuring and/or entering a one-time password in accordance with some embodiments. The user interfaces in FIGS. 6A-6M are used to illustrate the processes described below, including the processes in FIG. 7. FIGS. 8A-8K illustrate exemplary user interfaces for creating and submitting account credentials for use in authenticating a user to a remotely-authenticated service. FIG. 9 is a flow diagram illustrating methods of creating and submitting account credentials for use in authenticating a user to a remotely-authenticated service in accordance with some embodiments. The user interfaces in FIGS. 8A-8K are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, increasing a security of an electronic device, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
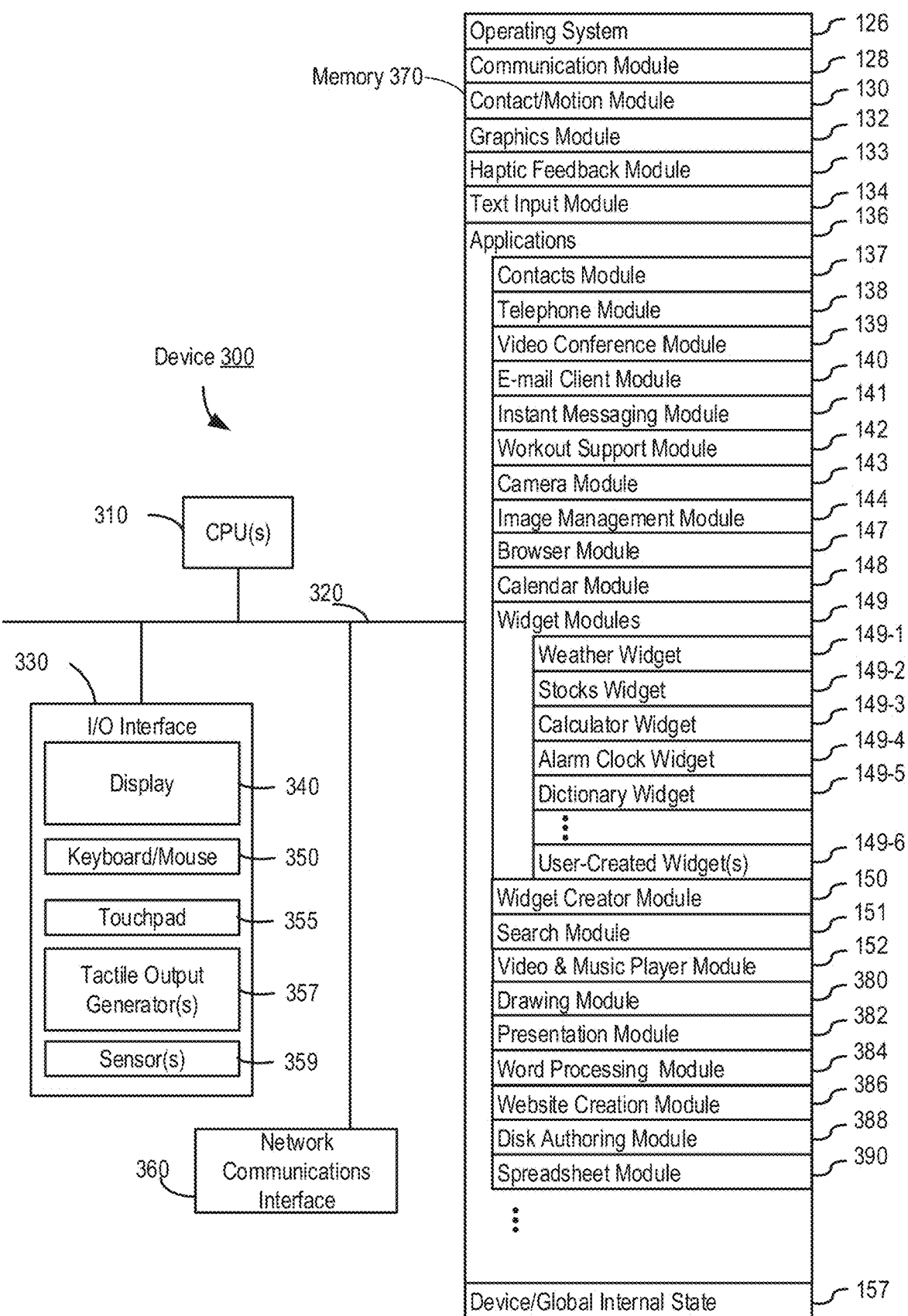
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
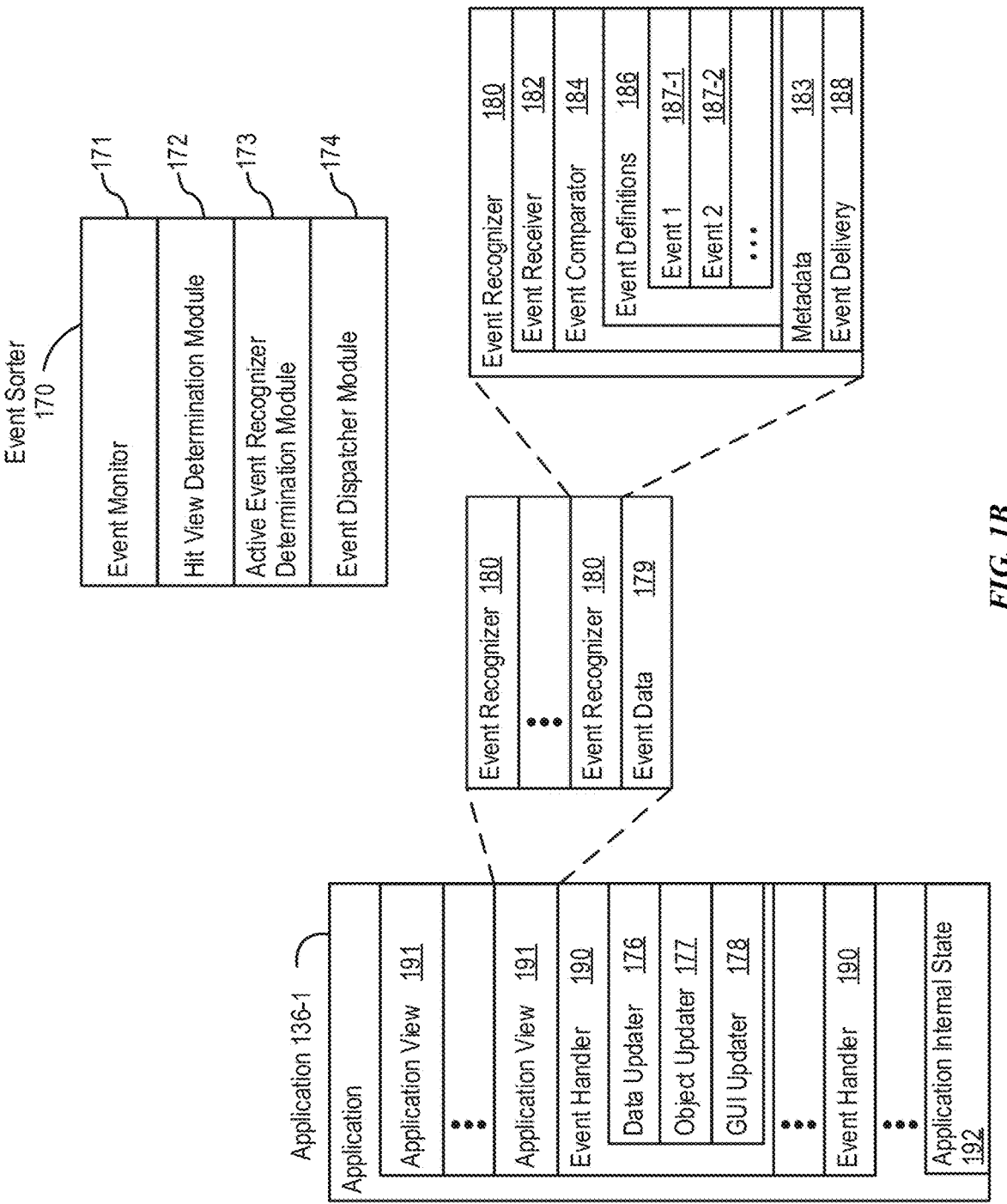
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
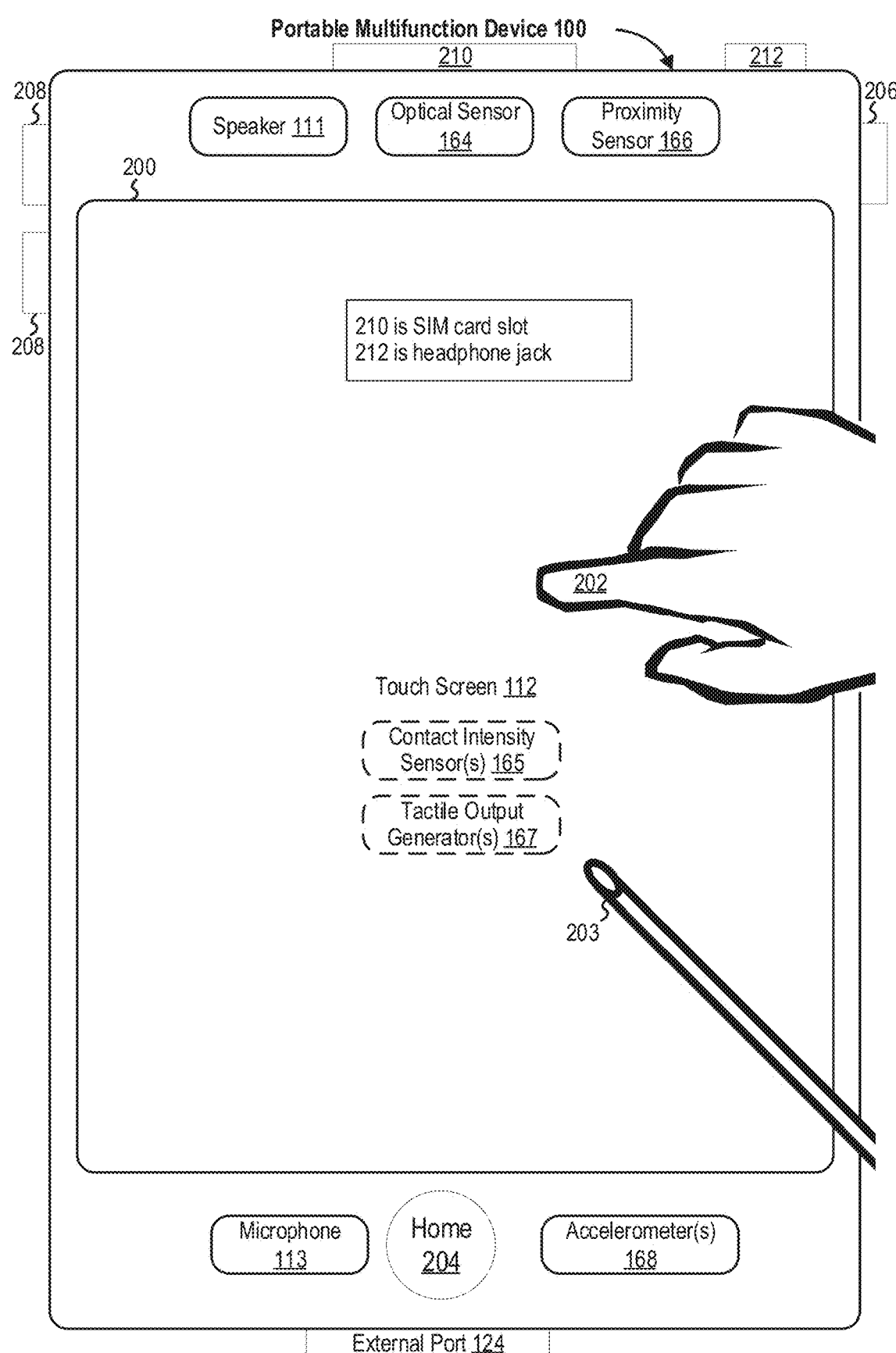
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
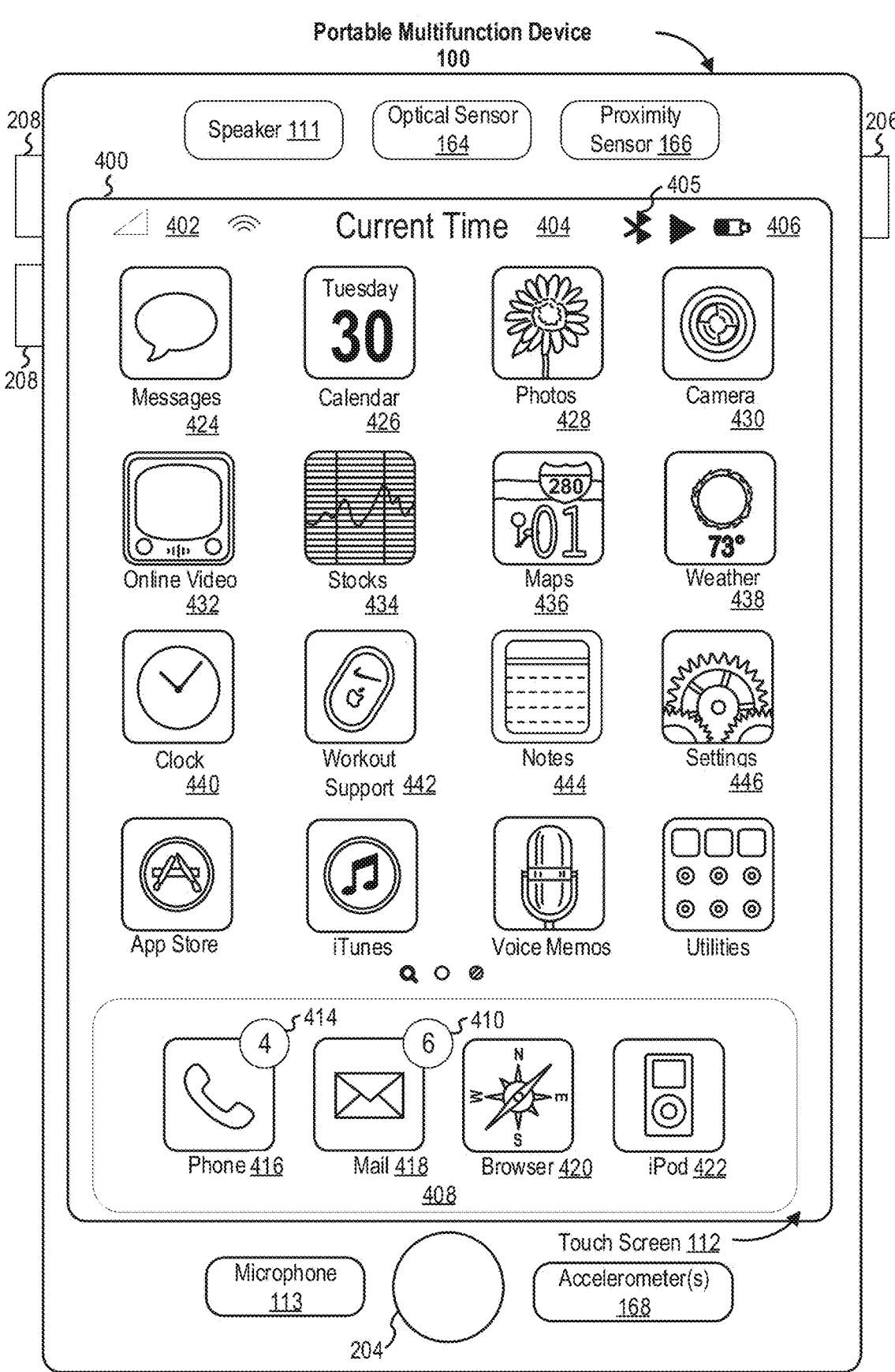
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
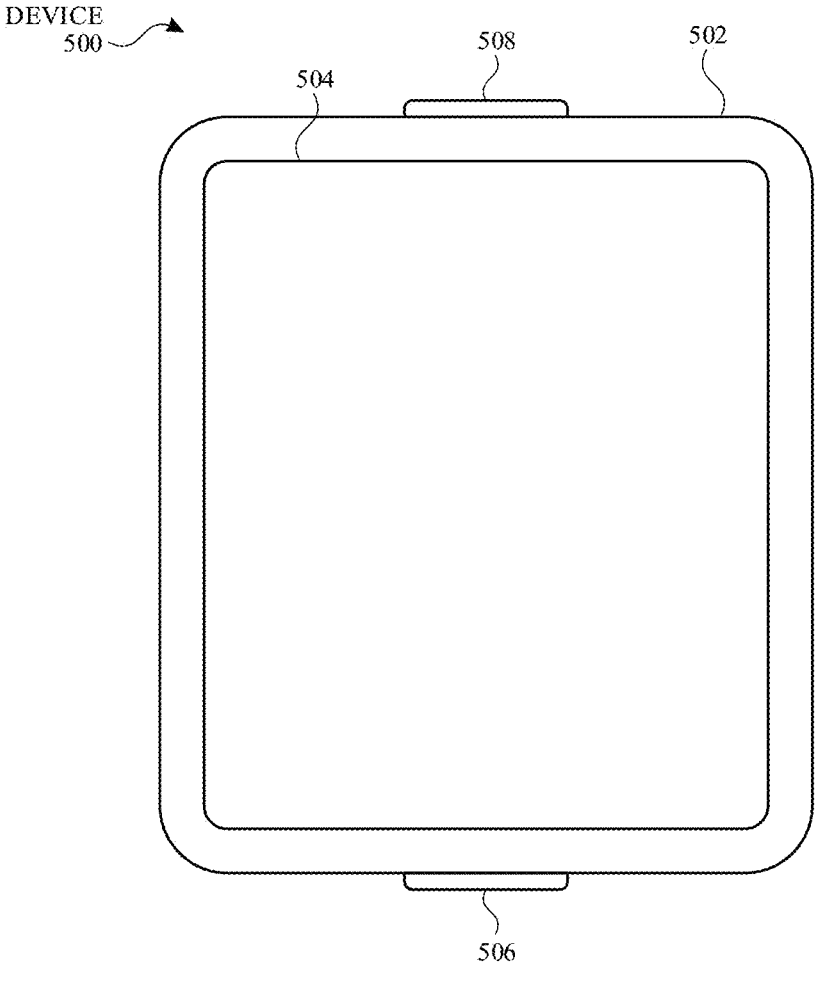
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
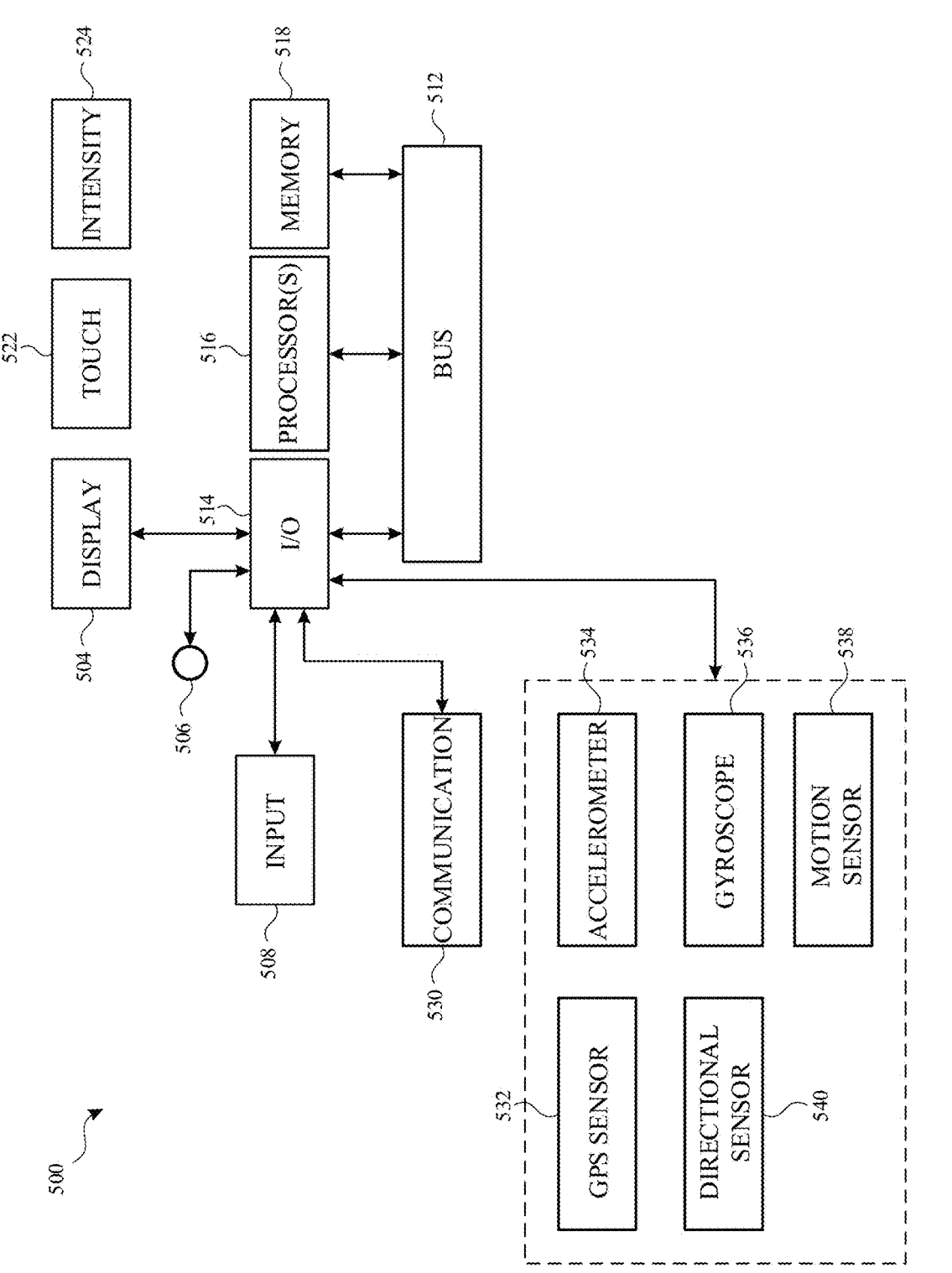
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for configuring and/or entering a one-time password, in accordance with some embodiments. The user interfaces in these figures are used to illustrate the processes described below, including the processes in FIG. 7.

Figure 6A:
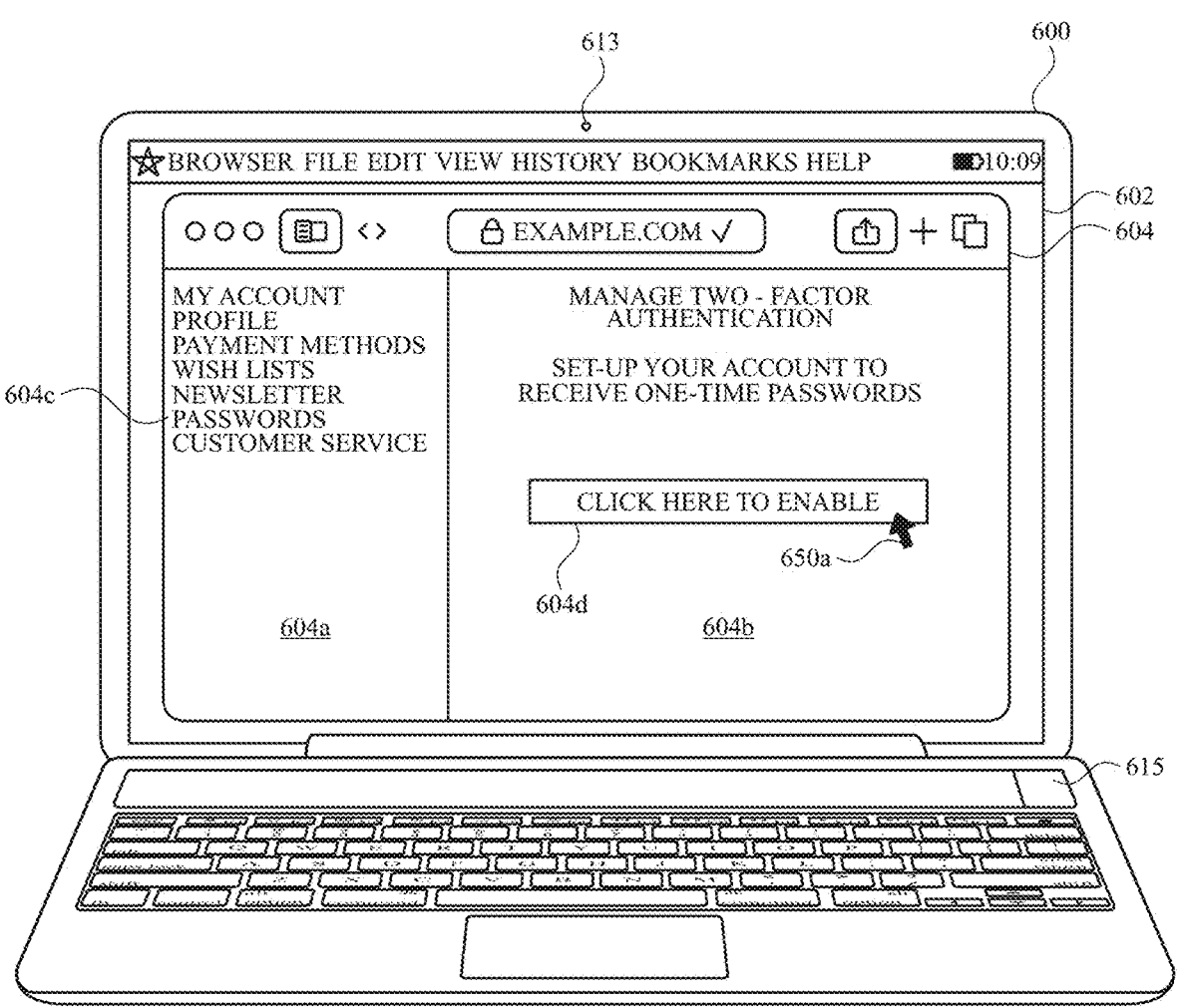
FIGS. 6A-6M illustrate exemplary user interfaces for configuring and/or entering a one-time password, in accordance with some embodiments.

FIG. 6A illustrates electronic device 600 displaying, on display 602, browser user interface 604 corresponding to a website (e.g., 'example.com'). Electronic device 600 has received and/or detected one or more user inputs that sign a user of electronic device 600 into an account of the website (e.g., a remotely-authenticated service). At FIG. 6A, browser user interface 604 includes settings options region 604a and multi-factor authentication region 604b. Settings options region 604a corresponds to one or more settings for the account associated with the user of electronic device 600. For instance, in some embodiments, electronic device 600 can adjust and/or update a profile for the account associated with the user (e.g., in response to one or more user inputs corresponding to the 'Profile' option of settings options region 604a), add, authorize, and/or update available payment methods for the account associated with the user (e.g., in response to one or more user inputs corresponding to the 'Payment Methods' option of settings options region 604a), and/or modify password settings for the account associated with the user (e.g., in response to one or more user inputs corresponding to the 'Passwords' option of settings options region 604a). In some embodiments, electronic device 600 has detected user input corresponding to selection of passwords option 604c of settings options region 604a. After detecting user input corresponding to selection of passwords option 602c, electronic device 600 displays multi-factor authentication region 604b.

At FIG. 6A, multi-factor authentication region 604b corresponds to a setup process for configuring a multi-factor authentication setting for the account associated with the user of electronic device 600. In some embodiments, the multi-factor authentication setting provides enhanced security for the account associated with the user of electronic device 600. In some embodiments, when the multi-factor authentication setting is enabled, electronic device 600 (e.g., via communication with the website) prompts a user to input a first set of one or more credentials and a second set of one or more credentials in order to authorize the user of electronic device 600 with the website (e.g., authorize the user to log into the account). For example, in some embodiments, the first set of one or more credentials include a username (e.g., an email address and/or a non-email address) and/or a password corresponding to the account associated with the user of electronic device 600 and the second set of one or more credentials include a one-time password generated by a password generator (e.g., a password generator that is associated with the website).

In the embodiment of FIGS. 6A-6M, a one-time password includes a dynamic password (e.g., a password that changes after predefined intervals of time (e.g., every 10 seconds, every 20 seconds, every 30 seconds, every 45 seconds, and/or every 60 seconds)), a password that is valid for use in authenticating the user of electronic device 600 to the website and/or another remotely-authenticated service (e.g., a website, an application, a software program, a service, and/or an external computer system) for a limited time and/or for a limited number of login sessions and/or transactions, and/or a password that becomes invalid after use and/or after a predetermined period of time (e.g., after 10 seconds, after 20 seconds, after 30 seconds, after 45 seconds, and/or after 60 seconds). In some embodiments, the one-time password is generated via a password generator of electronic device 600 (e.g., software and/or an application installed on and/or included in electronic device 600). In some embodiments, the password generator generates the one-time password via an algorithm, such as an algorithm that employs a random variable, a user input, and/or contextual information (e.g., a current time) to generate the one-time password. In some embodiments, the password generator is configured to generate the one-time password that is valid for use in authenticating the user with a remotely-authenticated service within predefined intervals of time (e.g., every 10 seconds, every 20 seconds, every 30 seconds, every 45 seconds, and/or every 60 seconds). In some such embodiments, the one-time password generated by the password generator is valid for use in authenticating the user with the website and/or another remotely-authenticated service for the duration of the predefined interval of time (e.g., the one-time password can authenticate the user with the remotely-authenticated service starting at a first time corresponding to the beginning of the predefined interval of time and ending at a second time corresponding to the end of the predefined interval of time).

At FIG. 6A, multi-factor authentication region 604b includes enable user interface object 604d that, when selected via user input, initiates a process for setting up the password generator that generates the one-time password. At FIG. 6A, electronic device 600 detects user input 650a (e.g., a mouse click) corresponding to selection of enable user interface object 604d. In response to detecting user input 650a, electronic device 600 displays first setup user interface 606, as shown at FIG. 6B.

Figure 6B:
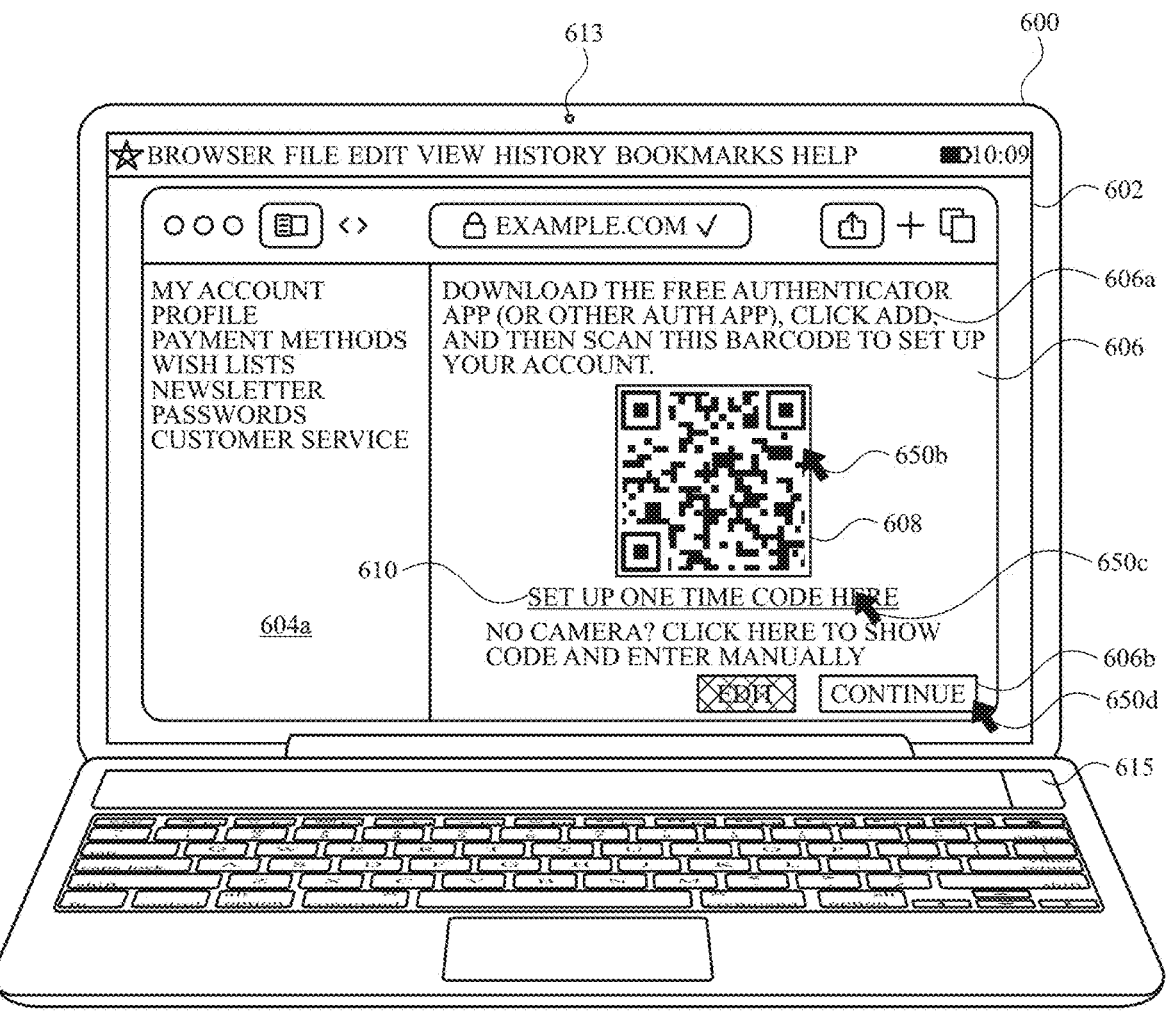

At FIG. 6B, first setup user interface 606 includes indicator 606a providing a visual indication of information and/or instructions for configuring a password generator that generates the one-time password, code 608, link 610, and continue user interface object 606b. In some embodiments, electronic device 600 is configured to setup a password generator for use in authenticating the user of electronic device 600 with the website in response to detecting various different types of user inputs (e.g., user input corresponding to code 608 and/or user input corresponding to link 610) and/or in response to receiving different types of data (e.g., image data corresponding to code 608 received from a camera and/or data associated with an authentication code).

At FIG. 6B, code 608 includes a quick response ('QR') code that is linked to the account associated with the user of electronic device 600. In other words, code 608 includes data associated with the website and/or an account of the website that enables a password generator to create one-time passwords that authenticate the user of electronic device 600 with the website. In some embodiments, electronic device 600 is configured to perform image analysis on code 608 (e.g., while code 608 is displayed on display 602) and detect data associated with code 608 to configure the password generator. As set forth below with reference to FIG. 6K, in some embodiments, a camera of external electronic device 640 can be utilized to detect code 608 and set up the password generator via external electronic device 640. External electronic device 640 can then communicate and/or transmit a one-time password generated by the password generator to electronic device 600.

At FIG. 6B, link 610 includes data associated with the website and/or an account of the website that enables a password generator to create one-time passwords that authenticate the user of electronic device 600 with the website. In some embodiments, link 610 includes data associated with a password manager of electronic device 600. In some embodiments, the password manager is an application and/or software that enables electronic device 600 to store credentials (e.g., usernames, email address, and/or passwords) corresponding to respective accounts for respective remotely-authenticated services. In some embodiments, the password manager includes one or more password generators that are associated with respective remotely-authenticated services and are configured to create one-time passwords that authenticate the user of electronic device 600 with the respective remotely-authenticated service. In some embodiments, electronic device 600 configures a password generator and associates the password generator with the website in response to selection of link 610. In some embodiments, link 610, itself, is not part of the website, and instead, link 610 is generated by an operating system of electronic device 600 based on the image analysis of code 608 and electronic device 600 displays link 610 on first setup user interface 606.

Figure 6C:
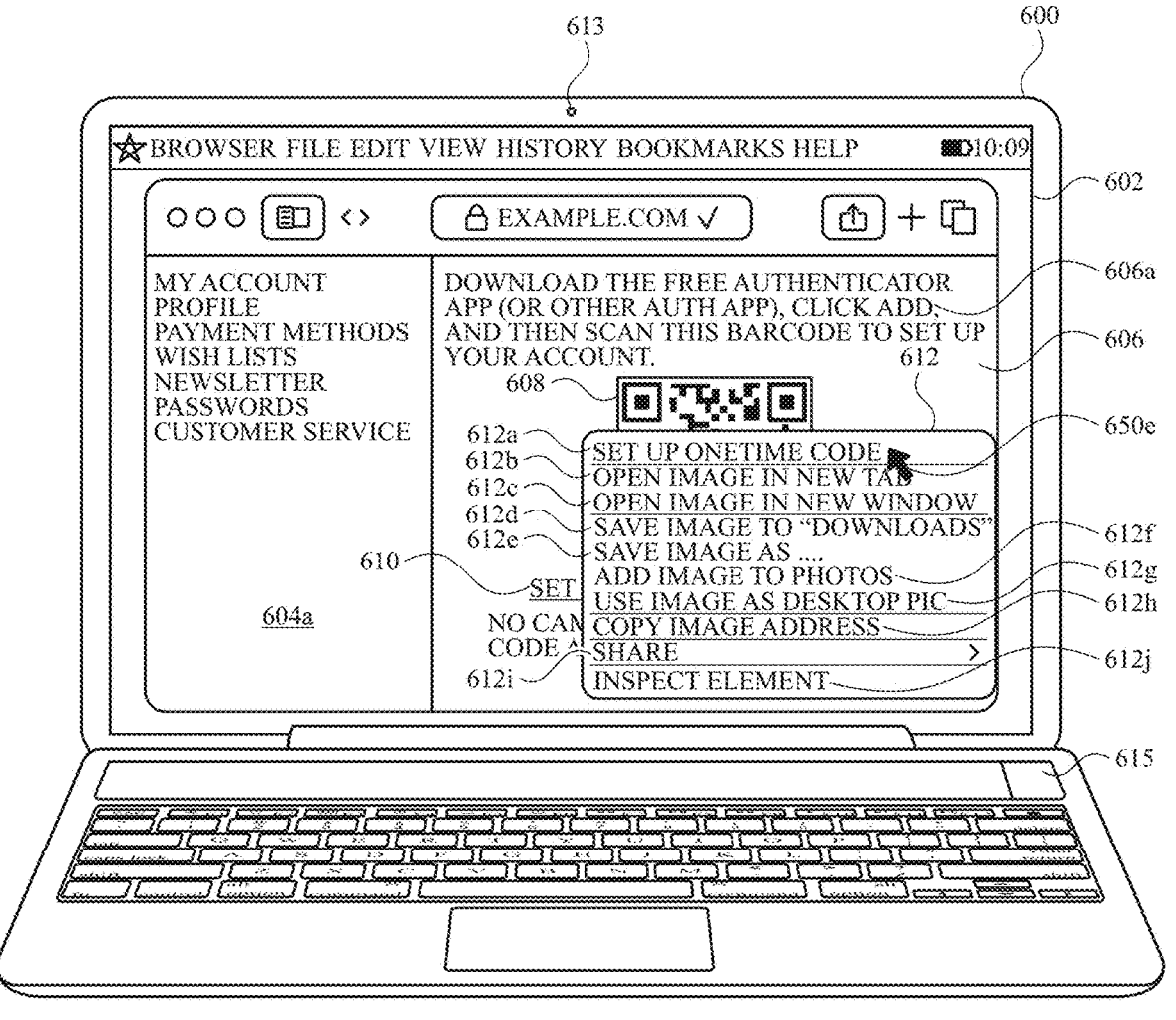
Figure 6D:
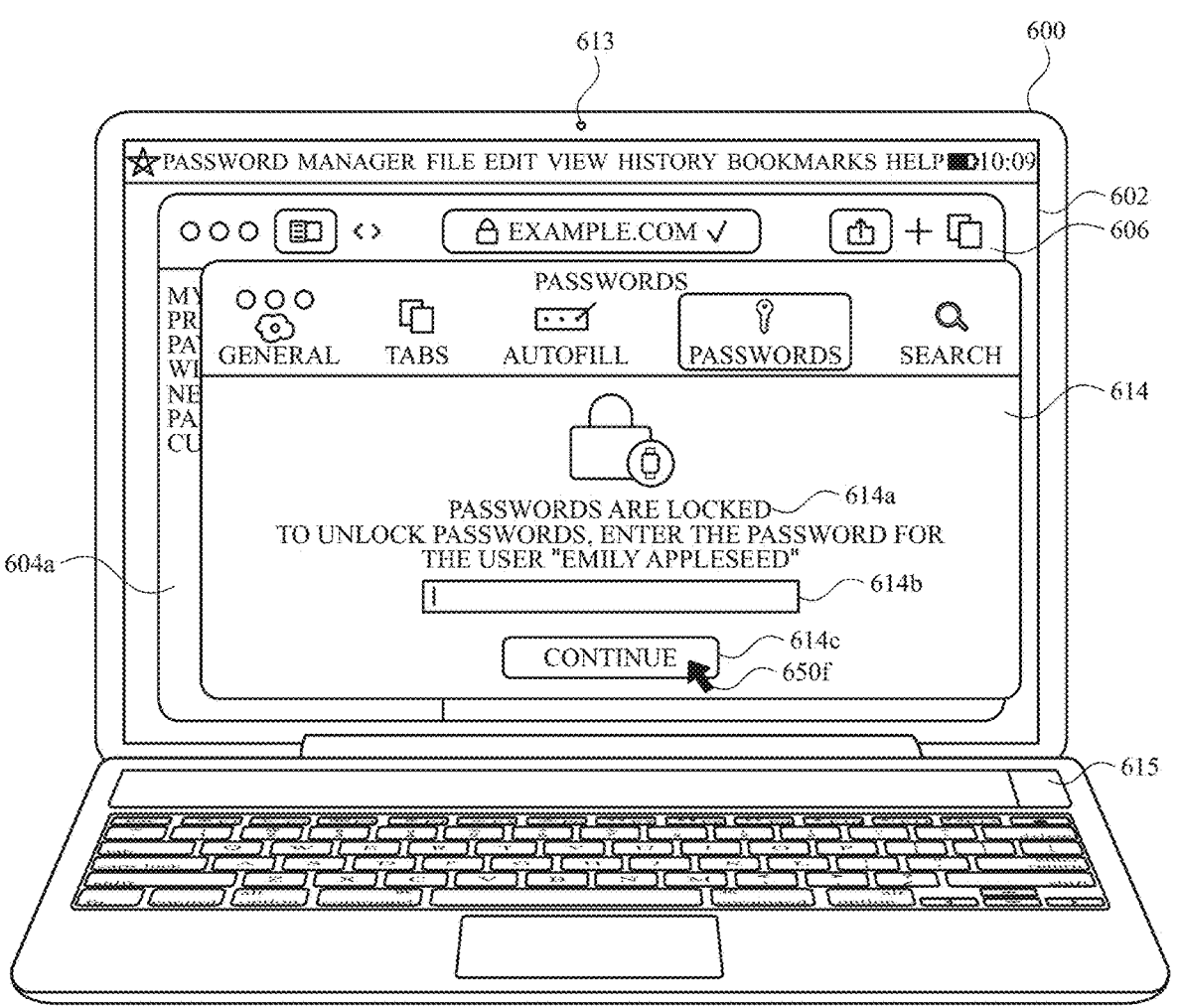
Figure 6E:
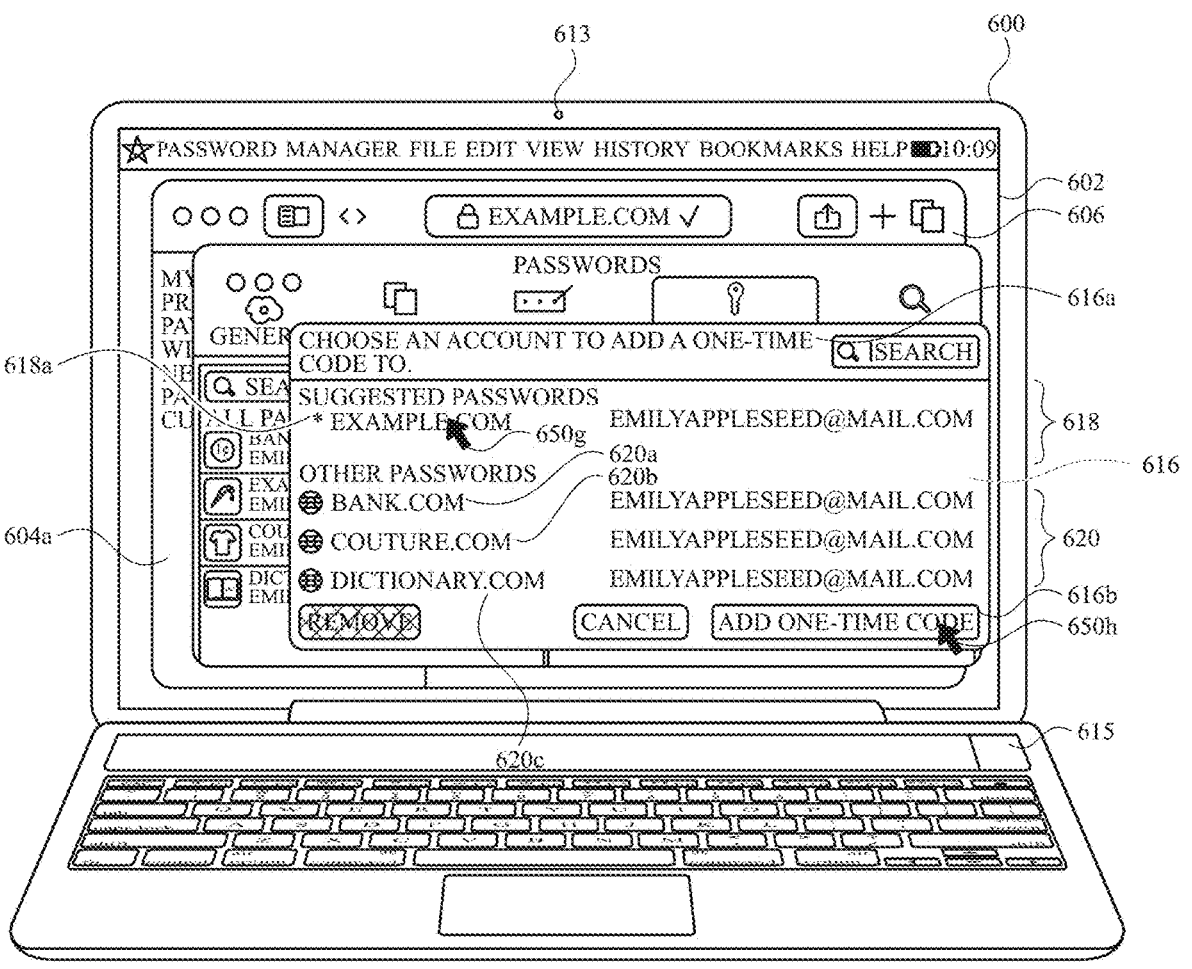
Figure 6F:
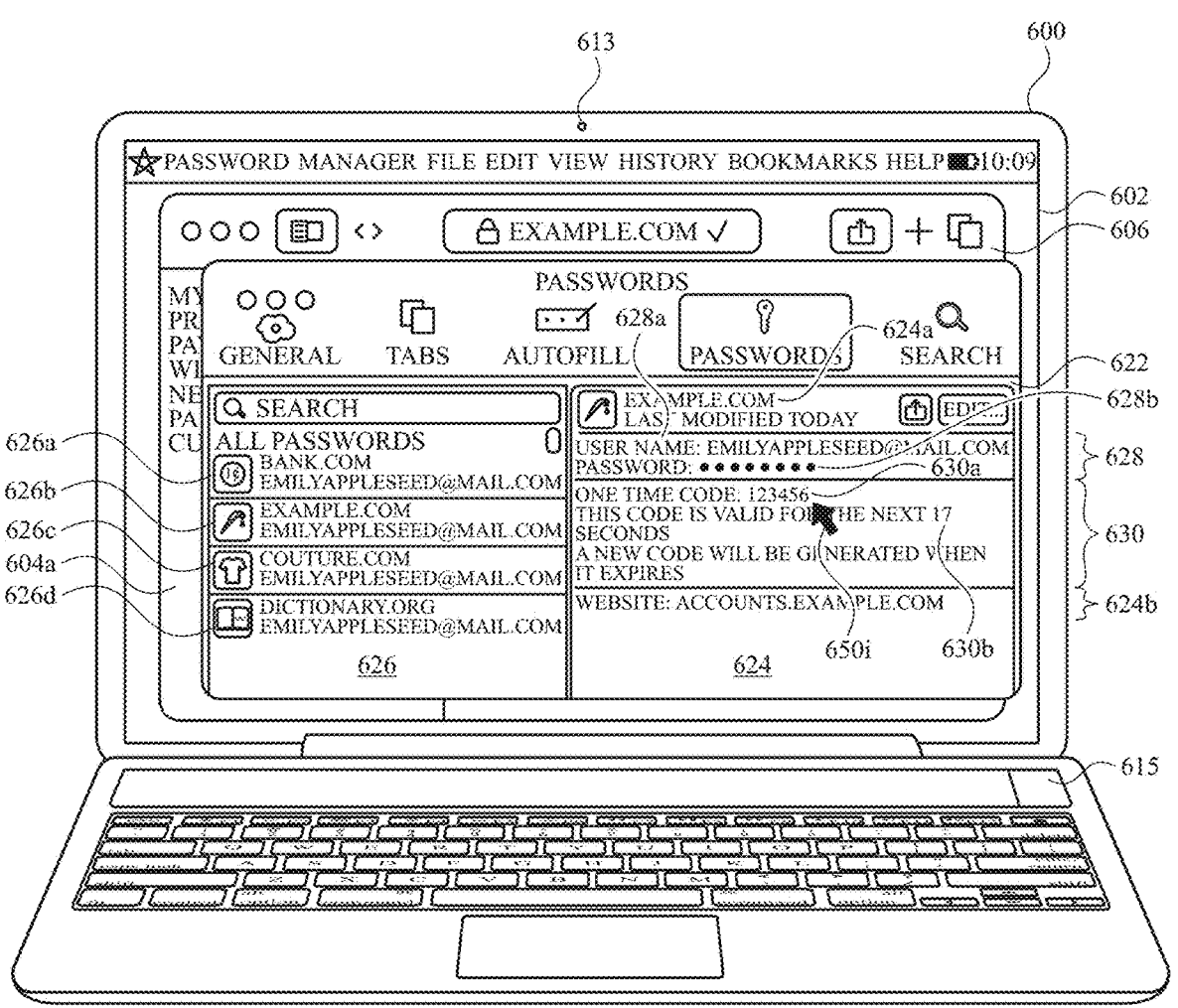

At FIG. 6B, electronic device 600 detects user input 650b (e.g., a right-click of a mouse and/or a double press gesture of a touchpad) corresponding to code 608. In response to detecting user input 650b, electronic device 600 displays menu user interface 612, as shown at FIG. 6C. Alternatively, electronic device 600 detects user input 650c (e.g., a mouse click) corresponding to selection of link 610. In response to detecting user input 650c, electronic device 600 displays first password manager user interface 614, as shown at FIG. 6D. As another alternative, electronic device 600 detects user input 650d (e.g., a mouse click) corresponding to continue user interface object 606b. In response to detecting user input 650d, electronic device 600 displays second setup user interface 646 for configuring the password generator via an authentication using external electronic device 640, as shown at FIG. 6L.

At FIG. 6C, electronic device 600 displays menu user interface 612 overlaid on first setup user interface 606. Menu user interface 612 includes selectable options 612a-612j for interacting with and/or otherwise causing electronic device 600 to perform an action associated with code 608. For example, in some embodiments, in response to detecting user input corresponding to selection of selectable option 612e, electronic device 600 is configured to save data corresponding to code 608 in memory of electronic device 600 and/or in memory accessible by electronic device 600 (e.g., a cloud-based memory).

At FIG. 6C, in response to performing image analysis on code 608 and determining that code 608 includes information associated with setting up a password generator for the website, electronic device 600 displays first selectable option 612a. First selectable option 612a corresponds to (e.g., includes data associated with) a password manager of electronic device 600 that includes a password generator (and/or is configured to include a password generator) that generates the one-time password for authenticating the user with the website. At FIG. 6C, electronic device 600 detects user input 650e (e.g., a mouse click) corresponding to selection of first selectable option 612a. In response to detecting user input 650e, electronic device 600 displays first password manager user interface 614, as shown at FIG. 6D.

In response to detecting user input 650c and/or user input 650e, electronic device 600 displays first password manager user interface 614. First password manager user interface 614 corresponds to an authentication user interface for verifying an identity of the user of electronic device 600. In some embodiments, electronic device 600 prompts a user to provide an authentication input that enables access to the password manager. Because the password manager includes sensitive information related to logging into and/or signing into various accounts, electronic device 600 displays first password manager user interface 614 to obtain verification of the user of electronic device 600, thereby increasing the security of electronic device 600.

At FIG. 6D, first password manager user interface 614 includes indicator 614a that includes a visual indication of information and/or instructions for verifying an identity of the user of electronic device. First password manager user interface 614 includes password user interface object 614b for entry of a password for accessing the password manager of electronic device 600 and continue user interface object 614c. In some embodiments, in addition to and/or instead of password user interface object 614b, electronic device 600 prompts a user to provide a biometric feature, such as one or more facial features within a field of view of camera 613 of electronic device 600 and/or a fingerprint on fingerprint sensor 615 of electronic device 600. In some embodiments, electronic device 600 displays password user interface object 614b in accordance with a determination that the biometric feature received via the camera and/or fingerprint sensor of electronic device 600 does not match biometric feature data corresponding to an authenticated user of electronic device 600.

At FIG. 6D, electronic device 600 detects one or more user inputs corresponding to entry of the password for accessing the password manager of electronic device 600. After receiving the one or more user inputs corresponding to entry of the password, electronic device 600 detects user input 650f (e.g., a mouse click) corresponding to selection of continue user interface object 614c. In response to detecting user input 650f and in accordance with a determination that the entered password matches a stored password for accessing the password manager, electronic device 600 displays second password manager user interface 616, as shown in FIG. 6E. In some embodiments, in response to detecting a biometric feature, via camera 613 and/or fingerprint sensor 615 of electronic device 600, and in accordance with a determination that the detected biometric feature matches biometric feature data associated with an authenticated user of electronic device 600, electronic device 600 displays second password manager user interface 616 (e.g., with or without detecting user input 650f).

At FIG. 6E, second password manager user interface 616 includes indicator 616a that provides a visual indication of information and/or instructions for configuring the password generator that generates the one-time password for authenticating a user with the website. Second password manager user interface 616 includes suggested accounts region 618 and other accounts region 620. At FIG. 6E, electronic device 600 detects that code 608 and/or link 610 includes information associated with a particular remotely-authenticated service (e.g., the website 'example.com') and determines that the password manager includes stored credentials for the particular remotely-authenticated service (e.g., the website 'example.com'). In accordance with the determination that the password manager includes stored credentials for the remotely-authenticated service associated with code 608 and/or link 610, electronic device 600 displays suggested account user interface object 618a in suggested accounts region 618.

Other accounts region 620 includes account user interface objects 620a-620c corresponding to accounts for respective remotely-authenticated services that are not associated with code 608 and/or link 610. In some embodiments, other accounts region 620 enables a user of electronic device 600 to select an account for a remotely-authenticated service when electronic device 600 does not display the corresponding account for the website (e.g., 'example.com') in suggested accounts region 618.

At FIG. 6E, electronic device 600 detects user input 650g (e.g., a mouse click) corresponding to selection of suggested account user interface object 618a. In response to detecting user input 650g, electronic device 600 selects suggested account user interface object 618a. At FIG. 6E, electronic device 600 detects user input 650h corresponding to selection of configure password generator user interface object 616b. In response to detecting user input 650h, electronic device 600 displays third password manager user interface 622, as shown in FIG. 6F. In some embodiments, when electronic device 600 determines that the password manager includes an account for the remotely-authenticated service associated with code 608 and/or link 610, electronic device 600 forgoes displaying second password manager user interface 616 and displays third password manager user interface 622 (e.g., without detecting user input 650g and/or user input 650h).

At FIG. 6F, third password manager user interface 622 includes account region 624 corresponding to information about an account for the website (e.g., 'example.com') that is included in (e.g., stored and/or accessible by) the password manager. Third password manager user interface 622 includes other accounts region 626 having account user interface objects 626a-626d corresponding to accounts for respective remotely-authenticated services that are included in the password manager. In some embodiments, in response to detecting user input corresponding to account user interface object 626a, electronic device 600 displays information associated with an account for the website 'Bank.com' in account region 624 (e.g., instead of displaying information about the account for the website 'example.com' in account region 624).

Account region 624 includes remotely-authenticated service indicator 624a, account information region 628, password generator region 630, and additional information region 624b. At FIG. 6F, account information region 628 includes username indicator 628a and password indicator 628b corresponding to a username and password, respectively, that can be used to authenticate the user with the website 'example.com' (e.g., sign into and/or log into an account for the website 'example.com'). At FIG. 6F, password indicator 628b includes a representation of a password (e.g., dots) without displaying characters and/or symbols of the password to provide increased security (e.g., an unauthorized person viewing display 602 cannot see the user's password). In some embodiments, password indicator 628b includes display of the full and/or actual characters and/or symbols of the password.

Password generator region 630 corresponds to a password generator of the password manager that generates the one-time password for use in authenticating the user of electronic device 600 with the website (e.g., 'example.com'). Password generator region 630 includes one-time password indicator 630a and timer indicator 630b. Password indicator 630a corresponds to the one-time password that can be utilized to authenticate the user of electronic device 600 to the website at the current time. Timer indicator 630b corresponds to an amount of time (e.g., starting from the current time) for which the one-time password represented by password indicator 630a is valid for use in authenticating the user of electronic device 600 to the website. In some embodiments, electronic device 600 displays an updated one-time password in password indicator 630a after the amount of time indicated in timer indicator 630b lapses. The updated one-time password can then be utilized for a new period of time indicated by timer indicator 630b for use in authenticating the user of electronic device 600 to the website.

At FIG. 6F, electronic device 600 detects user input 650i (e.g., a mouse click) corresponding to selection of password indicator 630a. In response to detecting user input 650i, electronic device 600 copies (e.g., temporarily saves data corresponding to) the one-time password represented by password indicator 630a, which electronic device 600 can then paste into a one-time password entry field in response to detecting one or more user inputs corresponding to the one-time password entry field.

Figure 6G:
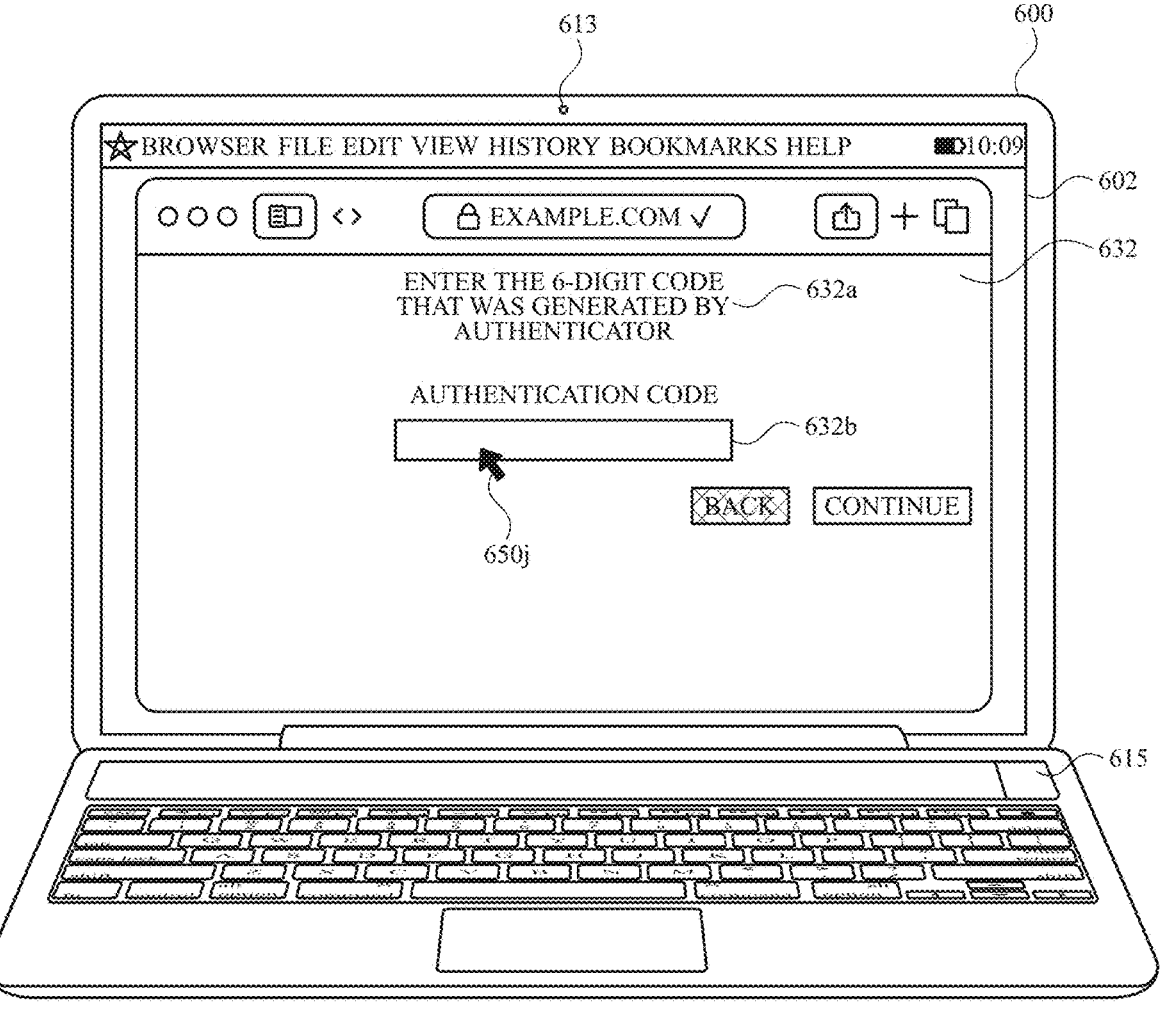

At FIG. 6G, electronic device 600 has detected one or more user inputs causing electronic device 600 to navigate from the password manager (e.g., third password manager user interface 622) to the browser application to authenticate the user with the website. After detecting the one or more user inputs, electronic device 600 displays authentication user interface 632 of the website (e.g., 'example.com'). Authentication user interface 632 prompts a user to enter the one-time password generated by the password generator of the password manager. Authentication user interface 632 includes indicator 632a providing a visual indication of information and/or instructions about authenticating the user of electronic device with the website. Authentication user interface 632 includes one-time password user interface object 632b for entry of the one-time password.

At FIG. 6G, electronic device 600 detects user input 650j (e.g., a mouse click) corresponding to selection of one-time password user interface object 632b. In response to detecting user input 650j, electronic device 600 displays autofill user interface object 634, as shown at FIG. 6H.

Figure 6H:
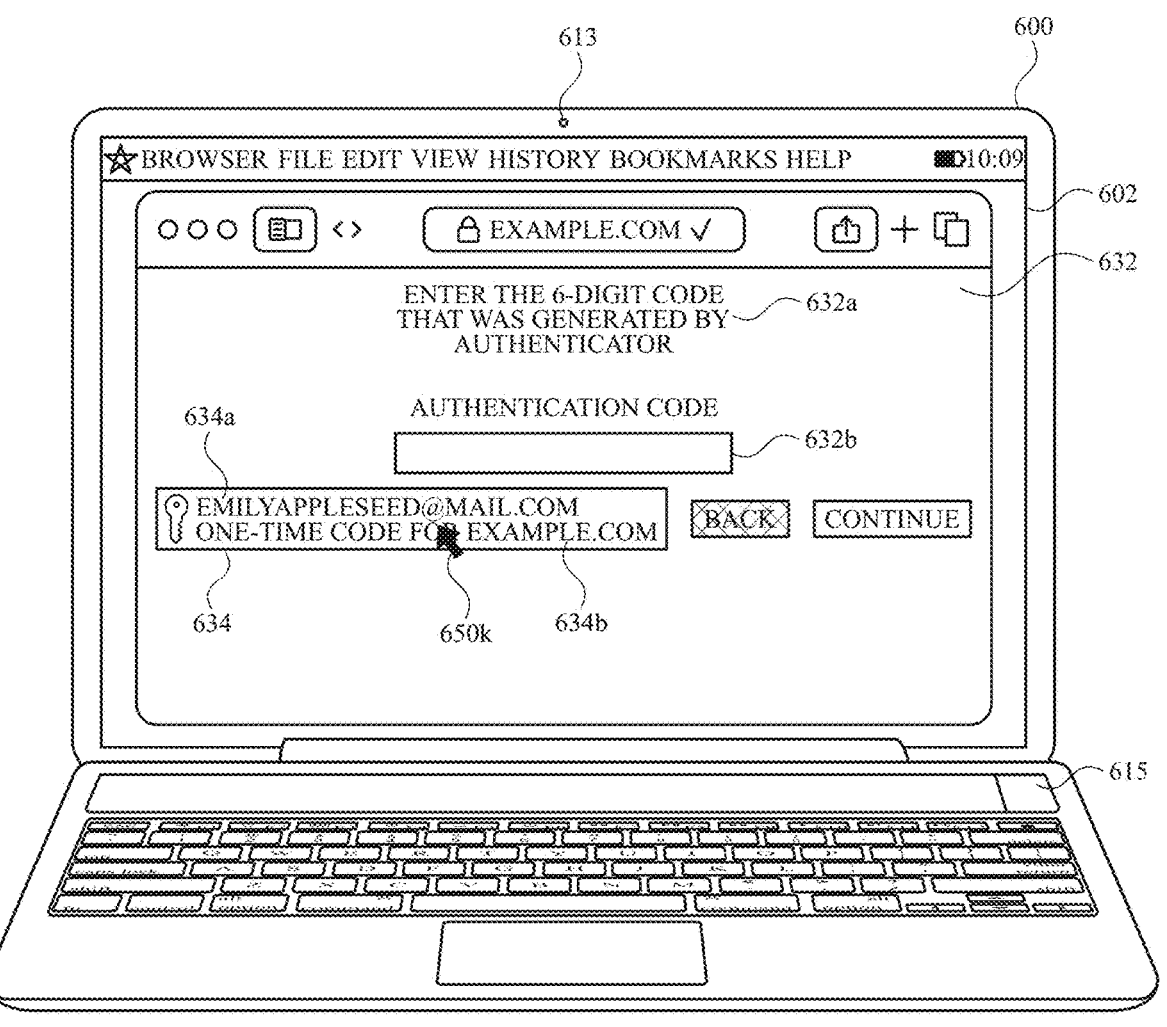

At FIG. 6H, autofill user interface object 634 corresponds to the one-time password (e.g., as indicated by password indicator 630a). Autofill user interface object 634 includes username indicator 634a and remotely-authenticated service indicator 634b. Username indicator 634a and remotely-authenticated service indicator 634b provide the user of electronic device 600 with visual confirmation that autofill user interface object 634 corresponds to the one-time password for the use in authenticating the user with the website 'example.com.' At FIG. 6H, autofill user interface object 634 does not display and/or include the one-time password and/or a timer associated with a period of time that the one-time password is valid for use in authenticating the user of electronic device 600 with the website. In some embodiments, displaying autofill user interface object 634 without the one-time password and/or the timer reduces an amount of processing power required by electronic device 600.

In some embodiments, autofill user interface object 634 corresponds to the one-time password that is valid at the current time based on the timer associated with the one-time password (e.g., the current time when electronic device 600 is displaying autofill user interface object 634 and/or a current time when electronic device 600 detects user input selecting autofill user interface object 634). In other words, when a first one-time password associated with a first predefined time interval is no longer valid for use in authenticating the user with the website (e.g., the first predefined time interval associated with the timer expires), electronic device 600 associates autofill user interface object 634 with a second one-time password associated with a second predefined time interval that is valid for use at the current time for authenticating the user with the website. In some embodiments, electronic device 600 enters the one-time password that is valid for use in authenticating the user with the website at a time when electronic device 600 detects user input corresponding to autofill user interface object 634.

Figure 6I:
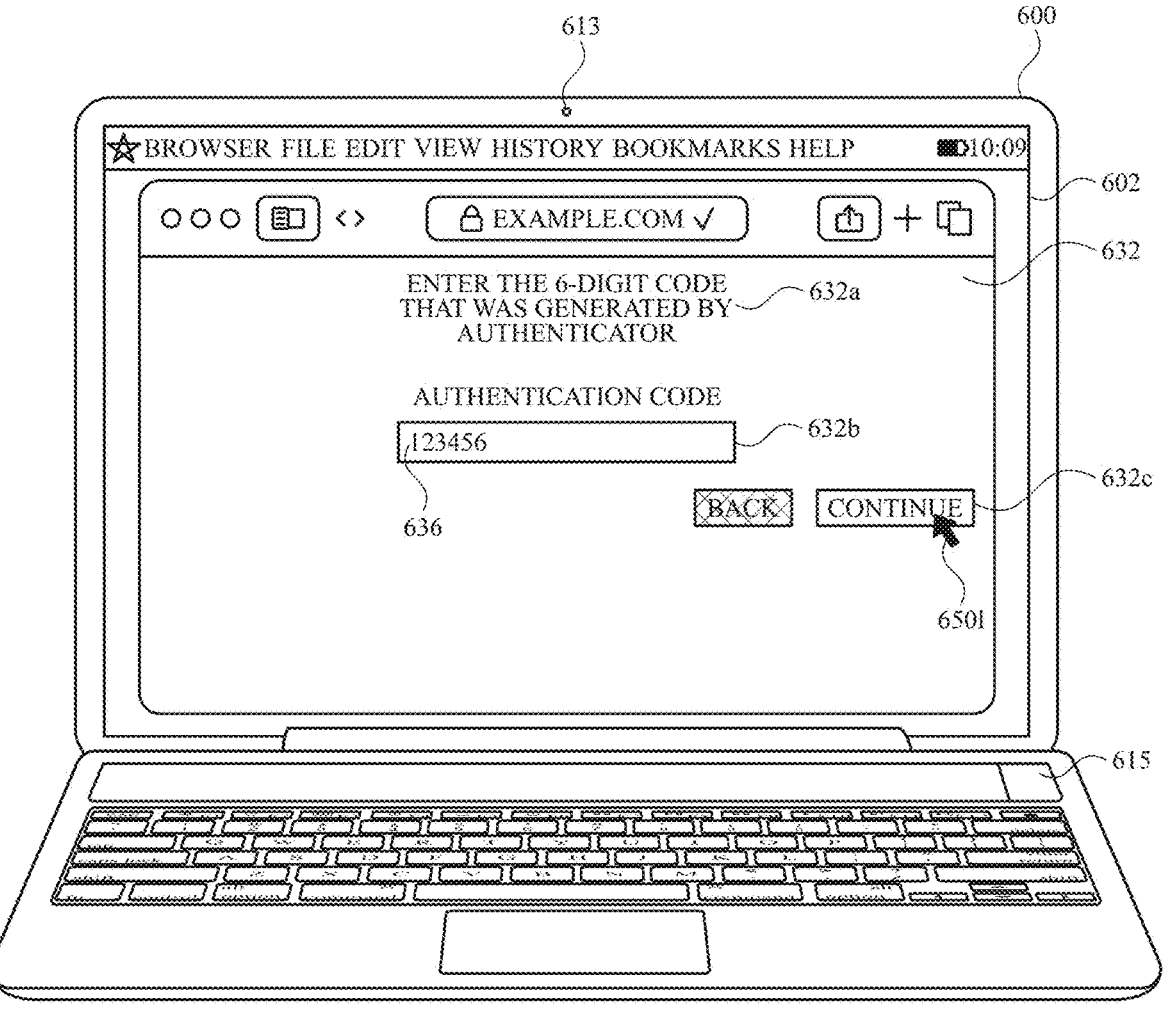

At FIG. 6H, electronic device 600 detects user input 650k (e.g., a mouse click) corresponding to selection of autofill user interface object 634. In response to detecting user input 650k, electronic device 600 enters and/or inputs one-time password 636 into one-time password user interface object 632b, as shown at FIG. 6I. In some embodiments, electronic device 600 is configured to paste one-time password 636 into one-time password user interface object 632b in response to a right mouse click on one-time password user interface object 632b when electronic device 600 copies one-time password in response to user input 650i.

At FIG. 6I, electronic device 600 displays one-time password 636 in one-time password user interface object 632b. One-time password 636 corresponds to the one-time password that is valid for use in authenticating the user with the website at approximately (e.g., within 1 second and/or within 2 seconds) the time when electronic device 600 detects user input 650k. One-time password user interface object 632b includes display of the actual characters and/or symbols associated with one-time password 636 to provide the user of electronic device 600 with visual confirmation that one-time password 636 has been entered into one-time password user interface object 632*b*.

In some embodiments, electronic device 600 autosubmits one-time password 636 in response to detecting user input 650*k* (and without detecting additional user input) to initiate the process for authenticating the user with the website. In some embodiments, electronic device 600 autosubmits one-time password 636 in response to detecting user input 650*k* (and without detecting additional user input) when electronic device 600 detects that authentication user interface 632 does not include any additional entry fields and/or user interface objects that have not been interacted with and/or filled (e.g., via user input and/or via electronic device 600 autofilling). In some embodiments, electronic device 600 submits one-time password to initiate the process for authenticating the user with the website in response to detecting user input 650*l* (e.g., a mouse click) corresponding to selection of continue user interface object 632*c* of authentication user interface 632 (e.g., after detecting user input 650*k* selecting autofill user interface object 634).

Figure 6J:
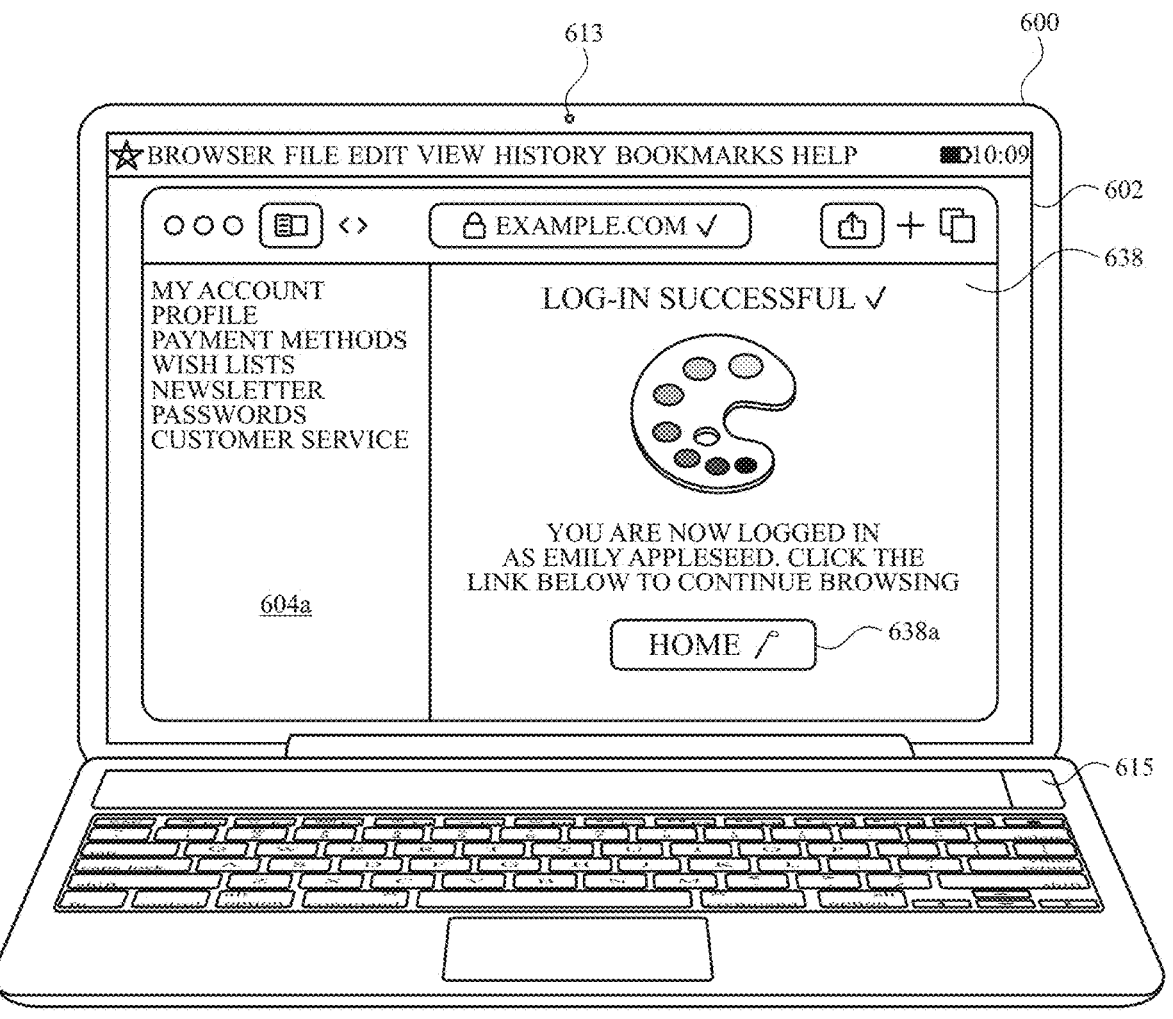

In response to submitting one-time password 636 and in response to receiving an indication that one-time password 636 successfully authenticated the user with the website (e.g., 'example.com'), electronic device 600 displays log-in user interface 638, as shown at FIG. 6J. At FIG. 6J, log-in user interface 638 confirms that one-time password 636 successfully authenticated the user of electronic device 600 to the website (e.g., 'example.com') and signed the user into an account of the website. In some embodiments, log-in user interface 638 includes home user interface object 638*a* that, when selected via user input, causes electronic device 600 to navigate to a home page of the website 'example.com.'

As set forth above, in some embodiments, the password generator of the password manager can be configured using an external electronic device that is associated with electronic device 600 (e.g., logged into and/or signed into the same account associated with the password manager as electronic device 600). For instance, at FIG. 6K, electronic device 600 is displaying first setup user interface 606, which includes code 608. At FIG. 6K, external electronic device 640 is displaying, on display 640*a*, camera user interface 642 corresponding to a camera application of external electronic device 640. Camera user interface 642 includes field of view representation 642*a* and capture user interface object 642*b*. Field of view representation 642*a* includes a visual representation of an area within a field of view of a camera of external electronic device 640. At FIG. 6K, code 608 is displayed within field of view representation 642*a*, such that external electronic device 640 is configured to detect code 608. In some embodiments, external electronic device includes one or more features of devices 100, 300, and/or 500.

Figure 6K:
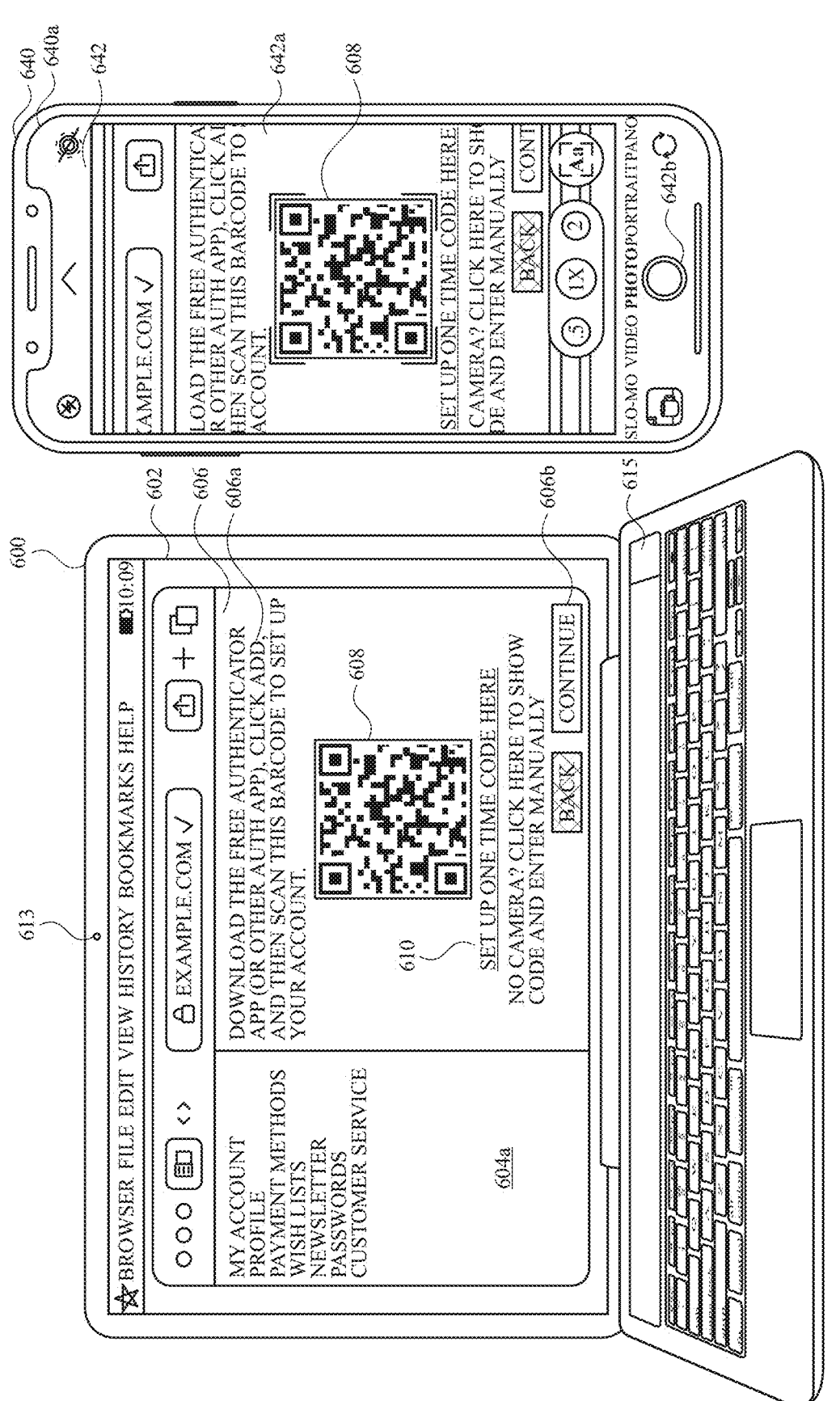
Figure 6L:
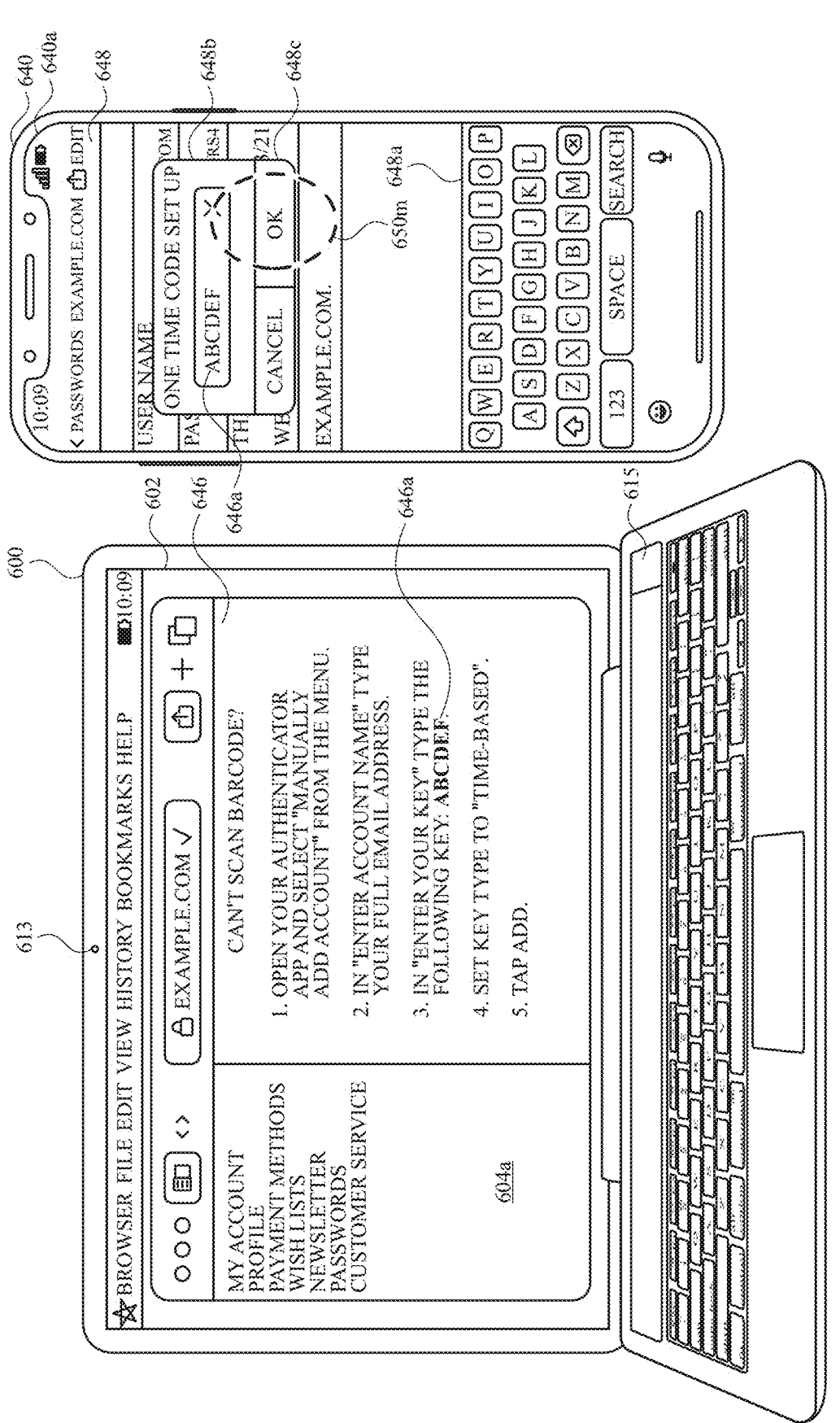
Figure 6M:
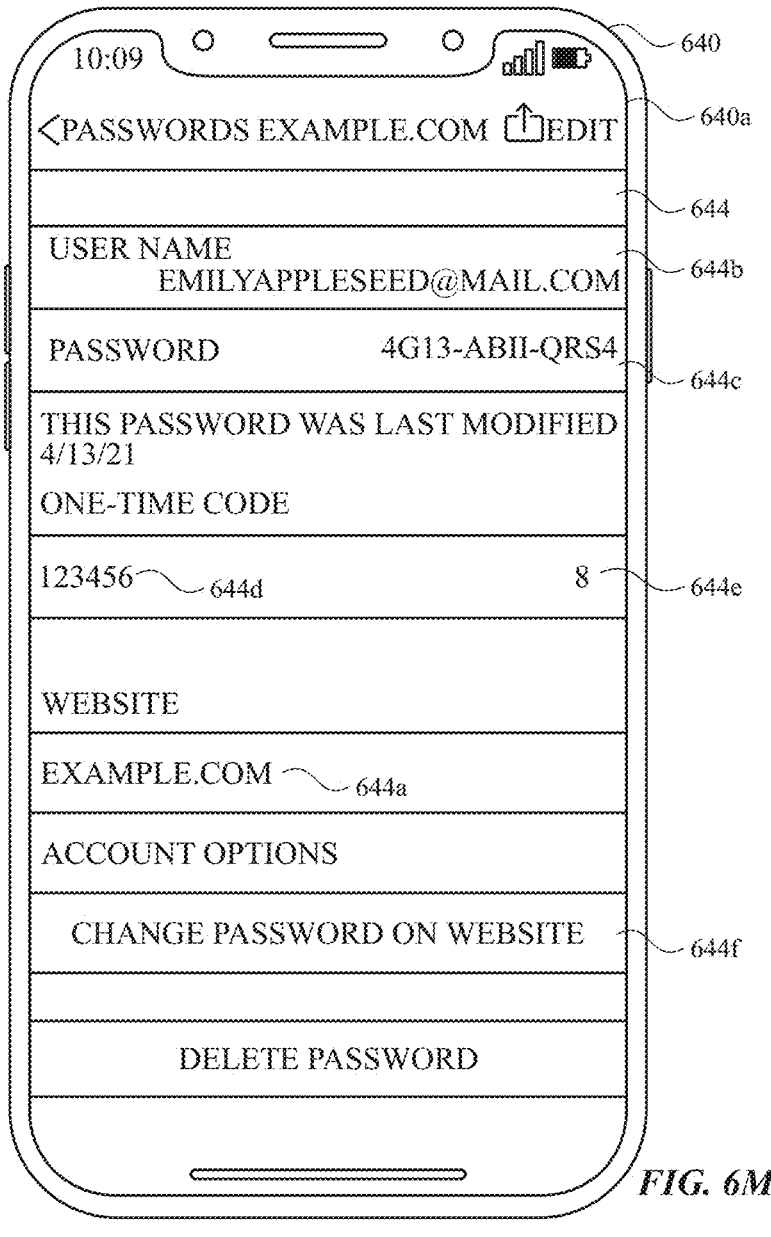

At FIG. 6K, external electronic device 640 detects code 608 within field of view representation 642*a* and, in response to detecting code 608, displays fourth password manager user interface 644, as shown in FIG. 6M.

As set forth above, in response to detecting user input 650*d*, electronic device 600 displays second setup user interface 646, as shown at FIG. 6L. At FIG. 6L, second setup user interface 646 corresponds to configuring the password generator without code 608 and/or link 610. Second setup user interface 646 includes authentication code 646*a*, which can be used to configure the password generator to create a one-time password for use in authenticating the user with the website.

At FIG. 6L, external electronic device 640 displays, on display 640*a*, fifth password manager user interface 648 for entry of authentication code 646*a*. In some embodiments, external electronic device 640 displays fifth password manager user interface 648 in response to a set of one or more user inputs causing external electronic device 640 to configure a password generator for a particular account of the password manager, where the particular account of the password manager is associated with the website. At FIG. 6L, external electronic device 640 has detected user input (e.g., one or more user inputs on keyboard 648*a* of fifth password manager user interface 648) corresponding to entry of authentication code 646*a*. As such, external electronic device 640 displays authentication code 646*a* in authentication code user interface object 648*b* of fifth password manager user interface 648. At FIG. 6L, external electronic device 640 detects user input 650*m* (e.g., a tap gesture) corresponding to selection of done user interface object 648*c* of fifth password manager user interface 648. In response to detecting user input 650*m*, external electronic device 640 receives authentication code 646*a* and associates a password generator of the password manager for use in authenticating the user with the website (e.g., 'example.com'). In some embodiments, authentication code 646*a* includes data associated with the website, such that the password generator generates the one-time password that authenticates the user of electronic device 600 and/or external electronic device 640 with the website. In response to detecting user input 650*m*, external electronic device 640 displays fourth password manager user interface 644, as shown at FIG. 6M.

At FIG. 6M, fourth password manager user interface 644 is associated with an account for the website 'example.com.' Fourth password manager user interface 644 includes remotely-authenticated service indicator 644*a*, username indicator 644*b*, password indicator 644*c*, one-time password indicator 644*d*, timer indicator 644*c*, and change password user interface object 644*f*. One-time password indicator 644*d* represents the one-time password that can be used to authenticate the user with the website 'example.com' at the current time. Timer indicator 644*e* provides a visual indication of an amount of time for which the one-time password is valid for use in authenticating the user with the website starting from the current time (e.g., the time at which external electronic device 640 displays fourth password manager user interface 644).

In some embodiments, electronic device 600 and external electronic device 640 are in communication with one another (e.g., wireless communication via a server), such that electronic device 600 and external electronic device 640 are associated with the same password manager, and thus, the same password generator. In some such embodiments, the one-time password indicated by one-time password indicator 644*d* of fourth password manager user interface 644 is the one-time password entered and/or submitted to the website via electronic device 600 in response to user input on autofill user interface object 634. As such, regardless of whether electronic device 600 or external electronic device 640 is used to configure the password generator, the one-time password generated by the password generator of the password manager can be used by both electronic device 600 and external device 640 to authenticate the user with the website.

FIG. 7 is a flow diagram illustrating a method for entering a one-time password using a computer system in accordance with some embodiments. Method 700 is performed at a computer system (e.g., 100, 300, 500, 600, 640, 800) (e.g., an electronic device; a smart device, such as a smartphone or a smartwatch; a mobile device; a wearable device; a desktop and/or laptop computer) that is in communication with a display generation component (e.g., 602, 640*a*, 802) and one or more input devices (e.g., a mouse, a keypad, a keyboard, a touchpad, and/or a touch-screen display). Some operations in method 700 are, optionally, combined, the orders of some operations are, optionally, changed, and some operations are, optionally, omitted.

As described below, method 700 provides an intuitive way for entering a one-time password. The method reduces the cognitive burden on a user for entering a onetime password, thereby creating a more efficient human-machine interface. For battery-operated computing devices, enabling a user to enter a one-time password faster and more efficiently conserves power and increases the time between battery charges.

The computer system (e.g., 600, 640, and/or 800) displays (702), via the display generation component (e.g., 602, 640*a*, and/or 802), a one-time password user interface object (e.g., 632*b*) (e.g., a text field configured to receive a set of characters (e.g., alphanumeric and/or symbol characters) (e.g., a one-time password ("OTP")) that is valid for use in an authentication for a limited time or limited number of login sessions and/or transactions (e.g., a dynamic password (e.g., a password that changes after predefined intervals of time), a password that becomes invalid after use and/or after a predetermined period of time) and/or a set of characters (e.g., alphanumeric and/or symbol characters) that is used for verification of a user in a multi-factor authentication process (e.g., a process that involves a first set of credentials (e.g., a username and password) and the OTP)). In some embodiments, the OTP is generated by an algorithm. In some embodiments, the algorithm employs a random variable, a user input, and/or contextual information (e.g., the current time) to generate the OTP. In some embodiments, the one-time password user interface object is displayed in the user interface of an application that requires authentication. In some embodiments, the one-time password user interface object is displayed in a webpage of a site that requires authentication.

The computer system (e.g., 600, 640, and/or 800), while displaying the one-time password user interface object (e.g., 632*b*), detects (704), via the one or more input devices (e.g., 602 and/or 640*a*), a user input (e.g., 650*j*) corresponding to selection of the one-time password user interface object (e.g., 632*b*) (e.g., a mouse click, a press and/or tap on a touchpad, a press gesture on a key of a keyboard, and/or a tap gesture on a touch-screen display).

In response to detecting the user input (e.g., 650*j*) corresponding to selection of the one-time password user interface object (e.g., 632*b*), the computer system (e.g., 600, 640, and/or 800) displays (706), via the display generation component (e.g., 602, 640*a*, and/or 802), an autofill user interface object (e.g., 634) (e.g., a user interface object displayed in a suggested content region and/or a quick-type region of a user interface that includes the one-time password user interface object) that, when selected via user input (e.g., 650*k*) (e.g., a mouse click, a press and/or tap on a touchpad, a press gesture on a key of a keyboard, and/or a tap gesture on a touch-screen display), enters (e.g., automatically populates) a one-time password (e.g., 636) (e.g., a dynamic password (e.g., a password that changes after predefined intervals of time), a password that becomes invalid after use and/or after a predetermined period of time; a of set of characters (e.g., alphanumeric and/or symbol characters) that is used for verification of a user in a multi-factor authentication process (e.g., a process that involves a first set of credentials (e.g., a username and password) and the OTP)) into the one-time password user interface object (e.g., 632*b*) (e.g., display the one-time password and/or a visual indicator of the one-time password in the one-time password user interface object), where the one-time password (e.g., 636) is generated via the computer system (e.g., 600, 640, and/or 800) (e.g., the computer system that displays the one-time password user interface object also generates the one-time password (e.g., in response to one or more user inputs)). In some embodiments, the OTP is generated by an algorithm. In some embodiments, the algorithm employs a random variable, a user input, and/or contextual information (e.g., the current time) to generate the OTP.

In some embodiments, the computer system generates the one-time password prior to detecting the user input. In some embodiments, the computer system generates the one-time password in response to detecting a request to generate the one-time password via a password manager. In some embodiments, the computer system generates the one-time password in response to detecting the user input. In some embodiments, the OTP is generated by an algorithm. In some embodiments, the algorithm employs a random variable, a user input, and/or contextual information (e.g., the current time) to generate the OTP.

Displaying the autofill user interface object in response to detecting the user input corresponding to selection of the one-time password user interface object enables a user to enter the one-time password into the one-time password user interface object without having to type and/or paste the one-time password, which reduces the number of inputs needed to perform an operation. In addition, displaying the autofill user interface object in response to detecting the user input corresponding to selection of the one-time password user interface object provides improved visual feedback that the one-time password has been generated and can be used for authentication with a remotely-authenticated service, which provides improved visual feedback.

In some embodiments, while the computer system (e.g., 600, 640, and/or 800) displays, via the display generation component (e.g., 602, 640*a*, and/or 802), the autofill user interface object (e.g., 634), the computer system (e.g., 600, 640, and/or 800) detects a second user input (e.g., 650*k*) corresponding to selection of the autofill user interface object (e.g., 634) (e.g., a mouse click, a press and/or tap on a touchpad, a press gesture on a key of a keyboard, and/or a tap gesture on a touch-screen display). In response to detecting the second user input (e.g., 650*k*) corresponding to selection of the autofill user interface object (e.g., 634), the computer system enters the one-time password (e.g., 636) into the one-time password user interface object (e.g., 632*b*) (e.g., displaying the one-time password and/or a visual indication of the one-time password in the one-time password user interface object). In accordance with a determination that a set of one or more auto-submission criteria are satisfied, the computer system (e.g., 600, 640, and/or 800) submits the one-time password (e.g., 636) to a remotely-authenticated service (e.g., 'example.com') (e.g., a website, an application, a software program, a service, and/or an external computer system) associated with the one-time password user interface object (e.g., 632*b*) (e.g., submitting a form associated with the one-time password user interface without additional user input in addition to the second user inputs to initiate a process for authenticating the one-time password with the remotely-authenticated service). In some embodiments, in response to the second input and in accordance with a determination that the set of one or more auto-submission criteria are not satisfied, forgoing submitting the one-time password to the remotely-authenticated service.

Submitting the one-time password to the remotely-authenticated service in response to detecting the second user input corresponding to selection of the autofill user interface object submits the one-time password without requiring additional user inputs, which reduces the number of inputs needed to perform an operation.

In some embodiments, the set of one or more auto-submission criteria include a criterion that is satisfied when the one-time password user interface object (e.g., 632*b*) is not displayed on a user interface (e.g., 632) of the remotely-authenticated service (e.g., 'example.com') (e.g., a website, an application, a software program, a service, and/or an external computer system) with one or more user interface objects of a first type (e.g., additional entry fields, fillable user interface objects, and/or control user interface objects that do not include an entry and/or have not been interacted with by a user) (e.g., one or more user interface objects of a first type that are displayed concurrently with the one-time password user interface object on the user interface of the remotely-authenticated service and/or one or more user interface objects of the first type that are included on the user interface of the remotely-authenticated service, but are not displayed concurrently with the one-time password user interface object (e.g., the user interface of the remotely-authenticated service can be scrolled by the computer system in response to detecting user input to display the one or more user interface objects of the first type)).

Submitting the one-time password to the remotely-authenticated service when the set of submission criteria is met ensures that the one-time password is submitted to the remotely-authenticated service with other required information and/or entries, which reduces the number of inputs needed to perform an operation and reduces the amount of time for authenticating a user of the computer system with the remotely-authenticated service.

In some embodiments, while the computer system (e.g., 600, 640, and/or 800) displays, via the display generation component (e.g., 602, 640*a*, and/or 802), the autofill user interface object (e.g., 634), the computer system (e.g., 600, 640, and/or 800) detects a third user input (e.g., 650*k*) corresponding to selection of the autofill user interface object (e.g., 634) (e.g., a mouse click, a press and/or tap on a touchpad, a press gesture on a key of a keyboard, and/or a tap gesture on a touch-screen display). In response to detecting the third user input (e.g., 650*k*) corresponding to selection of the autofill user interface object (e.g., 634) and in accordance with a determination that the third user input (e.g., 650*k*) is received at a first time (e.g., a first time that falls within a first predefined time interval and/or a first time interval of a recurring set of predefined time intervals that corresponds to a first one-time password), the computer system (e.g., 600, 640, and/or 800) enters a first one-time password (e.g., 636) (e.g., a password that corresponds to the first predefined time interval and/or the first time interval of the recurring set of predefined time intervals, a first password that becomes invalid after use and/or after expiration of the first predefined time interval; a first of set of characters (e.g., alphanumeric and/or symbol characters) that is used for verification of a user in a multi-factor authentication process (e.g., a process that involves a first set of credentials (e.g., a username and password) and the OTP)) into the one-time password user interface object (e.g., 632*b*). In response to detecting the third user input (e.g., 650*k*) corresponding to selection of the autofill user interface object (e.g., 634) and in accordance with a determination that the third user input (e.g., 650*k*) is received at a second time after the first time (e.g., a second time that falls within a second predefined time interval that occurs after the first predefined time interval and/or a second time interval of the recurring set of predefined time intervals that corresponds to a second one-time password), the computer system (e.g., 600, 640, and/or 800) enters a second one-time password (e.g., a password that corresponds to the second predefined time interval and/or the second time interval of the recurring set of predefined time intervals, a second password that becomes invalid after use and/or after expiration of the second predefined time interval; a second of set of characters (e.g., alphanumeric and/or symbol characters) that is used for verification of a user in a multi-factor authentication process (e.g., a process that involves a first set of credentials (e.g., a username and password) and the OTP)), different from the first one-time password (e.g., 636), into the one-time password user interface object (e.g., 632*b*).

Entering the first one-time password or the second one-time password in accordance with a determination that the third user input is received at the first time or the second time, respectively, causes the computer system to enter and/or submit the one-time password that is valid at any given time, which reduces the number of inputs needed to perform an operation and performs an operation when a set of conditions has been met without requiring further user input.

In some embodiments, the autofill user interface object (e.g., 634) is displayed without displaying the one-time password (e.g., 636) and without displaying a timer (e.g., 630*b*) associated with the one-time password (e.g., 636) (e.g., a timer that indicates a period of time during which the one-time password remains valid) (e.g., the autofill user interface object includes a visual indication that the autofill user interface object corresponds to the one-time password, but the autofill user interface object does not include display of the set of characters corresponding to the one-time password).

Displaying the autofill user interface object without the one-time password reduces an amount of processing power of the computer system because the computer system does not update display of the autofill user interface object each time the one-time password changes over time, which reduces the power usage of the computer system and/or improves the battery life of the computer system.

In some embodiments, in response to detecting a fourth user input (e.g., 650*k*) corresponding to selection of the autofill user interface object (e.g., 634) (e.g., a mouse click, a press and/or tap on a touchpad, a press gesture on a key of a keyboard, and/or a tap gesture on a touch-screen display), the computer system (e.g., 600, 640, and/or 800) enters the one-time password (e.g., 636) into the one-time password user interface object (e.g., 632*b*) (e.g., displaying the one-time password and/or a visual indication of the one-time password in the one-time password user interface object) and displays a visual indication (e.g., 636) (e.g., the set of characters corresponding to the one-time password) of the one-time password (e.g., 636) in the one-time password user interface object (e.g., 632*b*).

Displaying the visual indication of the one-time password in the one-time password user interface object in response to detecting the fourth user input corresponding to selection of the autofill user interface object provides improved visual feedback to the user by enabling the user to view the one-time password prior to the computer system submitting the one-time password, which provides improved visual feedback.

In some embodiments, prior to displaying the one-time password user interface object (e.g., 632*b*), the computer system (e.g., 600, 640, and/or 800) receives a request (e.g., 650*b*, 650*c*, 650*d*, and/or 650*m*) (e.g., selection of a link, selection and/or detecting a code (e.g., a quick response code), and/or a request to display a password manager user interface of a password manager) to configure a password generator (e.g., one or more programs of the computer system that include instructions for generating the one-time password, such as instructions including an algorithm that employs a random variable, a user input, and/or contextual information (e.g., the current time) to generate the OTP) of a password manager (e.g., an application and/or website that includes (e.g., stores) account information for a plurality of accounts (e.g., accounts associated with a website, an application, a software program, a service, and/or an external computer system) of a user associated with the computer system, such as email addresses, usernames, and/or passwords associated with respective accounts of the user) for generating the one-time password (e.g., 636) (e.g., a one-time password ("OTP")) generated by the password generator, a password that is valid for use in an authentication for a limited time or limited number of login sessions and/or transactions (e.g., a dynamic password (e.g., a password that changes after predefined intervals of time), a password that becomes invalid after use and/or after a predetermined period of time) and/or a set of characters (e.g., alphanumeric and/or symbol characters) that is used for verification of a user in a multi-factor authentication process (e.g., a process that involves a first set of credentials (e.g., a username and password) and the OTP)). In response to receiving the request (e.g., 650*b*, 650*c*, 650*d*, and/or 650*m*) to configure the password generator of the password manager, the computer system (e.g., 600, 640, and/or 800) associates the password generator with an account of the password manager (e.g., associating the password generator with an account for a website and/or application that is associated with (e.g., displays and/or includes) the one-time password user interface object, an account that is suggested via the computer system on a password manager user interface, and/or an account that is selected, via user input, on a password manager user interface).

Associating the password generator with the account of the password manager enables the computer system to enter and/or submit the one-time password generated by the password generator to the proper remotely-authenticated service, which reduces the amount of time required to authenticate a user of the computer system with a respective remotely-authenticated service and/or reduces the power usage of the computer system.

In some embodiments, the computer system (e.g., 600, 640, and/or 800) associates the password generator with the account of the password manager by displaying, via the display generation component (e.g., 602, 640*a*, and/or 802), a first password manager user interface (e.g., 616) of the password manager (e.g., a user interface of the password manager that includes one or more user interface objects associated with respective accounts of a user associated with the computer system, where the respective accounts of the user associated with the computer system include account information, such as email addresses, usernames, and/or passwords associated with the respective accounts) that includes an account user interface object (e.g., 618*a*) corresponding to the account of the password manager (e.g., the account for a website and/or application that is associated with the one-time password user interface object and is suggested and/or otherwise displayed on the first password manager user interface). The account user interface object (e.g., 618*a*) is displayed at a first position (e.g., 618) on the first password manager user interface (e.g., 616) (e.g., in some embodiments, the first position of the first password manager user interface corresponds to an account of a remotely-authenticated service (e.g., a website, an application, a software program, a service, and/or an external computer system) that includes a user interface that is displayed while the computer system detects the request to configured the password generator) (e.g., in some embodiments, the first position of the first password manager user interface corresponds to a position of the account based on an arrangement (e.g., alphabetical order) of respective account user interface objects of the first password manager user interface). The account user interface object (e.g., 618*a*), when selected via user input (e.g., 650*g* and/or 650*h*), is configured to associate the password generator with the account of the password manager. The account of the password manager is associated with a remotely-authenticated service (e.g., 'example.com') that includes a user interface (e.g., 604, 606, and/or 646) displayed while the computer system (e.g., 600, 640, and/or 800) detects the request (e.g., 650*b*, 650*c*, 650*d*, and/or 650*m*) to configure the password generator (e.g., the account of the password manager is associated with a website, application, link, and/or code that is associated with (e.g., displayed while receiving) the request).

Displaying the first user interface object corresponding to the account of the password manager that is associated with the request to configure the password manager enables the computer system to suggest an account for which to associate the password generator so that a user can quickly and easily select the appropriate account, which reduces the number of inputs needed to perform an operation.

In some embodiments, the computer system (e.g., 600, 640, and/or 800) receives (in some embodiments, prior to displaying the one-time password user interface object) a request (e.g., 650*h*) to display a second password manager user interface (e.g., 622, 624, and/or 644) of a password manager (e.g., receiving a set of one or more inputs that cause the computer system to display a home user interface of the password manager that includes a plurality of account user interface objects and/or the set of one or more inputs includes an input selecting an account user interface object of the home user interface of the password manager) (e.g., the second password manager user interface of the password manager is associated with an account for a website and/or application for which the password manager includes account information, such as an email address, a username, and/or a password for the account). In response to receiving the request (e.g., 650*h*) to display the second password manager user interface (e.g., 622, 624, and/or 644) of the password manager, the computer system (e.g., 600, 640, and/or 800) displays the second password manager user interface (e.g., 622, 624, and/or 644) that includes a password generator user interface object (e.g., 630, 630*a*, 630*b*, 644*d*, and/or 644*c*) (e.g., a user interface object that, when selected via user input, causes the computer system to initiate a process for generating the one-time password, such as via an algorithm that employs a random variable, a user input, and/or contextual information (e.g., the current time) to generate the OTP). The password generator user interface object (e.g., 630, 630*a*, 630*b*, 644*d*, and/or 644*c*) includes a visual indicator (e.g., 630*a* and/or 644*d*) of the one-time password (e.g., 636) (e.g., the set of characters corresponding to the one-time password and/or a timer corresponding to a predefined time period and/or predefine time interval for which the one-time password can be utilized for authentication with a remotely-authenticated service).

Displaying the password generator user interface object in the second password manager user interface enables a user to confirm that the password generator has been configured and/or associated with the account, which provides improved visual feedback.

In some embodiments, displaying the second password manager user interface (e.g., 622, 624, and/or 644) includes, the computer system (e.g., 600, 640, and/or 800) concurrently displaying: the password generator user interface object (e.g., 630, 630*a*, 630*b*, 644*d*, and/or 644*c*) (e.g., a user interface object that, when selected via user input, causes the computer system to initiate a process for generating the one-time password, such as via an algorithm that employs a random variable, a user input, and/or contextual information (e.g., the current time) to generate the OTP); a username user interface object (e.g., 628*a* and/or 644*b*) corresponding to an account associated with the second password manager user interface (e.g., 622, 624, and/or 644) (e.g., a username user interface object that includes the username of the account associated with the second password manager user interface); and a password user interface object (e.g., 628*b* and/or 644*c*) corresponding to the account associated with the second password manager user interface (e.g., 622, 624, and/or 644) (e.g., a password user interface object that includes the password (e.g., a static password; a non-one-time password) of the account associated with the second password manager user interface).

Displaying the password generator user interface object concurrently with the username user interface object and the password user interface object in the second password manager user interface enables a user of the computer system to confirm that the password generator has been configured and/or associated with the proper account, which provides improved visual feedback.

In some embodiments, the computer system (e.g., 600) communicates (e.g., via a wireless communication and/or via a wireless communication established via an *intermedia* device, such as a server) the one-time password generated via the computer system to one or more external devices (e.g., 640) (e.g., one or more external devices that are associated with and/or logged into the same account as the computer system) for use in an authentication process with a remotely-authenticated service (e.g., 'example.com') (e.g., the one or more external devices display the autofill user interface object and/or a similar user interface object corresponding to the one-time password when the one or more external devices are used to provide authentication to the remotely-authenticated service).

The computer system being configured to communicate the one-time password to one or more external devices enables a user to enter and/or submit the one-time password via the one or more external devices without having to configure and/or generate the one-time password on the one or more external devices, which reduces the number of inputs needed to perform an operation.

In some embodiments, the computer system (e.g., 600, 640, and/or 800) initiates a process for setting up a one-time password generator for generating the one-time password (e.g., 636) (e.g., set up a password generator via a password manager user interface of a password manager) in response to receiving a request (e.g., 650*b*, 650*c*, 650*d*, and/or 650*m*) (e.g., user input selecting a link, user input selecting a code (e.g., a quick response code), and/or receiving data associated with a code via an image captured from a camera of the computer system) to generate the one-time password while displaying, via the display generation component, a user interface (e.g., 604, 606, and/or 646) of a website (e.g., 'example.com') (e.g., a website that includes a link, a code, and/or instructions for configuring a one-time password for logging into and/or signing into an account of the website) (e.g., a remotely-authenticated service that includes a multifactor authentication process for authenticating a user and/or an account of user).

The computer system being configured to initiate the process for generating the one-time password in response to receiving a request received while displaying a user interface of a website enables the computer system to generate the one-time password without requiring the user to provide additional inputs to navigate to a user interface of the password manager, which reduces the number of inputs needed to perform an operation.

In some embodiments, the computer system (e.g., 600, 640, and/or 800) initiates a process for setting up a one-time password generator for generating the one-time password (e.g., 636) (e.g., set up a password generator via a password manager user interface of a password manager) via a password manager (e.g., 616, 622, and/or 624) (e.g., a user interface of a password manager includes a user interface object for generating the one-time password for use in the one-time password user interface object, and, optionally, the user interface includes one or more user interface objects that enable the computer system to associate the password generator and/or the one-time password with an account of the password manager). In some embodiments, the password manager prompts a user to input a setup code received from a remotely-authenticated service associated with the one-time password user interface object and/or prompts a user to capture an image of a code of the remotely-authenticated service to configure a password generator for the one-time password.

The computer system being configured to initiate the process for generating the one-time password via the password manager enables the user of the computer system to cause the computer system to generate the one-time password without requiring the user to provide additional user inputs to navigate to a user interface associated with the remotely-authenticated service for which the one-time password is used for authentication, which reduces the number of inputs needed to perform an operation.

In some embodiments, the computer system (e.g., 600, 640, and/or 800) initiates a process for setting up a one-time password generator for generating the one-time password (e.g., 636) (e.g., set up a password generator via a password manager user interface of a password manager) in response to receiving (e.g., receiving from a camera of the computer system and/or receiving from a camera of an external device that is different from the computer system) image data (e.g., data corresponding to an image captured via a camera of the computer system and/or an image captured via a camera of an external device that is different from the computer system), captured by one or more cameras of the computer system (e.g., 600, 640, and/or 800), corresponding to an image of a code (e.g., 608) (e.g., the image data corresponds to an image that includes a code (e.g., a quick response code) for initiating a process to configure a password generator).

The computer system being configured to initiate the process for generating the one-time password in response to receiving the image data corresponding to the image of the code enables the user of the computer system to cause the computer system to generate the one-time password without having to download and/or install an authentication application, which reduces the number of inputs needed to perform an operation.

In some embodiments, the computer system (e.g., 600, 640, and/or 800) initiates a process for setting up a one-time password generator for generating the one-time password (e.g., 636) (e.g., set up a password generator via a password manager user interface of a password manager) in response to detecting (e.g., via image analysis performed by the computer system on a code displayed on the display generation component; in some embodiments, the image analysis is performed by the computer system in response to detecting user input, such as a right click and/or a long press, on the code) image data corresponding to a code (e.g., 608) that is displayed (e.g., on user interface 606) via the display generation component (e.g., 602, 640*a*, and/or 800) (e.g., a quick response code that is currently being displayed).

The computer system being configured to initiate the process for generating the one-time password in response to detecting the image data corresponding to the image of the code enables the user of the computer system to cause the computer system to generate the one-time password without having to navigate to a user interface of the password manager and/or without having to download and/or install an authentication application, which reduces the number of inputs needed to perform an operation.

In some embodiments, the computer system (e.g., 600, 640, and/or 800) initiates a process for setting up a one-time password generator for generating the one-time password (e.g., 636) (e.g., set up a password generator via a password manager user interface of a password manager) in response to detecting user input (e.g., 650*c*) corresponding to selection of a one-time password generation link (e.g., 610) (e.g., a link displayed on a website and/or an application that includes data corresponding to a password manager of the computer system and/or data associated with an account of the password manager).

The computer system being configured to initiate the process for generating the one-time password in response to detecting user input corresponding to selection of a one-time password generation link enables the computer system to generate the one-time password without requiring the user to provide additional inputs to navigate to a user interface of the password manager and/or without having to download and/or install an authentication application, which reduces the number of inputs needed to perform an operation.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the computer system described with respect to method 700 can be used to enter and submit account credentials for use in authenticating a user with a remotely-authenticated service. For brevity, these details are not repeated below.

FIGS. 8A-8K illustrate exemplary user interfaces for creating and submitting account credentials for use in authenticating a user to a remotely-authenticated service, in accordance with some embodiments. The user interfaces in these figures are used to illustrate the processes described below, including the processes in FIG. 9.

Figures 8A, 8B:
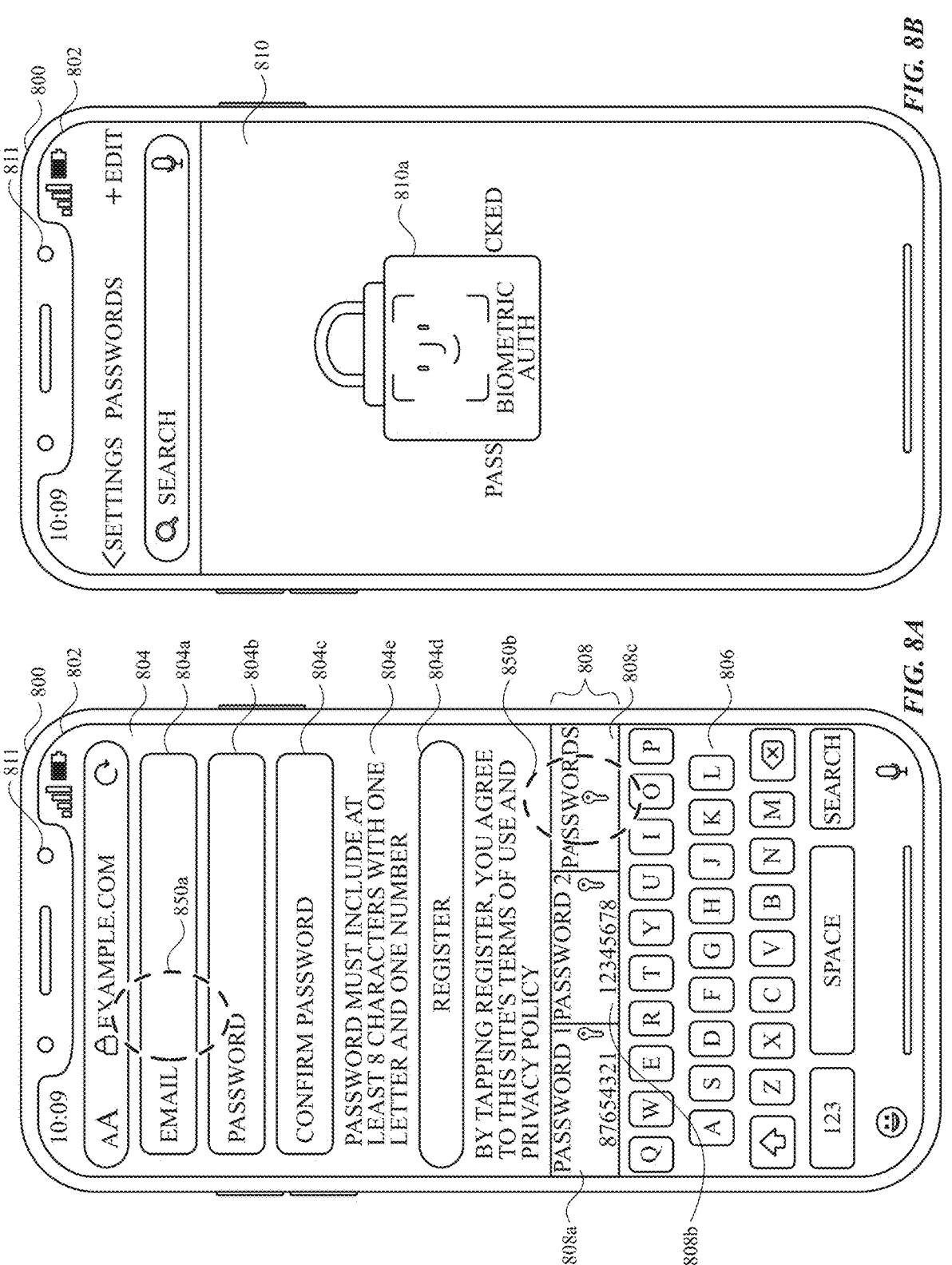
FIGS. 8A-8K illustrate exemplary user interfaces for creating and submitting account credentials for use in authenticating a user to a remotely-authenticated service, in accordance with some embodiments.

FIG. 8A illustrates electronic device 800 displaying, on display 802, account creation user interface 804 of a website, 'example.com' (e.g., a remotely-authenticated service). At FIG. 8A, account creation user interface 804 includes username user interface object 804*a* (e.g., email user interface object 804*a*), first password user interface object 804*b*, second password user interface object 804*c*, and register user interface object 804*d*. Username user interface object 804*a* includes an entry field for entering (e.g., via user input and/or via electronic device 800 autofilling) a username for registering a new account with the website. Similarly, first password user interface object 804*b* includes an entry field for entering (e.g., via user input and/or via electronic device autofilling) a password for registering the new account with the website. Second password user interface object 804*c* includes an entry field for entering and/or confirming (e.g., via user input and/or via electronic device autofilling) the password for registering the new account with the website. In some embodiments, account creation user interface 804 includes second password user interface object 804*c* to confirm that the password entered into first password user interface object 804*b* is an intended password of the user (e.g., confirming that the user did not inadvertently enter and/or mistype the password into first password user interface object 804*b*). In some embodiments, account creation user interface 804 does not include display of second password user interface object 804*c*.

At FIG. 8A, account creation user interface 804 includes password strength indicator 804*e* that provides a visual indication to a user of electronic device 800 about various criteria that the password should include for the password to be used to authenticate the user with the website. For example, password strength indicator 804*c* indicates that the password entered into first password user interface object 804*b* and second password user interface object 804*c* should include at least eight characters, where a first character of the at least eight characters includes a letter character and a second character of the at least eight characters includes a number character. In some embodiments, password strength indicator 804*e* corresponds to password strength requirements of the website, such that passwords that do not meet the criteria indicated by password strength indicator 804*e* will not be accepted for use in authenticating the user with the website. In some embodiments, the website does not include password strength requirements and account creation user interface 804 does not include display of password strength indicator 804*c*.

At FIG. 8A, electronic device 800 detects user input 850*a* (e.g., a tap gesture) corresponding to selection of username user interface object 804*a*. In response to detecting user input 850*a*, electronic device 800 displays keyboard 806 (e.g., a virtual keyboard) that includes one or more keys that, when selected via user input, cause electronic device 800 to enter corresponding characters into username user interface object 804*a*. At FIG. 8A, in response to detecting user input 850*a*, electronic device 800 displays word suggestion region 808 corresponding to suggested and/or existing usernames and/or passwords stored in a password manager (e.g., software and/or an application of electronic device 800 storing one or more credentials for authenticating a user of electronic device 800 to respective remotely-authenticated services) for entry into username user interface object 804*a*, first password user interface object 804*b*, and/or second password user interface object 804*c*. Word suggestion region 808 includes first credentials user interface object 808*a* corresponding to a first set of credentials for authenticating the user of electronic device 800 with a first remotely-authenticated service, second credentials user interface object 808*b* corresponding to a second set of credentials for authenticating the user of electronic device 800 with a second remotely-authenticated service, and password manager user interface object 808c. In some embodiments, in response to detecting user input selecting first credentials user interface object 808a and/or second credentials user interface object 808b, electronic device 800 autofills the first set of credentials and/or the second set of credentials, respectively, into one or more of username user interface object 804a, first password user interface object 804b, and/or third password user interface object 804c.

At FIG. 8A, electronic device 800 detects user input 850b (e.g., a tap gesture) corresponding to selection of password manager user interface object 808c. In response to detecting user input 850b, electronic device 800 displays first password manager user interface 810, as shown at FIG. 8B.

At FIG. 8B, first password manager user interface 810 includes indicator 810a that includes a visual indication of information and/or instructions for verifying an identity of the user of electronic device 800. Indicator 810a prompts a user to provide a biometric feature, such as one or more facial features, to authenticate and/or verify the identity of the user. In some embodiments, indicator 810a prompts the user to position at least a portion of their face within a field of view of camera 811 of electronic device 800, such that electronic device 800 detects one or more facial features of the user. In some embodiments, indicator 810a prompts the user to position a finger over a fingerprint sensor of electronic device 800 so that electronic device 800 detects a fingerprint of the user. In response to detecting a biometric feature of the user, electronic device 800 compares the detected biometric feature to biometric feature data associated with an authenticated user of electronic device 800. In some embodiments, in accordance with a determination that the detected biometric feature does not match the biometric feature data, electronic device 800 displays a password user interface object that enables the user to provide a password for authenticating the user to access the password manager.

At FIG. 8B, electronic device 800 determines that the detected biometric feature matches the biometric feature data associated with the authenticated user of electronic device 800. In accordance with the determination that the detected biometric feature matches the biometric feature data, electronic device 800 displays second password manager user interface 812, as shown at FIG. 8C.

Figures 8C, 8D:
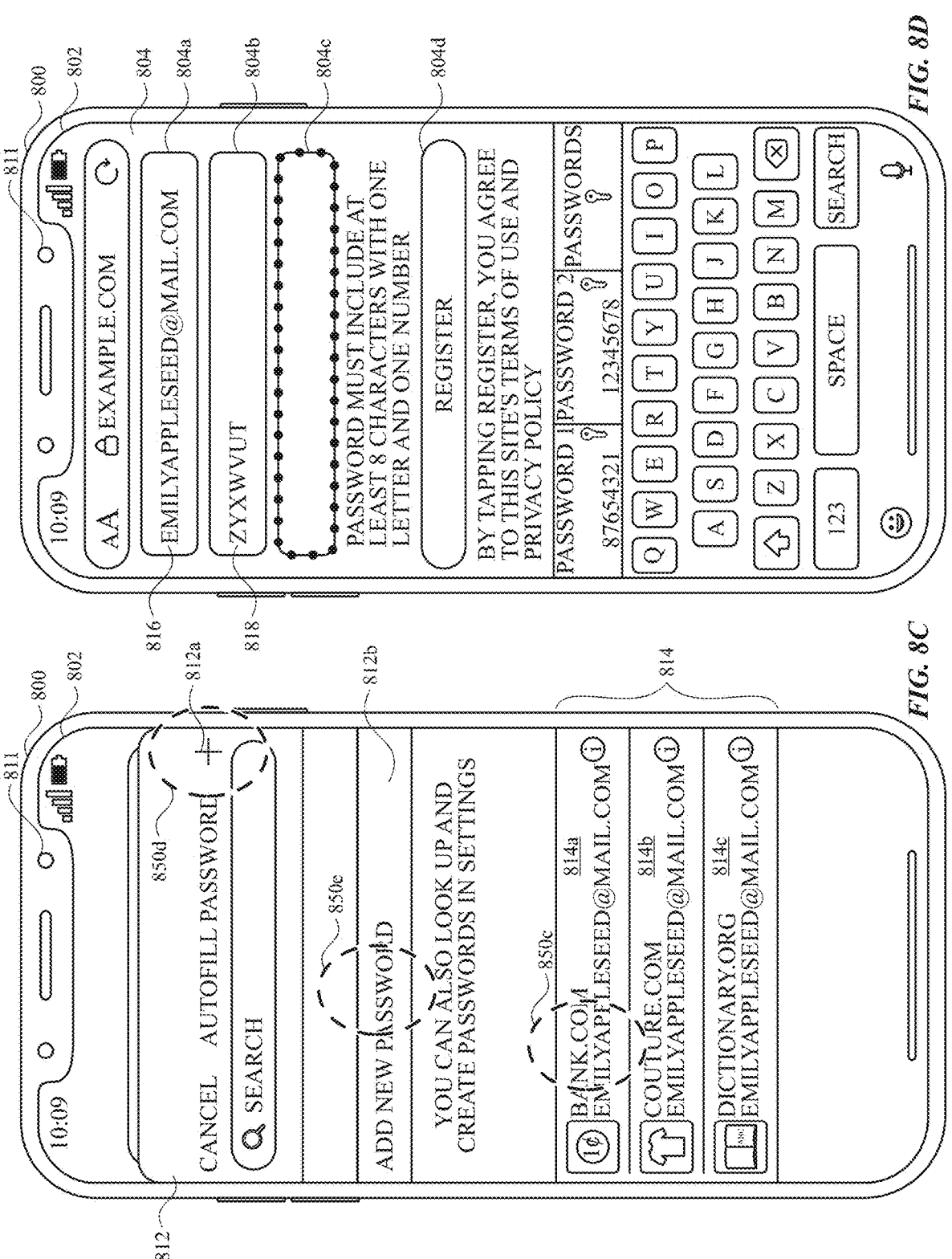

At FIG. 8C, second password manager user interface 812 corresponds to the password manager of electronic device 800 (e.g., software and/or an application that stores and/or includes credentials for authenticating the user of electronic device 800 with respective remotely-authenticated services). Second password manager user interface 812 includes first account creation user interface object 812a, second account creation user interface object 812b, and existing accounts region 814. Existing accounts region 814 corresponds to previously saved credentials for authenticating the user with respective remotely-authenticated services. Existing accounts region includes account user interface objects 814a-814c corresponding to saved credentials for authenticating the user of electronic device 800 with three different remotely-authenticated services.

At FIG. 8C, electronic device 800 detects user input 850c (e.g., a tap gesture) corresponding to selection of first account user interface object 814a. In response to detecting user input 850c, electronic device 800 displays account creation user interface 804, as shown at FIG. 8D. Alternatively, at FIG. 8C, electronic device 800 detects user input 850d (e.g., a tap gesture) corresponding to first account creation user interface object and/or user input 850c (e.g., a tap gesture) corresponding to second account creation user interface object 812b. In response to detecting user input

Figures 8E, 8F:
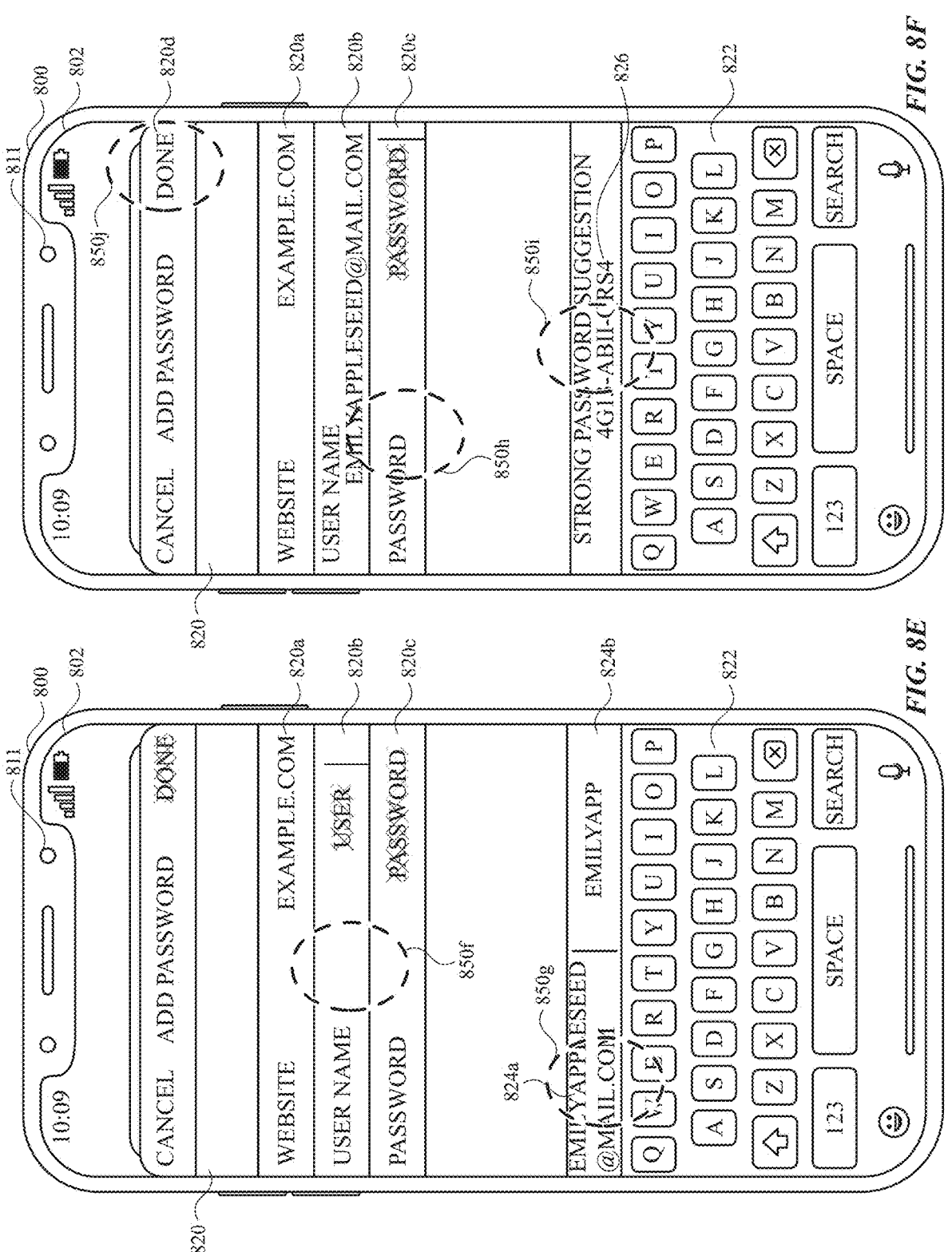

850d and/or 850c, electronic device 800 displays third password manager user interface 820, as shown at FIG. 8E.

At FIG. 8D, electronic device 800 autofills and/or enters username 816 (e.g., email address 816) into username user interface object 804a of account creation user interface 804 and autofills and/or enters password 818 into first password user interface object 804b of account creation user interface 804. In other words, in response to detecting user input 850c, electronic device 800 enters username 816 and password 818 so that a user of electronic device 800 does not have to type and/or otherwise provide additional user inputs to enter username 816 and password 818. Username 816 and password 818 correspond to credentials for use in authenticating the user of electronic device 800 with the remotely-authenticated service associated with account user interface object 814a (e.g., 'Bank.com'), which is different from the website 'example.com.' Therefore, a user can select account user interface object 814a from second password manager user interface 812 and use the same credentials for registering the new account with the website 'example.com.' In some embodiments, electronic device 800 modifies and/or changes username 816 and/or password 818 in response to detecting one or more user inputs corresponding to username user interface object 804a and/or first password user interface object 804b, respectively, while displaying username 816 and password 818 in username user interface object 804a and first password user interface object 804b.

At FIG. 8D, electronic device 800 displays the characters and/or symbols corresponding to password 818 in first password user interface object 804b. In some embodiments, electronic device 800 displays default symbols representing password 818 without displaying the actual characters and/or symbols of password 818 in first password user interface object 804b.

In some embodiments, electronic device 800 also autofills and/or enters password 818 into second password user interface object 804c of account creation user interface 804. In some embodiments, electronic device 800 forgoes autofilling and/or entering password 818 into second password user interface object 804c.

As set forth above, in response to detecting user input 850d and/or user input 850c, electronic device 800 displays third password manager user interface 820, as shown at FIG. 8E. At FIG. 8E, third password manager user interface 820 includes remotely-authenticated service indicator 820a, username user interface object 820b, and password user interface object 820c. Electronic device 800 displays remotely-authenticated service indicator 820a with a visual representation of the website (e.g., 'example.com') in response to detecting user input 850d and/or user input 850c. In some embodiments, electronic device 800 displays the visual representation of the website based on data associated with user input 850b. For instance, electronic device 800 determines that a request to access and/or display the password manager (e.g., second password manager user interface 812) is initiated from the website (e.g., 'example.com') and displays the visual representation of the website via remotely-authenticated service indicator 820a. In some embodiments, electronic device 800 displays remotely-authenticated service indicator 820a without a visual representation of the website and electronic device 800 detects one or more user inputs (e.g., via keyboard 822) causing electronic device 800 to enter the website into remotely-authenticated service indicator 820a.

At FIG. 8E, electronic device 800 detects user input 850f (e.g., a tap gesture) corresponding to selection of username user interface object 820b. In response to detecting user input 850*f*, electronic device 800 displays keyboard 822, first suggested username 824*a*, and second suggested username 824*b*, as shown at FIG. 8E. In some embodiments, first suggested username 824*a* corresponds to a most frequently used email address (e.g., 'emilyappleseed@mail.com') included in the password manager that is used to authenticate the user of electronic device 800 with one or more remotely-authenticated services. In some embodiments, second suggested username 824*b* corresponds to a most frequently used non-email address username (e.g., 'emilyapp') included in the password manager that is used to authenticate the user of electronic device 800 with one or more remotely-authenticated services. In some embodiments, electronic device 800 displays additional suggested usernames that correspond to most recently used email addresses and/or non-email address usernames. In some embodiments, electronic device 800 enters a username into username user interface object 820*b* in response to detecting one or more user inputs corresponding to keyboard 822.

At FIG. 8E, electronic device 800 detects user input 850*g* (e.g., a tap gesture) corresponding to selection of first suggested username 824*a*. In response to detecting user input 850*g*, electronic device 800 enters the username (e.g., 'emilyappleseed@mail.com') associated with first suggested username 824*a* into username user interface object 820*b*, as shown at FIG. 8F. In some embodiments, electronic device 800 autofills username user interface object 820*b* with one of first suggested username 824*a* and second suggested username 824*b* without detecting user input corresponding to username user interface object 820*b* and/or first suggested username 824*a*.

At FIG. 8F, electronic device 800 detects user input 850*h* (e.g., a tap gesture) corresponding to selection of password user interface object 820*c* of third password manager user interface 820. In response to detecting user input 850*h*, electronic device 800 displays keyboard 822 and suggested password 826, as shown at FIG. 8F. In some embodiments, suggested password 826 includes a random and/or pseudo-random set of characters, such as alphanumeric characters and/or symbol characters, generated by electronic device 800. In some embodiments, electronic device 800 generates suggested password 826 based the password strength requirements of the website, such as the criteria indicated by password strength indicator 804*c*. At FIG. 8F, suggested password 826 includes at least eight characters (e.g., suggested password 826 includes fourteen characters), where a first character (e.g., 'g') is a letter character and a second character (e.g., '4') is a number character. In some embodiments, electronic device 800 enters a password into password user interface object 820*c* in response to detecting one or more user inputs corresponding to keyboard 822. In some embodiments, electronic device 800 prompts the user and/or otherwise blocks creation of a password when a password entered into password user interface object 820*c* (e.g., via keyboard 822) does not satisfy the criteria indicated by password strength indicator 804*c*.

At FIG. 8F, electronic device 800 detects user input 850*i* (e.g., a tap gesture) corresponding to selection of suggested password 826. In response to detecting user input 850*i*, electronic device 800 enters the password (e.g., '4G13-ABII-QRS4') associated with suggested password 826 into password user interface object 826.

At FIG. 8F, after detecting user input 850*i*, electronic device 800 detects user input 850*j* (e.g., a tap gesture) corresponding to selection of done user interface object 820*d* of third password manager user interface 820. In response to detecting user input 850*j*, electronic device 800 saves the selected username and the selected password to the password manager, such that the password manager can be used to autofill the selected username and the selected password for use in authenticating the user with the website (e.g., when the user logs into and/or signs into the website). In addition, in response to detecting user input 850*j*, electronic device 800 enters the selected username into username user interface object 804*a* of account creation user interface 804 and enters the selected password into first password user interface object 804*b* and/or second password user interface object 804*c* of account creation user interface 804, as shown at FIG. 8G.

In some embodiments, electronic device 800 displays account creation user interface 804 in response to detecting user input 850*j*. In some embodiments, electronic device 800 submits a form associated with account creation user interface 804 after entering the selected username into username user interface object 804*a* and after entering the selected password into first password user interface object 804*b* and/or second password user interface object 804*c*. In some such embodiments, in response to detecting user input 850*j*, electronic device 800 displays account creation user interface 804 for a predefined period of time to submit the form associated with account creation user interface 804. In some embodiments, electronic device 800 submits the form associated with account creation user interface 804 and forgoes displaying account creation user interface 804 in response to detecting user input 850*j*. In some embodiments, electronic device 800 submits the form associated with account creation user interface 804 in accordance with a determination that an autosubmit criteria is met. In some embodiments, the autosubmit criteria includes a criterion that is met when account creation user interface 804 does not include any additional entry fields and/or user interface objects that have not been filled and/or otherwise interacted with (e.g., via user input and/or via autofill by electronic device 800).

Figures 8G, 8H:
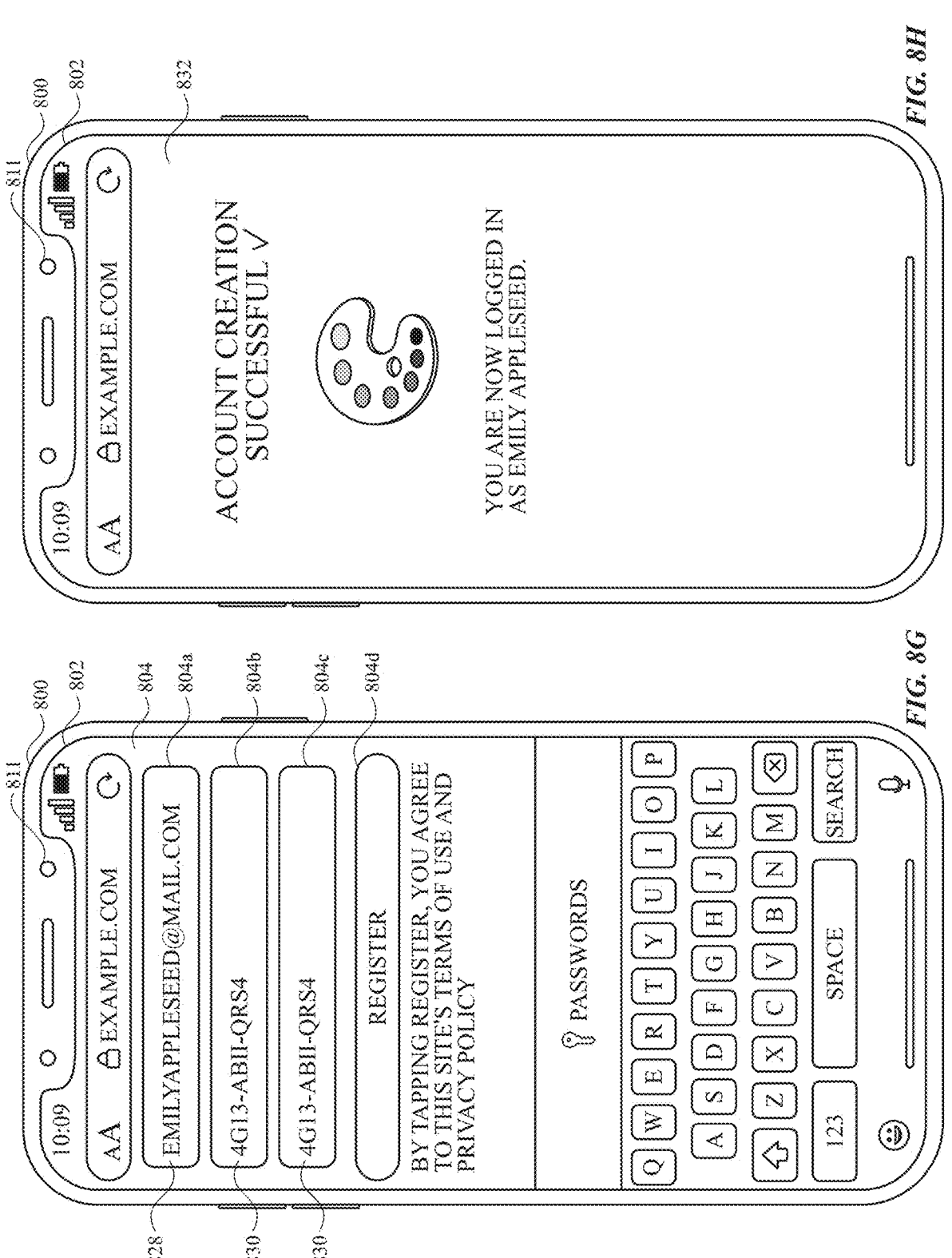

At FIG. 8G, electronic device 800 displays account creation user interface 804 with username 828 displayed in username user interface object 804*a* and password 830 displayed in both first password user interface object 804*b* and second password user interface object 804*c*. Electronic device 800 autofills username 828 into username user interface object 804*a* and autofills password 830 into both first password user interface object 804*b* and second password user interface object 804*c* after detecting user input 850*j*. In other words, a user is not required to re-enter and/or type username 828 and password 830 after having selected the username and the password via third password manager user interface 820.

As set forth above, in some embodiments, in accordance with a determination that the autosubmit criteria is met, electronic device 800 autosubmits the form associated with account creation user interface 804. In some such embodiments, electronic device 800 submits username 828 and password 830 without additional user input (e.g., without user input in addition to user input 850*j*) to the website so that username 828 and password 830 can be used to authenticate the user of electronic device 800 with the website. In some embodiments, in accordance with a determination that the autosubmit criteria is not met, electronic device 800 submits username 828 and password 830 for use in authenticating the user with the website in response to detecting user input corresponding to selection of register user interface object 804*d* (and, optionally, after detecting user input corresponding to additional entry forms and/or user interface objects of account creation user interface 804).

After submitting username 828 and password 830 to the website for use in authenticating the user with the website, electronic device 800 receives an indication from the website that username 828 and password 830 were accepted for use in authenticating the user with the website and displays account confirmation user interface 832, as shown at FIG. 8H.

At FIG. 8H, account confirmation user interface 832 includes a visual indication that username 828 and password 830 were accepted by the website for use in authenticating the user with the website. Therefore, username 828 and password 830 can be used to authenticate the user with the website and sign the user into an account of the website.

Figures 8I, 8J:
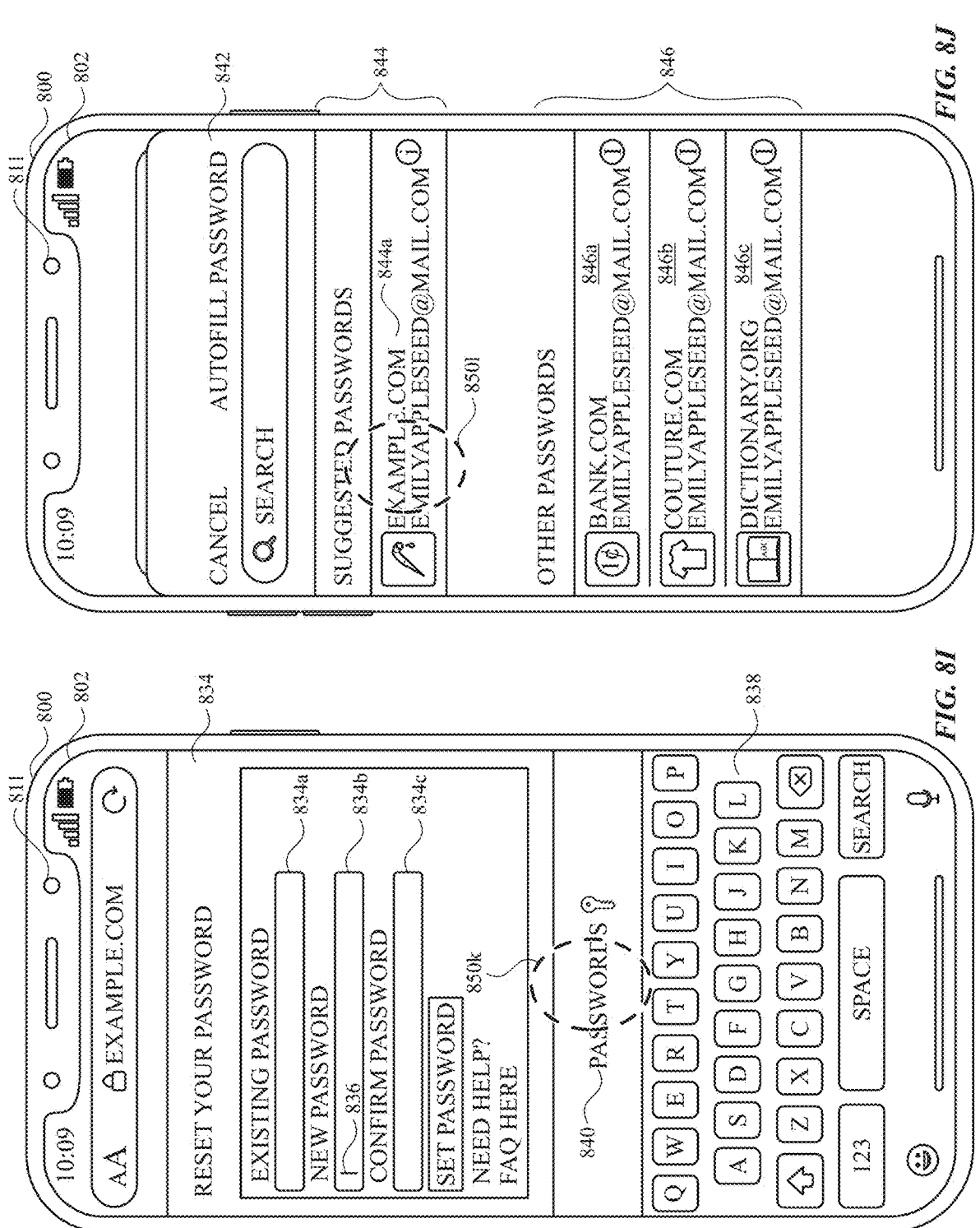

At FIG. 8I, electronic device 800 displays password reset user interface 834 associated with the website, 'example.com.' In some embodiments, electronic device 800 displays password reset user interface 834 in response to detecting one or more user inputs associated with a request to change password 830 for authenticating the user with the website. At FIG. 8I, password reset user interface 834 includes existing password user interface object 834a, first new password user interface object 834b, and second new password user interface object 834c.

At FIG. 8I, electronic device 800 has detected user input corresponding to first new password user interface object 834b, as indicated by cursor 836. In response to detecting the user input corresponding to first new password user interface object 834b, electronic device 800 displays keyboard 838 and password manager user interface object 840. In some embodiments, in response to detecting the user input corresponding to first new password user interface object 834b, electronic device 800 displays (e.g., concurrently with password manager user interface object 840) one or more account user interface objects corresponding to saved usernames and/or passwords of the password manager for use in authenticating the user with respective remotely-authenticated services.

At FIG. 8I, electronic device 800 detects user input 850k (e.g., a tap gesture) corresponding to selection of password manager user interface object 840. In response to detecting user input 850k, electronic device 800 displays fourth password manager user interface 842, as shown at FIG. 8J. In some embodiments, electronic device 800 displays first password manager user interface 810 prompting a user to provide an authentication input (e.g., a biometric feature and/or a password) to access fourth password manager user interface 842. In some such embodiments, electronic device 800 displays fourth password manager user interface 842 in accordance with a determination that a received authentication input matches authentication data (e.g., saved biometric feature data and/or a saved password corresponding to an authorized user of electronic device 800).

At FIG. 8J, fourth password manager user interface 842 includes suggested accounts region 844 and other accounts region 846. Suggested accounts region 844 includes suggested account user interface object 844a corresponding to saved credentials (e.g., a username and password) for the website 'example.com.' In some embodiments, electronic device 800 displays suggested account user interface object 844a corresponding to the website 'example.com' in accordance with a determination that the password manager includes saved credentials for a remotely-authenticated service (e.g., the website 'example.com') associated with a user interface that is displayed when user input 850k is detected. Other accounts region 846 includes account user interface objects 846a-846c corresponding to saved credentials for remotely-authenticated services that are different from the website 'example.com.'

At FIG. 8J, electronic device 800 detects user input 850l (e.g., a tap gesture) corresponding to selection of suggested account user interface object 844a. In response to detecting user input 850l, electronic device 800 displays fifth password manager user interface 848, as shown at FIG. 8K.

Figure 8K:
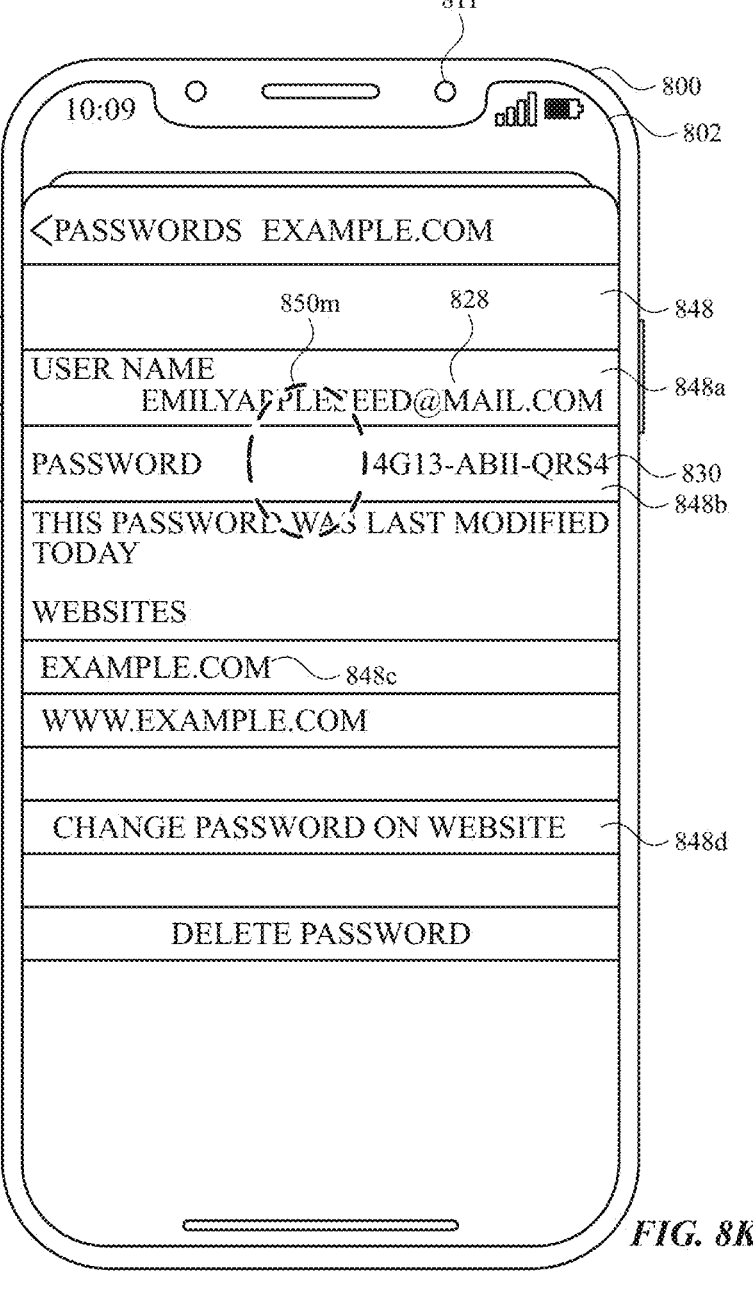

At FIG. 8K, fifth password manager user interface 848 includes saved username user interface object 848a, saved password user interface object 848b, remotely-authenticated service indicator 848c, and change password on website user interface object 848d. In some embodiments, in response to detecting user input selecting change password on website user interface object 848d, electronic device 800 displays password reset user interface 834, as shown at FIG. 8I, which enables a user to manually change the password for authenticating the user with the website. Saved username user interface object 848a includes a visual indication of username 828 for use in authenticating the user with the website. Saved password user interface object 848b includes a visual indication of password 830, which is the current password that can be used to authenticate the user of electronic device 800 with the website. At FIG. 8K, saved password user interface object 848b includes the actual characters and/or symbols of password 830. In some embodiments, saved password user interface object 848b includes generic symbols (e.g., dots and/or squares) that hide and/or obscure the actual characters and/or symbols of password 830.

At FIG. 8K, electronic device 800 detects user input 850m corresponding to saved password user interface object 848b. In response to detecting user input 850m, electronic device 800 displays a keyboard (e.g., a virtual keyboard) that enables a user to type a new password for use in authenticating the user of electronic device 800 with the website. In some embodiments, in response to detecting user input 850m, electronic device 800 displays a suggested password user interface object suggesting a new password that satisfies the criteria of password strength indicator 804c.

In some embodiments, in response to detecting user input requesting to save the new password, electronic device 800 autofills password 830 into existing password user interface object 834a of password reset user interface 834 and autofills the new password into both first new password user interface object 834b and second new password user interface object 834c of password reset user interface 834. In some embodiments, electronic device 800 submits the new password to the website in response to detecting the user input requesting to save the new password, such that the new password can be used to authenticate the user with the website.

FIG. 9 is a flow diagram illustrating a method for creating and submitting account credentials for use in authenticating a user to a remotely-authenticated service using a computer system in accordance with some embodiments. Method 900 is performed at a computer system (e.g., 100, 300, 500, 600, 640, 800) (e.g., an electronic device; a smart device, such as a smartphone or a smartwatch; a mobile device; a wearable device; a laptop and/or desktop computer) that is in communication with a display generation component (e.g., 802) and one or more input devices (e.g., a mouse, a keypad, a keyboard, a touchpad, and/or a touch-screen display). Some operations in method 900 are, optionally, combined, the orders of some operations are, optionally, changed, and some operations are, optionally, omitted.

As described below, method 900 provides an intuitive way for creating and submitting account credentials for use in authenticating a user to a remotely-authenticated service. The method reduces the cognitive burden on a user for signing into and/or otherwise obtaining authorization to a remotely-authenticated service, thereby creating a more efficient human-machine interface. For battery-operated computing devices, enabling a user to sign into and/or obtain authorization to a remotely-authenticated service faster and more efficiently conserves power and increases the time between battery charges.

The computer system (e.g., 600, 640, and/or 800) displays (902), via the display generation component (e.g., 602, 640*a*, and/or 802), a password user interface (e.g., 804) (e.g., a password creation user interface for setting and/or creating a password of an account (e.g., a password for signing into and/or logging into a new account and/or an existing account) associated with a website, application, and/or service) for creating a password (e.g., 830) to authenticate a user of the computer system (e.g., 600, 640, and/or 800) to a first remotely-authenticated service (e.g., 'example.com') (e.g., a website, an application, a software program, a service, and/or an external computer system).

While the computer system (e.g., 600, 640, and/or 800) displays the password user interface (e.g., 804), the computer system (e.g., 600, 640, and/or 800) receives (904), via the one or more input devices (e.g., 602, 640*a*, and/or 802), a first set of one or more inputs (e.g., 850*a*) including a request to display a password manager user interface (e.g., 812 and/or 820) for managing passwords for multiple different remotely-authenticated services (e.g., an interface of an application and/or website that includes (e.g., stores) account information for a plurality of accounts (e.g., accounts associated with a website, an application, a software program, a service, and/or an external computer system) of a user associated with the computer system, such as email addresses, usernames, and/or passwords associated with respective accounts of the user).

In response to receiving the first set of one or more inputs (e.g., 850*a*), the computer system (e.g., 600, 640, and/or 800) displays (906), via the display generation component (e.g., 602, 640*a*, and/or 802), the password manager user interface (e.g., 820) for a password manager (e.g., a user interface of the password manager for creating a new password and/or a new account for a website, application, and/or service associated with the password user interface).

Displaying the password manager user interface (e.g., 820) includes the computer system (e.g., 600, 640, and/or 800) concurrently displaying a username creation user interface object (908) (e.g., 820*b*) (e.g., a username creation field; a text entry field) for entry (e.g., via one or more user inputs) of a new username (e.g., 828) (e.g., a username suggested by the computer system (e.g., the computer system displays a suggested username based on other usernames of accounts of the user of the computer system) and/or a username corresponding to one or more user inputs detected via the computer system while displaying the password manager user interface (e.g., a username typed and/or entered via user input)) for use in authenticating the user of the computer system (e.g., 600, 640, and/or 800) to the first remotely-authenticated service (e.g., 'example.com') (e.g., a website, an application, a software program, a service, and/or an external computer system) and a password creation user interface object (910) (e.g., 820*c*) (e.g., a password creation field) for entry (e.g., via one or more user inputs) of a new password (e.g., 830) (e.g., a password suggested by the computer system (e.g., the computer system displays a suggested password based on other passwords of accounts of the user of the computer system and/or based on password requirements of the website, application, software program, and/or service that is associated with the account) and/or a password corresponding to one or more user inputs detected via the computer system while displaying the password manager user interface (e.g., a password typed and/or entered via user input)) for use in authenticating the user of the computer system (e.g., 600, 640, and/or 800) to the first remotely-authenticated service (e.g., 'example.com') (e.g., a website, an application, a software program, a service, and/or an external computer system);

While the computer system (e.g., 600, 640, and/or 800) displays the password manager user interface (e.g., 820) with a first username (e.g., 828) entered into the username user interface object (e.g., 820*b*) (e.g., a prepopulated username corresponding to a suggested username and/or an existing username, a username corresponding to one or more user inputs detected via the one or more input devices, such as a virtual keyboard and/or a physical keyboard, and/or a username corresponding to a selected username suggested via the computer system) and a first password (e.g., 830) entered into the password user interface object (e.g., 820*c*) (e.g., a prepopulated password corresponding to a suggested password and/or an existing password, a password corresponding to one or more user inputs detected via the one or more input devices, such as a virtual keyboard and/or a physical keyboard, and/or a password corresponding to a selected password suggested via the computer system), the computer system detects (912) a second set of one or more user inputs (e.g., 850*f*, 850*g*, 850*h*, 850*i*, and/or 850*j*) that occur within the password management user interface (e.g., 820) (e.g., a first user input selecting a "done" user interface object of the password manager user interface and/or one or more second user inputs navigating to the password user interface). In some embodiments, the second set of one or more user inputs are detected without detecting inputs directed to the password user interface that is associated with the remotely-authenticated service. In some embodiments, the second set of one or more user inputs are detected while the password user interface that is associated with the remotely-authenticated service is not displayed. In some embodiments, the second set of one or more user inputs includes a single user input selecting a "done" user interface object of the password manager user interface.

In response to detecting the second set of one or more user inputs (914), the computer system (e.g., 600, 640, and/or 800) saves (916) the first username (e.g., 828) and the first password (e.g., 830), in the password manager, as a username and password for the first remotely-authenticated service (e.g., 'example.com') (e.g., initiate a process for storing (e.g., in memory of the computer system and/or on an external device (e.g., a server) accessible by the computer system) and/or associating the username and the password with a new account for the website, application, software program, service, and/or external computer system without additional user input (e.g., without user input in addition to the second set of one or more user inputs)).

In response to detecting the second set of one or more user inputs (914), the computer system (e.g., 600, 640, and/or 800) submits (918) the first username (e.g., 828) and the first password (e.g., 830) to the first remotely-authenticated service (e.g., 'example.com') as a new username and password for the first remotely-authenticated service (e.g., 'example.com') (e.g., submitting a form associated with the password user interface without additional user input in addition to the second set of one or more user inputs to initiate a process for registering the first username and the first password with a new account of the first remotely-authenticated service).

In some embodiments, saving the first username and the first password and submitting the first username and the first password to the first remotely-authenticated service is performed without detecting inputs directed to the password user interface that is associated with the remotely-authenticated service. In some embodiments, saving the first username and the first password and submitting the first username and the first password to the first remotely-authenticated service is performed while the password user interface that is associated with the remotely-authenticated service is not displayed. In some embodiments, the computer system displays the password user interface (and, optionally, the first password entered into a password field of the password user interface and/or the first username entered into a username of the password user interface) in response to detecting the second set of one or more user inputs and/or while submitting the first username and the first password to the first remotely authenticated service.

Submitting the first username and the first password to the first remotely-authenticated service in response to detecting the second set of one or more user inputs enables the computer system to initiate authentication of the user of the computer system to the first remotely-authenticated service without requiring additional user inputs directed to the password user interface and/or the password manager user interface, which reduces the number of inputs needed to perform an operation. In addition, saving the first username and the first password for the first remotely-authenticated service in response to detecting the second set of one or more user inputs enables the computer system to associate the first username and the first password with an account of the first remotely-authenticated service without requiring additional user inputs directed to the password user interface and/or the password manager user interface, which reduces the number of inputs needed to perform an operation.

In some embodiments, while the computer system (e.g., 600, 640, and/or 800) displays the password manager user interface (e.g., 820) including the username creation user interface object (e.g., 820b) and the password creation user interface object (e.g., 820c), the computer system (e.g., 600, 640, and/or 800) detects, via the one or more input devices (e.g., 602, 640a, and/or 802), a third set of one or more inputs (e.g., 850f, 850g, 850h, and/or 850i) (e.g., one or more user inputs selecting a suggested credential (e.g., username, password, and/or email address) and/or one or more user inputs typing and/or otherwise entering a credential) corresponding to entry of one or more credentials (e.g., 828 and/or 830) (e.g., username, password, and/or email address) into one or more first user interface objects (e.g., 820b and/or 820c) (e.g., the username creation user interface object, the password creation user interface object, an email address user interface object, and/or an identifier (e.g., name) user interface object) of the password manager user interface (e.g., 820). In response to detecting the third set of one or more inputs (e.g., 850f, 850g, 850h, and/or 850i) corresponding to entry of the one or more credentials (e.g., 828 and/or 830) into the one or more first user interface objects (e.g., 820b and/or 820c) of the password manager user interface (e.g., 820), the computer system (e.g., 600, 640, and/or 800) enters (e.g., displays and/or saves) the one or more credentials (e.g., 828 and/or 830) into the one or more first user interface objects (e.g., 820b and/or 820c) of the password manager user interface (e.g., 820) and enters (e.g., displays and/or saves) the one or more credentials (e.g., 828 and/or 830) into one or more second user interface objects (e.g., 804a, 804b, and/or 804c) of the password user interface (e.g., 804) corresponding to the one or more credentials (e.g., 828 and/or 830). In some embodiments, the computer system inserts, displays, and/or enters the one or more credentials into multiple entry fields that are displayed on the same user interface and/or different user interfaces in response to user input corresponding to a single entry field (e.g., an entry field displayed on the password manager user interface).

Entering the one or more credentials into the one or more first user interface objects of the password manager user interface as well as into the one or more second user interface objects of the password user interface in response to detecting the third set of one or more inputs enables the computer system to input information into multiple entry fields in response to detecting input corresponding to a single entry field, which reduces the number of inputs needed to perform an operation.

In some embodiments, the one or more credentials (e.g., 828 and/or 830) include the first password (e.g., 830) and the one or more first user interface objects (e.g., 820b and/or 820c) of the password manager user interface (e.g., 820) include the password creation user interface object (e.g., 820c). The computer system (e.g., 600, 640, and/or 800) entering the one or more credentials (e.g., 828 and/or 830) into the one or more first user interface objects (e.g., 820b and/or 820c) of the password manager user interface (e.g., 820) includes the computer system (e.g., 600, 640, and/or 800) entering the first password (e.g., 830) into the password creation user interface object (e.g., 820c). The computer system (e.g., 600, 640, and/or 800) entering the one or more credentials (e.g., 828 and/or 830) into the one or more second user interface objects (e.g., 804a, 804b, and/or 804c) of the password user interface (e.g., 804) corresponding to the one or more credentials (e.g., 828 and/or 830) includes the computer system (e.g., 600, 640, and/or 800) entering the first password (e.g., 830) into a password creation field (e.g., 804b and/or 804c) of the password user interface (e.g., 804). In some embodiments, the computer system inserts, displays, and/or enters the password into multiple entry fields that are displayed on the same user interface and/or different user interfaces in response to user input corresponding to a single password entry field (e.g., the password creation user interface object displayed on the password manager user interface).

Entering the first password into the password creation user interface object of the password manager user interface as well as into the password creation field of the password user interface in response to detecting the third set of one or more inputs enables the computer system to input the first password into multiple entry fields in response to detecting input corresponding to a single entry field (e.g., the password creation user interface object), which reduces the number of inputs needed to perform an operation.

In some embodiments, the one or more credentials (e.g., 828 and/or 830) include the first password (e.g., 830) and the first username (e.g., 828) and the one or more first user interface objects (e.g., 820b and/or 820c) of the password manager user interface (e.g., 820) include the password creation user interface object (e.g., 820c) and the username creation user interface object (e.g., 820b). The computer system (e.g., 600, 640, and/or 800) entering the one or more credentials (e.g., 828 and/or 830) into the one or more first user interface objects (e.g., 820b and/or 820c) of the password manager user interface (e.g., 820) includes the computer system (e.g., 600, 640, and/or 800) entering the first username (e.g., 828) into the username creation user interface object (e.g., 820*b*). The computer system (e.g., 600, 640, and/or 800) entering the one or more credentials (e.g., 828 and/or 830) into the one or more first user interface objects (e.g., 820*b* and/or 820*c*) of the password manager user interface (e.g., 820) includes the computer system (e.g., 600, 640, and/or 800) entering the first password (e.g., 830) into the password creation user interface object (e.g., 820*c*). The computer system (e.g., 600, 640, and/or 800) entering the one or more credentials (e.g., 828 and/or 830) into the one or more second user interface objects (e.g., 804*a*, 804*b*, and/or 804*c*) of the password user interface (e.g., 804) corresponding to the one or more credentials (e.g., 828 and/or 830) includes the computer system (e.g., 600, 640, and/or 800) entering the first username (e.g., 828) into a username creation field (e.g., 804*a*) of the password user interface (804). The computer system (e.g., 600, 640, and/or 800) entering the one or more credentials (e.g., 828 and/or 830) into the one or more second user interface objects (e.g., 804*a*, 804*b*, and/or 804*c*) of the password user interface (e.g., 804) corresponding to the one or more credentials (e.g., 828 and/or 830) includes the computer system (e.g., 600, 640, and/or 800) entering the first password (e.g., 830) into a password creation field (e.g., 804*b* and/or 804*c*) of the password user interface (e.g., 804). In some embodiments, the computer system inserts, displays, and/or enters the password into multiple entry fields that are displayed on the same user interface and/or different user interfaces in response to user input corresponding to a single password entry field (e.g., the password creation user interface object displayed on the password manager user interface) and the computer system inserts, displays, and/or enters the username into multiple entry fields that are displayed on the same user interface and/or different user interfaces in response to user input corresponding to a single username entry field (e.g., the username creation user interface object displayed on the password manager user interface).

Entering the first password into the password creation user interface object of the password manager user interface as well as into the password creation field of the password user interface and entering the first username into the username creation user interface object of the password manager user interface as well as into the username creation field of the password user interface in response to detecting the third set of one or more inputs enables the computer system to input the first password and the first username into multiple entry fields in response to detecting input corresponding to a single entry field (e.g., the password creation user interface object and the username creation user interface object, respectively), which reduces the number of inputs needed to perform an operation.

In some embodiments, after the computer system (e.g., 600, 640, and/or 800) submits the first username (e.g., 828) and the first password (e.g., 830) to the first remotely-authenticated service (e.g., 'example.com') as the new username and password for the first remotely-authenticated service (e.g., 'example.com'), the computer system (e.g., 600, 640, and/or 800) displays (e.g., in response to user input requesting to change a password for the first remotely-authenticated service), via the display generation component (e.g., 602, 640*a*, and/or 802), a password reset user interface (e.g., 834) for resetting the first password (e.g., 830) for the first remotely-authenticated service (e.g., 'example.com') (e.g., a user interface for changing the first password to a second password for use with the first remotely-authenticated service). While the computer system (e.g., 600, 640, and/or 800) displays the password reset user interface (e.g., 834), the computer system (e.g., 600, 640, and/or 800) receives, via the one or more input devices (e.g., 602, 640*a*, and/or 802), a fourth set of one or more inputs (e.g., 850*k* and/or 850*m*) (e.g., one or more user inputs selecting a password manager user interface object and/or selecting an account associated with the first remotely-authenticated service from the password manager) including a request to display a second password manager user interface (e.g., 842 and/or 848) (e.g., a change password user interface for setting and/or changing a password of an account (e.g., a password for signing into and/or logging into a new account and/or an existing account) associated with a website, application, and/or service) for managing passwords for multiple different remotely-authenticated services (e.g., a website, an application, a software program, a service, and/or an external computer system). In response to receiving the fourth set of one or more inputs (e.g., 850*k* and/or 850*m*), the computer system (e.g., 600, 640, and/or 800) displays, via the display generation component (e.g., 602, 640*a*, and/or 802), the second password manager user interface (e.g., 848) for the password manager (e.g., a user interface of the password manager for creating a new password and/or changing a password for an existing account for a website, application, and/or service associated with the password user interface). Displaying the password manager user interface (e.g., 848) includes the computer system (e.g., 600, 640, and/or 800) displaying a password reset user interface object (e.g., 848*b*) (e.g., a user interface object that includes a visual indication of the first password) for entry of a second new password (e.g., a password different from the first password) for use in authenticating the user of the computer system (e.g., 600, 640, and/or 800) to the first remotely-authenticated service (e.g., 'example.com') (e.g., the computer system associates the second new password with the first username of the account for the first remotely-authenticated service, such that the user can be authenticated upon submission of the first username and the second new password to the first remotely-authenticated service).

Displaying the password reset user interface object in the password manager user interface enables the computer system to change the first password for use in authenticating the user of the computer system to the first remotely-authenticated service and save the first password without the user having to provide additional user inputs, which reduces the number of inputs needed to perform an operation.

In some embodiments, the password user interface (e.g., 804) is an account creation user interface for creating an account (e.g., a new account) with the first remotely-authenticated service (e.g., 'example.com') (e.g., a user interface for entering credentials and/or other information for creating a new account and for use in authenticating the user of the computer system to the first remotely-authenticated service).

The password user interface being an account creation user interface enables the user to enter, save, and/or submit the first password and the first username for use in authenticating the user of the computer system to the first remotely-authenticated service without having to input the first password and the first username into multiple different entry fields of the password user interface and the password manager user interface, which reduces the number of inputs needed to perform an operation.

In some embodiments, while the computer system (e.g., 600, 640, and/or 800) displays the password manager user interface (e.g., 820) including the username creation user interface object (e.g., 820*b*) and the password creation user interface object (e.g., 820*c*), the computer system (e.g., 600,

640, and/or 800) detects, via the one or more input devices (e.g., 602, 640a, and/or 802), a first user input (e.g., 850f) (e.g., a tap gesture, a mouse click, a press and/or tap on a touchpad, and/or a press gesture on a key of a keyboard) corresponding to selection of the username creation user interface object (e.g., 820b). In response to detecting the first user input (e.g., 850f) corresponding to selection of the username creation user interface object (e.g., 820b), the computer system (e.g., 600, 640, and/or 800) displays (e.g., in a suggested input region and/or a word suggestion region), via the display generation component (e.g., 602, 640a, and/or 802), a suggested username user interface object (e.g., 824a and/or 824b) (e.g., a username suggested by the computer system based on passwords, usernames, email addresses, and/or other information associated with remotely-authenticated services (e.g., remotely-authenticated services different from the first remotely-authenticated service) of the password manager).

Displaying the suggested username user interface object enables a user to select a username that is likely to be used as the first username for use in authenticating the user of the computer system to the remotely-authenticated service without requiring that the user type in the full username, which reduces the number of inputs needed to perform an operation.

In some embodiments, the suggested username user interface object (e.g., 824a) corresponds to a frequently used (e.g., most commonly and/or most frequently used by the user of the device) email address of the multiple different remotely-authenticated services of the password manager (e.g., a most frequently used email address that is used as a username for the multiple different remotely-authenticated services of the password manager).

Displaying the suggested username user interface object as a frequently used email address enables a user to select an email address that is likely to be used as the first username for use in authenticating the user of the computer system to the remotely-authenticated service without requiring that the user type in the full email address, which reduces the number of inputs needed to perform an operation.

In some embodiments, the suggested username user interface object (e.g., 824b) corresponds to a frequently used identifier (e.g., a username that is not an email address) of the multiple different remotely-authenticated services of the password manager (e.g., a most frequently used username that is not an email address that is used for the multiple different remotely-authenticated services of the password manager).

Displaying the suggested username user interface object as a frequently used identifier enables a user to select an identifier that is likely to be used as the first username for use in authenticating the user of the computer system to the remotely-authenticated service without requiring that the user type in the full identifier, which reduces the number of inputs needed to perform an operation.

In some embodiments, while the computer system (e.g., 600, 640, and/or 800) displays the password manager user interface (e.g., 820) including the username creation user interface object (e.g., 820b) and the password creation user interface object (e.g., 820c), the computer system (e.g., 600, 640, and/or 800) detects, via the one or more input devices (e.g., 602, 640a, and/or 802), a second user input (e.g., 850h) (e.g., a tap gesture, a mouse click, a press and/or tap on a touchpad, and/or a press gesture on a key of a keyboard) corresponding to selection of the password creation user interface object (e.g., 820c). In response to detecting the second user input (e.g., 850h) corresponding to selection of the password creation user interface object (e.g., 820c), the computer system (e.g., 600, 640, and/or 800) displays (e.g., in a suggested input region and/or a word suggestion region), via the display generation component (e.g., 602, 640a, and/or 802), a representation of a suggested password user interface object (e.g., 826) (e.g., a password suggested by the computer system based on passwords, usernames, email addresses, and/or other information associated with remotely-authenticated services (e.g., remotely-authenticated services different from the first remotely-authenticated service) of the password manager and/or based on one or more password requirements (e.g., strength requirements and/or character requirements, such as a number of characters, using at least one capital letters, using at least one non-capital letters, using at least one numbers, using non-sequential numbers, and/or using at least one symbol) of the first remotely-authenticated service) (in some embodiments, displaying the representation of the suggested password user interface object includes displaying a first portion of a suggested password that includes a characters and/or symbols corresponding to the suggested password and displaying a second portion of the suggested password that includes one or more default symbols (e.g., dots and/or squares) hiding and/or obscuring the actual characters and/or symbols corresponding to the suggested password) (in some embodiments, displaying the representation of the suggested password user interface object includes displaying all of the characters and/or symbols of the suggested password without displaying the one or more default symbols hiding and/or obscuring the actual characters and/or symbols of the suggested password).

Displaying the suggested password user interface object enables a user to select a password that is likely to be used as the first password for use in authenticating the user of the computer system to the remotely-authenticated service without requiring that the user type in the full password, which reduces the number of inputs needed to perform an operation.

In some embodiments, the suggested password user interface object (e.g., 826) corresponds to a suggested new password (e.g., a random set of characters, such as alphanumeric characters and symbol characters, and/or a pseudorandom set of characters) that satisfies password requirements (e.g., 804c) (in some embodiments, the method includes receiving the password requirements) of the first remotely-authenticated service (e.g., 'example.com') (e.g., strength requirements and/or character requirements, such as a number of characters, using at least one capital letters, using at least one non-capital letters, using at least one numbers, using non-sequential numbers, and/or using at least one symbol). In some embodiments, the computer system detects and/or receives the password requirements of the first remotely-authenticated service based on a communication with the first remotely-authenticated service and/or based on receiving data associated with the password requirements via the request received while displaying the password user interface.

Displaying the suggested password user interface object with the suggested new password that satisfies the password requirements of the remotely-authenticated service enables a user to select a password that is likely to be used as the first password for use in authenticating the user of the computer system to the remotely-authenticated service without requiring that the user type in the full password and/or without requiring the user to navigate back to the password user interface to determine the password requirements, which reduces the number of inputs needed to perform an operation.

In some embodiments, in response to detecting the second set of one or more user inputs (e.g., 850*f*, 850*g*, 850*h*, 850*i*, and/or 850*j*), the computer system (e.g., 600, 640, and/or 800) displays, via the display generation component (e.g., 602, 640*a*, and/or 802), the password user interface (e.g., 804) (e.g., a password creation user interface for setting and/or creating a password of an account (e.g., a password for signing into and/or logging into a new account and/or an existing account) associated with a website, application, and/or service). Displaying the password user interface (e.g., 804) includes the computer system (e.g., 600, 640, and/or 800) concurrently displaying a password creation field (e.g., 804*b* and/or 804*c*) (e.g., a user interface object and/or affordance for entry of a new password for use in authenticating the user of the computer system to the first remotely-authenticated service) including a visual indication of the first password (e.g., 830) (e.g., displaying the set of characters corresponding to the first password and/or displaying symbols representative of the first password without detecting user input in addition to the second set of one or more user inputs, where the second set of one or more user inputs do not include user input corresponding to selection and/or entry of characters into the password creation field) and a username creation field (e.g., 804*a*) (e.g., a user interface object and/or affordance for entry of a new username for use in authenticating the user of the computer system to the first remotely-authenticated service) including a visual indication of the first username (e.g., 828) (e.g., displaying the set of characters corresponding to the first username without detecting user input in addition to the second set of one or more user inputs, where the second set of one or more user inputs do not include user input corresponding to selection and/or entry of characters into the username creation field).

Displaying the password creation field with the visual indication of the first password and the username creation field with the visual indication of the first username in response to detecting the second set of one or more user inputs enables the computer system to enter and display the first password and the first username in the password user interface without the user having to re-type the first password and the first username, which reduces the number of inputs needed to perform an operation.

In some embodiments, prior to displaying the password manager user interface (e.g., 820) for the password manager, the computer system (e.g., 600, 640, and/or 800) displays, via the display generation component (e.g., 602, 640*a*, and/or 802), a third password manager user interface (e.g., 812) for the password manager (e.g., a user interface of the password manager that enables the computer system to associate a username and/or password for an existing remotely-authenticated service of the password manager with the first remotely-authenticated service). Displaying the third password manager user interface (e.g., 812) for the password manager includes the computer system (e.g., 600, 640, and/or 800) concurrently displaying a first account user interface object (e.g., 814*a*) corresponding to a second username (e.g., 816) and a second password (e.g., 818) of a second remotely-authenticated service of the password manager (e.g., 'Bank.com') (e.g., information related to an account of a first existing remotely-authenticated service of the password manager) and a second account user interface object (e.g., 814*b*) corresponding to a third username and a third password of a third remotely-authenticated service of the password manager (e.g., 'couture.com') (e.g., information related to an account of a second existing remotely-authenticated service of the password manager). The computer system (e.g., 600, 640, and/or 800) detects, via the one or more input devices (e.g., 602, 640*a*, and/or 802), a third user input (e.g., 850*c*) (e.g., a tap gesture and/or a mouse click) corresponding to selection of the first account user interface object (e.g., 814*a*) or the second account user interface object (e.g., 814*b*). In response to detecting the third user input (e.g., 850*c*) and in accordance with a determination that the third user input (e.g., 850*c*) corresponds to selection of the first account user interface object (e.g., 814*a*), the computer system (e.g., 600, 640, and/or 800) submits the second username (e.g., 816) and the second password (e.g., 818) to the first remotely-authenticated service (e.g., 'example.com') (e.g., as a new username and password for the first remotely-authenticated service) (e.g., submitting a form associated with the password user interface to initiate a process for registering the second username and the second password with a new account of the first remotely-authenticated service). In response to detecting the third user input (e.g., 850*c*) and in accordance with a determination that the third user input (e.g., 850*c*) corresponds to selection of the second account user interface object (e.g., 814*b*), the computer system (e.g., 600, 640, and/or 800) submits the third username and the third password to the first remotely-authenticated service (e.g., 'example.com') as a new username and password for the first remotely-authenticated service (e.g., submitting a form associated with the password user interface to initiate a process for registering the third username and the third password with a new account of the first remotely-authenticated service).

Displaying the first account user interface object and the second account user interface object enables a user to select and/or re-use existing passwords and/or usernames associated with other accounts for remotely-authenticated services without having to re-type the existing passwords and/or usernames for use in authenticating the user of the computer system to the first remotely-authenticated service, which reduces the number of inputs needed to perform an operation.

In some embodiments, prior to displaying the password manager user interface (e.g., 812 and/or 820) for the password manager, the computer system (e.g., 600, 640, and/or 800) prompts (e.g., 810 and/or 810*a*) a user to provide an authentication input (e.g., a password and/or biometric feature for authorization to and/or access to the password manager). The computer system (e.g., 600, 640, and/or 800) detects, via the one or more input devices (e.g., 602, 613, 615, 640*a*, 802, and/or 811) (e.g., a touchscreen display, a camera, and/or a fingerprint sensor), the authorization input (e.g., the password and/or biometric feature). In response to detecting the authorization input and in accordance with a determination that the authorization input satisfies a first set of authentication criteria (e.g., comparing the authorization input to a stored password and/or biometric feature data of the computer system and determining that the authorization input matches and/or partially matches the stored password and/or the biometric feature data of the computer system), the computer system (e.g., 600, 640, and/or 800) displays, via the display generation component (e.g., 602, 640*a*, and/or 802), the password manager user interface (e.g., 812 and/or 820) for the password manager.

Prompting a user to provide the authentication input prior to displaying the password manager user interface for the password manager increases the security of the computer system by confirming that the user accessing the password manager user interface is authorized to view and/or use the passwords and/or usernames of the password manager, which enhances a security of the computer system.

In some embodiments, displaying the password manager user interface (e.g., 820) includes the computer system (e.g., 600, 640, and/or 800) concurrently displaying, with the username creation user interface object (e.g., 820*b*) and the password creation user interface object (e.g., 820*c*), a visual indication (e.g., 820*a*) of an identifier (e.g., a name, image, and/or other representation of the website, application, software program, service, and/or external computer system) of the first remotely-authenticated service (e.g., 'example.com').

Displaying the visual indication of an identifier of the first remotely-authenticated service concurrently with the username creation user interface object and the password creation user interface object enables a user of the computer system to confirm that the first username and the first password will be stored and/or associated with the first remotely-authenticated service, which provides improved visual feedback.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, the computer system described with respect to method 700 can be used to enter a one-time password. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to facilitate creating and/or submitting credentials for user in authenticating a user with a remotely-authenticated service. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to facilitate creating and/or entering usernames and passwords for use in authenticating a user with a remotely-authenticated service. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of password managers, the present technology can be configured to allow users to select to "opt in" or "opt out" of participation in the collection of personal information data during registration for services or anytime thereafter. In another example, users can select not to provide save and/or provide credentials to the password manager. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system configured to communicate with a display generation component and one or more input devices, comprising:

one or more processors; and memory storing one or more programs configured to be executed by the one or more processors, the one or more programs including instructions for:

displaying, via the display generation component, a password user interface for creating a password to authenticate a user of the computer system to a first remotely-authenticated service;

while displaying the password user interface, receiving, via the one or more input devices, a first set of one or more inputs including a request to display a password manager user interface for managing passwords for multiple different remotely-authenticated services;

in response to receiving the first set of one or more inputs, displaying, via the display generation component, the password manager user interface for a password manager, wherein displaying the password manager user interface includes concurrently displaying:

a username creation user interface object for entry of a new username for use in authenticating the user of the computer system to the first remotely-authenticated service; and a password creation user interface object for entry of a new password for use in authenticating the user of the computer system to the first remotely-authenticated service;

while displaying the password manager user interface with a first username entered into the username creation user interface object and a first password entered into the password creation user interface object, detecting a second set of one or more user inputs; and in response to detecting the second set of one or more user inputs:

saving the first username and the first password, in the password manager, as a username and password for the first remotely-authenticated service; and submitting the first username and the first password to the first remotely-authenticated service as a new username and password for the first remotely-authenticated service.

2. The computer system of claim 1, wherein the one or more programs further include instructions for:

while displaying the password manager user interface including the username creation user interface object and the password creation user interface object, detecting, via the one or more input devices, a third set of one or more inputs corresponding to entry of one or more credentials into one or more first user interface objects of the password manager user interface; and in response to detecting the third set of one or more inputs corresponding to entry of the one or more credentials into the one or more first user interface objects of the password manager user interface:

entering the one or more credentials into the one or more first user interface objects of the password manager user interface; and entering the one or more credentials into one or more second user interface objects of the password user interface corresponding to the one or more credentials.

3. The computer system of claim 2, wherein:

the one or more credentials include the first password and the one or more first user interface objects of the password manager user interface include the password creation user interface object;

entering the one or more credentials into the one or more first user interface objects of the password manager user interface includes entering the first password into the password creation user interface object; and entering the one or more credentials into the one or more second user interface objects of the password user interface corresponding to the one or more credentials includes entering the first password into a password creation field of the password user interface.

4. The computer system of claim 2, wherein:

the one or more credentials include the first password and the first username and the one or more first user interface objects of the password manager user interface include the password creation user interface object and the username creation user interface object;

entering the one or more credentials into the one or more first user interface objects of the password manager user interface includes entering the first username into the username creation user interface object;

entering the one or more credentials into the one or more first user interface objects of the password manager user interface includes entering the first password into the password creation user interface object;

entering the one or more credentials into the one or more second user interface objects of the password user interface corresponding to the one or more credentials includes entering the first username into a username creation field of the password user interface; and entering the one or more credentials into the one or more second user interface objects of the password user interface corresponding to the one or more credentials includes entering the first password into a password creation field of the password user interface.

5. The computer system of claim 1, wherein the one or more programs further include instructions for:

after submitting the first username and the first password to the first remotely-authenticated service as the new username and password for the first remotely-authenticated service, displaying, via the display generation component, a password reset user interface for resetting the first password for the first remotely-authenticated service;

while displaying the password reset user interface, receiving, via the one or more input devices, a fourth set of one or more inputs including a request to display a second password manager user interface for managing passwords for multiple different remotely-authenticated services; and in response to receiving the fourth set of one or more inputs, displaying, via the display generation component, the second password manager user interface for the password manager, wherein displaying the password manager user interface includes displaying:

a password reset user interface object for entry of a second new password for use in authenticating the user of the computer system to the first remotely-authenticated service.

6. The computer system of claim 1, wherein the password user interface is an account creation user interface for creating an account with the first remotely-authenticated service.

7. The computer system of claim 1, wherein the one or more programs further include instructions for:

while displaying the password manager user interface including the username creation user interface object and the password creation user interface object, detecting, via the one or more input devices, a first user input corresponding to selection of the username creation user interface object; and in response to detecting the first user input corresponding to selection of the username creation user interface object, displaying, via the display generation component, a suggested username user interface object.

8. The computer system of claim 7, wherein the suggested username user interface object corresponds to a frequently used email address of the multiple different remotely-authenticated services of the password manager.

9. The computer system of claim 7, wherein the suggested username user interface object corresponds to a frequently used identifier of the multiple different remotely-authenticated services of the password manager.

10. The computer system of claim 1, wherein the one or more programs further include instructions for:

while displaying the password manager user interface including the username creation user interface object and the password creation user interface object, detecting, via the one or more input devices, a second user input corresponding to selection of the password creation user interface object; and in response to detecting the second user input corresponding to selection of the password creation user interface object, displaying, via the display generation component, a representation of a suggested password user interface object.

11. The computer system of claim 10, wherein the suggested password user interface object corresponds to a suggested new password that satisfies password requirements of the first remotely-authenticated service.

12. The computer system of claim 1, wherein the one or more programs further include instructions for:

in response to detecting the second set of one or more user inputs, displaying, via the display generation component, the password user interface, wherein displaying the password user interface includes concurrently displaying:

a password creation field including a visual indication of the first password; and a username creation field including a visual indication of the first username.

13. The computer system of claim 1, wherein the one or more programs further include instructions for:

prior to displaying the password manager user interface for the password manager, displaying, via the display generation component, a third password manager user interface for the password manager, wherein displaying the third password manager user interface for the password manager includes concurrently displaying:

a first account user interface object corresponding to a second username and a second password of a second remotely-authenticated service of the password manager; and a second account user interface object corresponding to a third username and a third password of a third remotely-authenticated service of the password manager;

detecting, via the one or more input devices, a third user input corresponding to selection of the first account user interface object or the second account user interface object; and in response to detecting the third user input:

in accordance with a determination that the third user input corresponds to selection of the first account user interface object:

submitting the second username and the second password to the first remotely-authenticated service as a new username and password for the first remotely-authenticated service; and in accordance with a determination that the third user input corresponds to selection of the second account user interface object:

submitting the third username and the third password to the first remotely-authenticated service as a new username and password for the first remotely-authenticated service.

14. The computer system of claim 1, wherein the one or more programs further include instructions for:

prior to displaying the password manager user interface for the password manager, prompting a user to provide an authentication input;

detecting, via the one or more input devices, the authentication input; and in response to detecting the authentication input and in accordance with a determination that the authentication input satisfies a first set of authentication criteria, displaying, via the display generation component, the password manager user interface for the password manager.

15. The computer system of claim 1, wherein displaying the password manager user interface includes concurrently displaying, with the username creation user interface object and the password creation user interface object, a visual indication of an identifier of the first remotely-authenticated service.

16. A non-transitory computer-readable storage medium storing one or more programs configured to be executed by one or more processors of a computer system that is in communication with a display generation component and one or more input devices, the one or more programs including instructions for:

displaying, via the display generation component, a password user interface for creating a password to authenticate a user of the computer system to a first remotely-authenticated service;

while displaying the password user interface, receiving, via the one or more input devices, a first set of one or more inputs including a request to display a password manager user interface for managing passwords for multiple different remotely-authenticated services;

in response to receiving the first set of one or more inputs, displaying, via the display generation component, the password manager user interface for a password manager, wherein displaying the password manager user interface includes concurrently displaying:

a username creation user interface object for entry of a new username for use in authenticating the user of the computer system to the first remotely-authenticated service; and a password creation user interface object for entry of a new password for use in authenticating the user of the computer system to the first remotely-authenticated service;

while displaying the password manager user interface with a first username entered into the username creation user interface object and a first password entered into the password creation user interface object, detecting a second set of one or more user inputs; and in response to detecting the second set of one or more user inputs:

saving the first username and the first password, in the password manager, as a username and password for the first remotely-authenticated service; and submitting the first username and the first password to the first remotely-authenticated service as a new username and password for the first remotely-authenticated service.

17. A method, comprising:

at a computer system that is in communication with a display generation component and one or more input devices:

displaying, via the display generation component, a password user interface for creating a password to authenticate a user of the computer system to a first remotely-authenticated service;

while displaying the password user interface, receiving, via the one or more input devices, a first set of one or more inputs including a request to display a password manager user interface for managing passwords for multiple different remotely-authenticated services;

in response to receiving the first set of one or more inputs, displaying, via the display generation component, the password manager user interface for a password manager, wherein displaying the password manager user interface includes concurrently displaying:

a username creation user interface object for entry of a new username for use in authenticating the user of the computer system to the first remotely-authenticated service; and a password creation user interface object for entry of a new password for use in authenticating the user of the computer system to the first remotely-authenticated service;

while displaying the password manager user interface with a first username entered into the username creation user interface object and a first password entered into the password creation user interface object, detecting a second set of one or more user inputs; and in response to detecting the second set of one or more user inputs:

saving the first username and the first password, in the password manager, as a username and password for the first remotely-authenticated service; and submitting the first username and the first password to the first remotely-authenticated service as a new username and password for the first remotely-authenticated service.

18. The non-transitory computer-readable storage medium of claim 16, wherein the one or more programs further include instructions for:

while displaying the password manager user interface including the username creation user interface object and the password creation user interface object, detecting, via the one or more input devices, a third set of one or more inputs corresponding to entry of one or more credentials into one or more first user interface objects of the password manager user interface; and in response to detecting the third set of one or more inputs corresponding to entry of the one or more credentials into the one or more first user interface objects of the password manager user interface:

entering the one or more credentials into the one or more first user interface objects of the password manager user interface; and entering the one or more credentials into one or more second user interface objects of the password user interface corresponding to the one or more credentials.

19. The non-transitory computer-readable storage medium of claim 18, wherein:

the one or more credentials include the first password and the one or more first user interface objects of the password manager user interface include the password creation user interface object;

entering the one or more credentials into the one or more first user interface objects of the password manager user interface includes entering the first password into the password creation user interface object; and entering the one or more credentials into the one or more second user interface objects of the password user interface corresponding to the one or more credentials includes entering the first password into a password creation field of the password user interface.

20. The non-transitory computer-readable storage medium of claim 18, wherein:

the one or more credentials include the first password and the first username and the one or more first user interface objects of the password manager user interface include the password creation user interface object and the username creation user interface object;

entering the one or more credentials into the one or more first user interface objects of the password manager user interface includes entering the first username into the username creation user interface object;

entering the one or more credentials into the one or more first user interface objects of the password manager user interface includes entering the first password into the password creation user interface object;

entering the one or more credentials into the one or more second user interface objects of the password user interface corresponding to the one or more credentials includes entering the first username into a username creation field of the password user interface; and entering the one or more credentials into the one or more second user interface objects of the password user interface corresponding to the one or more credentials includes entering the first password into a password creation field of the password user interface.

21. The non-transitory computer-readable storage medium of claim 16, wherein the one or more programs further include instructions for:

after submitting the first username and the first password to the first remotely-authenticated service as the new username and password for the first remotely-authenticated service, displaying, via the display generation component, a password reset user interface for resetting the first password for the first remotely-authenticated service;

while displaying the password reset user interface, receiving, via the one or more input devices, a fourth set of one or more inputs including a request to display a second password manager user interface for managing passwords for multiple different remotely-authenticated services; and in response to receiving the fourth set of one or more inputs, displaying, via the display generation component, the second password manager user interface for the password manager, wherein displaying the password manager user interface includes displaying:

a password reset user interface object for entry of a second new password for use in authenticating the user of the computer system to the first remotely-authenticated service.

22. The non-transitory computer-readable storage medium of claim 16, wherein the password user interface is an account creation user interface for creating an account with the first remotely-authenticated service.

23. The non-transitory computer-readable storage medium of claim 16, wherein the one or more programs further include instructions for:

while displaying the password manager user interface including the username creation user interface object and the password creation user interface object, detecting, via the one or more input devices, a first user input corresponding to selection of the username creation user interface object; and in response to detecting the first user input corresponding to selection of the username creation user interface object, displaying, via the display generation component, a suggested username user interface object.

24. The non-transitory computer-readable storage medium of claim 23, wherein the suggested username user interface object corresponds to a frequently used email address of the multiple different remotely-authenticated services of the password manager.

25. The non-transitory computer-readable storage medium of claim 23, wherein the suggested username user interface object corresponds to a frequently used identifier of the multiple different remotely-authenticated services of the password manager.

26. The non-transitory computer-readable storage medium of claim 16, wherein the one or more programs further include instructions for:

while displaying the password manager user interface including the username creation user interface object and the password creation user interface object, detecting, via the one or more input devices, a second user input corresponding to selection of the password creation user interface object; and in response to detecting the second user input corresponding to selection of the password creation user interface object, displaying, via the display generation component, a representation of a suggested password user interface object.

27. The non-transitory computer-readable storage medium of claim 26, wherein the suggested password user interface object corresponds to a suggested new password that satisfies password requirements of the first remotely-authenticated service.

28. The non-transitory computer-readable storage medium of claim 16, wherein the one or more programs further include instructions for:

in response to detecting the second set of one or more user inputs, displaying, via the display generation component, the password user interface, wherein displaying the password user interface includes concurrently displaying:

a password creation field including a visual indication of the first password; and a username creation field including a visual indication of the first username.

29. The non-transitory computer-readable storage medium of claim 16, wherein the one or more programs further include instructions for:

prior to displaying the password manager user interface for the password manager, displaying, via the display generation component, a third password manager user interface for the password manager, wherein displaying the third password manager user interface for the password manager includes concurrently displaying:

a first account user interface object corresponding to a second username and a second password of a second remotely-authenticated service of the password manager; and a second account user interface object corresponding to a third username and a third password of a third remotely-authenticated service of the password manager;

detecting, via the one or more input devices, a third user input corresponding to selection of the first account user interface object or the second account user interface object; and in response to detecting the third user input:

in accordance with a determination that the third user input corresponds to selection of the first account user interface object:

submitting the second username and the second password to the first remotely-authenticated service as a new username and password for the first remotely-authenticated service; and in accordance with a determination that the third user input corresponds to selection of the second account user interface object:

submitting the third username and the third password to the first remotely-authenticated service as a new username and password for the first remotely-authenticated service.

30. The non-transitory computer-readable storage medium of claim 16, wherein the one or more programs further include instructions for:

prior to displaying the password manager user interface for the password manager, prompting a user to provide an authentication input;

detecting, via the one or more input devices, the authentication input; and in response to detecting the authentication input and in accordance with a determination that the authentication input satisfies a first set of authentication criteria, displaying, via the display generation component, the password manager user interface for the password manager.

31. The non-transitory computer-readable storage medium of claim 16, wherein displaying the password manager user interface includes concurrently displaying, with the username creation user interface object and the password creation user interface object, a visual indication of an identifier of the first remotely-authenticated service.

32. The method of claim 17, further comprising:

while displaying the password manager user interface including the username creation user interface object and the password creation user interface object, detecting, via the one or more input devices, a third set of one or more inputs corresponding to entry of one or more credentials into one or more first user interface objects of the password manager user interface; and in response to detecting the third set of one or more inputs corresponding to entry of the one or more credentials into the one or more first user interface objects of the password manager user interface:

entering the one or more credentials into the one or more first user interface objects of the password manager user interface; and entering the one or more credentials into one or more second user interface objects of the password user interface corresponding to the one or more credentials.

33. The method of claim 32, wherein:

the one or more credentials include the first password and the one or more first user interface objects of the password manager user interface include the password creation user interface object;

entering the one or more credentials into the one or more first user interface objects of the password manager user interface includes entering the first password into the password creation user interface object; and entering the one or more credentials into the one or more second user interface objects of the password user interface corresponding to the one or more credentials includes entering the first password into a password creation field of the password user interface.

34. The method of claim 32, wherein:

the one or more credentials include the first password and the first username and the one or more first user interface objects of the password manager user interface include the password creation user interface object and the username creation user interface object;

entering the one or more credentials into the one or more first user interface objects of the password manager user interface includes entering the first username into the username creation user interface object;

entering the one or more credentials into the one or more first user interface objects of the password manager user interface includes entering the first password into the password creation user interface object;

entering the one or more credentials into the one or more second user interface objects of the password user interface corresponding to the one or more credentials includes entering the first username into a username creation field of the password user interface; and entering the one or more credentials into the one or more second user interface objects of the password user interface corresponding to the one or more credentials includes entering the first password into a password creation field of the password user interface.

35. The method of claim 17, further comprising:

after submitting the first username and the first password to the first remotely-authenticated service as the new username and password for the first remotely-authenticated service, displaying, via the display generation component, a password reset user interface for resetting the first password for the first remotely-authenticated service;

while displaying the password reset user interface, receiving, via the one or more input devices, a fourth set of one or more inputs including a request to display a second password manager user interface for managing passwords for multiple different remotely-authenticated services; and in response to receiving the fourth set of one or more inputs, displaying, via the display generation component, the second password manager user interface for the password manager, wherein displaying the password manager user interface includes displaying:

a password reset user interface object for entry of a second new password for use in authenticating the user of the computer system to the first remotely-authenticated service.

36. The method of claim 17, wherein the password user interface is an account creation user interface for creating an account with the first remotely-authenticated service.

37. The method of claim 17, further comprising:

while displaying the password manager user interface including the username creation user interface object and the password creation user interface object, detecting, via the one or more input devices, a first user input corresponding to selection of the username creation user interface object; and in response to detecting the first user input corresponding to selection of the username creation user interface object, displaying, via the display generation component, a suggested username user interface object.

38. The method of claim 37, wherein the suggested username user interface object corresponds to a frequently used email address of the multiple different remotely-authenticated services of the password manager.

39. The method of claim 37, wherein the suggested username user interface object corresponds to a frequently used identifier of the multiple different remotely-authenticated services of the password manager.

40. The method of claim 17, further comprising:

while displaying the password manager user interface including the username creation user interface object and the password creation user interface object, detecting, via the one or more input devices, a second user input corresponding to selection of the password creation user interface object; and in response to detecting the second user input corresponding to selection of the password creation user interface object, displaying, via the display generation component, a representation of a suggested password user interface object.

41. The method of claim 40, wherein the suggested password user interface object corresponds to a suggested new password that satisfies password requirements of the first remotely-authenticated service.

42. The method of claim 17, further comprising:

in response to detecting the second set of one or more user inputs, displaying, via the display generation component, the password user interface, wherein displaying the password user interface includes concurrently displaying:

a password creation field including a visual indication of the first password; and a username creation field including a visual indication of the first username.

43. The method of claim 17, further comprising:

prior to displaying the password manager user interface for the password manager, displaying, via the display generation component, a third password manager user interface for the password manager, wherein displaying the third password manager user interface for the password manager includes concurrently displaying:

a first account user interface object corresponding to a second username and a second password of a second remotely-authenticated service of the password manager; and a second account user interface object corresponding to a third username and a third password of a third remotely-authenticated service of the password manager;

detecting, via the one or more input devices, a third user input corresponding to selection of the first account user interface object or the second account user interface object; and in response to detecting the third user input:

in accordance with a determination that the third user input corresponds to selection of the first account user interface object:

submitting the second username and the second password to the first remotely-authenticated service as a new username and password for the first remotely-authenticated service; and in accordance with a determination that the third user input corresponds to selection of the second account user interface object:

submitting the third username and the third password to the first remotely-authenticated service as a new username and password for the first remotely-authenticated service.

44. The method of claim 17, further comprising:

prior to displaying the password manager user interface for the password manager, prompting a user to provide an authentication input;

detecting, via the one or more input devices, the authentication input; and in response to detecting the authentication input and in accordance with a determination that the authentication input satisfies a first set of authentication criteria, displaying, via the display generation component, the password manager user interface for the password manager.

45. The method of claim 17, wherein displaying the password manager user interface includes concurrently displaying, with the username creation user interface object and the password creation user interface object, a visual indication of an identifier of the first remotely-authenticated service.

* * * * *